United States Patent [19]

Burke, Jr., deceased et al.

[11] 4,132,562

[45] Jan. 2, 1979

[54] INTRACHROMOSPHERULOID/INORGANIC PIGMENT COMPOSITIONS AND PROCESSES FOR PRODUCING SAME

[75] Inventors: Oliver W. Burke, Jr., deceased, late of Fort Lauderdale, Fla., by Norma Scala, administratrix; Victor T. Humphreys, Pompano Beach, Fla.

[73] Assignee: Marion Darrah and Joseph Y. Houghton, Co-trustees, both of Pompano Beach, Fla.

[21] Appl. No.: 712,255

[22] Filed: Aug. 6, 1976

[51] Int. Cl.$^2$ .......................... C08K 9/02; C08K 9/04; C08K 9/10

[52] U.S. Cl. .............. 106/308 M; 106/308 B; 106/308 Q; 106/308 F; 106/308 N; 106/308 S; 106/309; 260/42.14; 260/42.15; 260/42.16; 260/42.21; 260/42.53

[58] Field of Search .......................... 260/42.21, 42.53; 106/308 M, 308 B, 308 Q, 308 F, 308 N, 308 S, 309, 42.14, 42.15, 42.16

[56] References Cited

U.S. PATENT DOCUMENTS

| | | | |
|---|---|---|---|
| 2,751,369 | 6/1956 | TeGrotenhuis | 260/42.53 |
| 2,786,822 | 3/1957 | Vesie | 260/42.55 |
| 3,133,893 | 5/1964 | Newman | 260/42.21 |
| 3,423,358 | 1/1969 | Burke | 260/42.43 |
| 3,502,582 | 3/1970 | Clemens | 260/42.53 |
| 3,700,690 | 10/1972 | Burke | 260/42.55 |

*Primary Examiner*—James H. Derrington

*Attorney, Agent, or Firm*—Hall & Houghton

[57] ABSTRACT

An intrachromospheruloid/inorganic pigment composition and a process for producing the same: the intrachromospheruloid pigment consisting essentially of (a) spheruloids of essentially transparent organic polymer material preferably cross-linked to essential insolubility in any physical solvent, having primary particles of an average size not exceeding 4 microns in diameter which have embedded therein particulate organic color pigment composition consisting essentially of organic color pigment material having primary particles of an average size not exceeding 0.2 micron in diameter and (b) an inorganic leuco pigment component combined with (a) to provide light reflectivity to the combination. In the process for its production, the organic color pigment material is reduced to an average particle size of 0.2 micron or less, which is well below the normal pigmentary size range, and is then included in an emulsion polymerization of monomer material preferably comprising an effective quantity of cross-linking agent, and the polymerization is conducted to produce emulsion polymer of an average particle size not exceeding 4 microns in diameter, having embedded therein the still smaller organic color pigment particles which is then further combined, by the process, with inorganic leuco pigment material which preferably comprises high refractive index inorganic pigment material such as is commonly referred to as "White" or as "Opaque White". Cooperative features are also disclosed.

41 Claims, 7 Drawing Figures

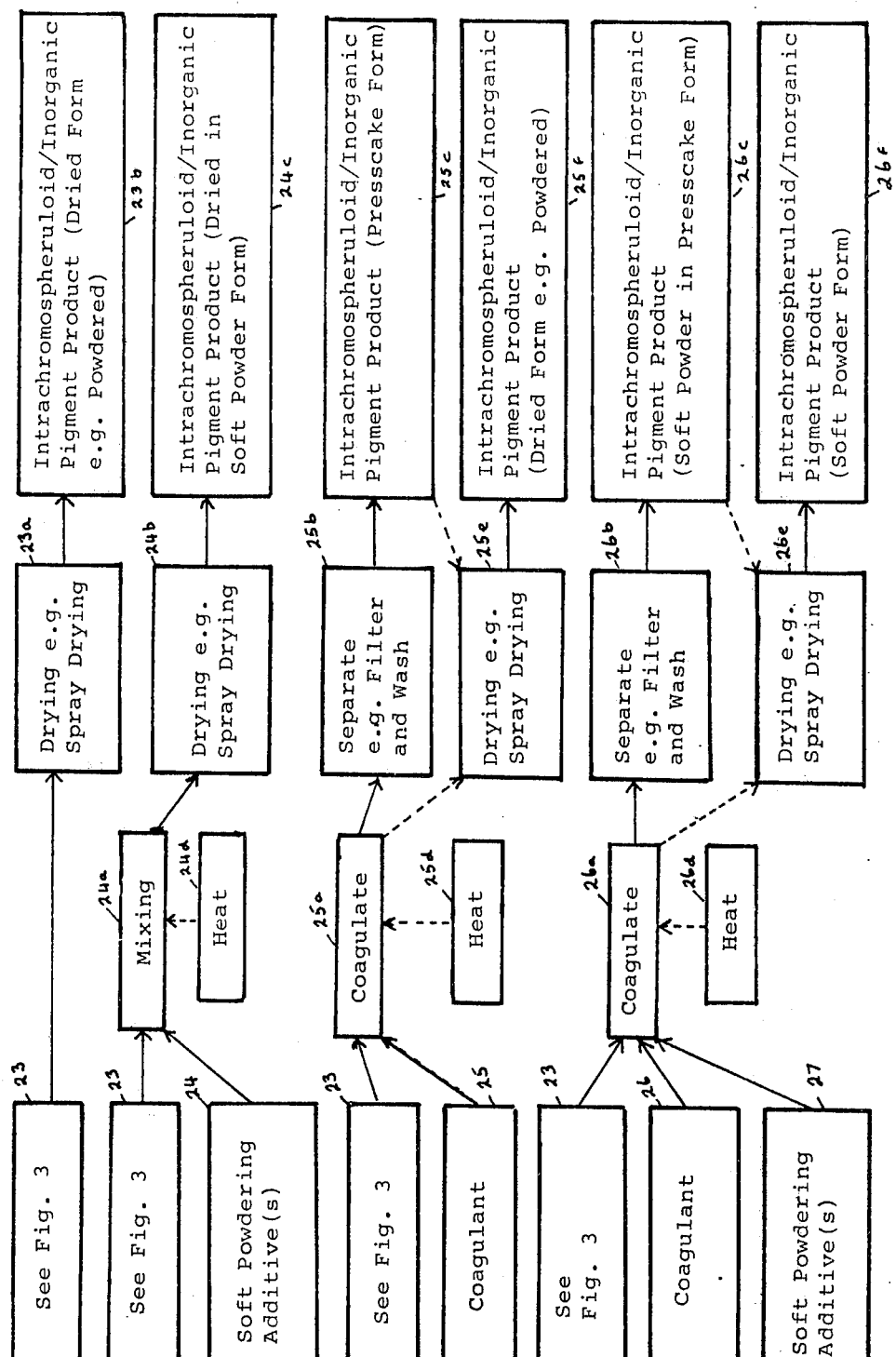

INTRACHROMOSPHERULOID/INORGANIC PIGMENT COMPOSITIONS AND PROCESSES FOR PRODUCING SAME

BACKGROUND OF THE INVENTION

1. Field of the Invention

This invention relates to colored pigment compositions of high refractive index and hue intensity and aims generally to improve the same and provide novel processes for the production thereof.

2. Description of the Prior Art

In the prior art it has been well known to produce the so-called "Laked" or "Extended" pigment colors usually by precipitation of a soluble organic dye or pigment color onto an inert and inherently colorless or white substrate material to impart either useful pigmentary properties to an otherwise unsuitable organic or inorganic color material or to give improved physical properties to an already useful color. Such treatments and combinations included the enclosing or encapsulation of inorganic color material, such as the lead chromate yellows, with a siliceous envelope or encapsulation to inhibit or reduce its toxicological properties, and also included the laking of azo and related organic pigments on such insoluble substances as alumina, Blanc Fixe and the like.

All these methods simply dilute the color portion of the resultant pigment composition and result in an essentially wet or dry dispersion of the color pigment intimately admixed with the inert or extender portion of the composition.

Such laked or extended colors are usually considerably duller than the original chromogen containing constituent and not infrequently are themselves easily disunited into the separate components of the composition. This is especially true concerning the use of mixtures of organic color pigments per se with the so-called substrate or extender inorganic pigment compounds.

SUMMARY OF THE INVENTION

We have discovered that intrachromospheruloid pigments which are a new and valuable organic pigment composition as disclosed in our copending application Ser. No. 712,257 filed concurrently herewith, (Case 90-A, herein incorporated by reference) can be combined with inorganic pigment compositions by means and methods disclosed herewith to give new and valuable color pigment composition which not only give a very high degree of light stability regardless of the use to which they are put, but in effect can provide improved characteristics such as storage stability, ease of handling and incorporation into vehicles such as paints, thermoplastic materials, etc., and improved color value or strength over that which has heretofore been possible or available from a conventional laking or mixing of the components by physical means.

It is believed that these effects may partially be explained by the peculiar structure of the intrachromospheruloid pigment material used which scatters light within itself yet is essentially transparent to same, coupled with the high relative refractive index of the inorganic pigment particle used. Especially when the intrachromospheruloid pigment particles form a transparent yet colored envelopment or outer layer around the particle of high refractive index, it appears that the former transmits colored light to the latter, and then the latter reflects the light back through said outer colored spheruloids to the viewer. It thus appears that the higher the refractive index of the inorganic pigment compared to the intrachromospheruloid pigment material used the greater will be the apparent effect; and that, as will be understood by those skilled in the art the inorganic pigment primary particle size for maximum economy in use of the inorganic pigment, may lie within the normal pigmentary limits for such pigment and, if desirable, between the optimum limits for obtaining the highest hiding power, usually delineated as being between 0.2 and 0.4 micron; as detailed in "Pigment Handbook" Volume III by Temple C. Patton, published by John Wiley & Sons 1973, hereby incorporated by reference. However as the inorganic pigment is a relatively inexpensive component of the combination, the inorganic pigment may be increased in size above the 0.4 micron figure, but preferably not to exceed 2 microns in average diameter.

Such intrachromospheruloid/inorganic pigment composition may be produced to be either inert chemically or to possess cationic, anionic, or amphoteric characteristics either in themselves or by incorporation within their structure of materials imparting such characteristics, as hereinafter disclosed.

In a preferred embodiment of the invention a process is provided for producing intrachromospheruloid/inorganic pigment compositions, which process comprises, in combination: (a) providing in liquid medium a particulate pigment composition consisting essentially of organic color pigment composition dispersed in said medium with 0–100% by weight of the total of surface active agent material set forth in clause (c) of this paragraph, said organic color pigment composition being essentially insoluble in water and having primary particles of an average size less than 0.2 micron in diameter; (b) forming an aqueous emulsion polymerization system consisting essentially of (1) the composition of (a), (2) the balance, if any, of 100% of the total of surface active agent material set forth in (c), (3) monomer material selected in a ratio of said monomer material to said pigment composition lying in the range of 100:1 to 1:20 by weight, said monomer material consisting essentially of ethylenically unsaturated monomer material selected from the class consisting of (i) monomer material polymerizable through a single of ethylenically unsaturated group in the moment of 0% to 99.8% by weight of said monomer material and (ii) monomer polymerizable through a plurality of ethylenically unsaturated groups in an amount, in the range of 0.2% to 100% by weight of said monomer material, sufficient to produce polymer cross-linked to essential insolubility in any physical solvent and (4) emulsion polymerization initiator in an effective amount in the range of 0.2% to 10% by weight of the said monomer material, dispersed in an aqueous medium; (c) the ratio of the total of the surface active agent material present after (b) to said particulate pigment composition and monomer material lying in the range of 2:1 to 1:40 by weight and said total of surface active agent material being selected from the class of polymeric and nonpolymeric surface active agents and combinations thereof capable of effecting emulsion polymerization in the said system of the selected ethylenically unsaturated monomer material to yield polymer particles with the organic pigment provided in step (a) embedded therein, and (d) effecting emulsion polymerization in said system at sufficient temperatures in the range of 0° C. to 200° C. for sufficient time in the range of a few minutes to 24 hours to permit the polymerization to proceed far enough in the range from 50 to 100% conversion by weight of said monomer material to produce in aqueous dispersion an intrachromospheruloid pigment consisting essentially of spheruloids of organic polymer material, cross-linked to essential insolubility in any physical solvent, having primary particles of an average size not exceeding 4 microns in diameter and preferably not exceeding 0.5 micron in diameter, and having embedded therein the still smaller size particles of said particulate pigment composition, (e) providing a particulate inorganic pigment combination consisting essentially of inorganic leuco pigment composition which comprises transparent white and/or opaque white inorganic pigment composition dispersed in an aqueous medium with from 0 to 150 parts by weight of surface active agent material per 100 parts by weight of said inorganic pigment composition, said surface active agent material being selected from the class consisting of the polymeric and nonpolymeric surface active agents and combinations thereof; said inorganic pigment composition being essentially insoluble in water and having primary particles of an average size less than 2 microns in diameter and being selected from the class consisting of the following groups (1) siliceous pigment compositions selected from (i) the natural silica pigments, (ii) the precipitated silica pigments, (iii) the pyrogenic silica pigments, (iv) the alkaline earth silicate pigments, (v) the aluminum silicate pigments, (vi) the zinc silicate pigments, (vii) the zirconium silicate pigments, and (viii) combinations of any two or more of the foregoing; (2) titanium dioxide pigment compositions; (3) metal oxide and hydroxide pigment compositions selected from the class consisting of the following groups (i) alkaline earth oxide pigments, (ii) alumina pigments, (iii) aluminum hydroxide pigments, (iv) antimony oxide pigments, (v) zinc oxide pigments, (vi) zirconium oxide pigments, and (vii) combinations of any two or more of the foregoing, and (4) combinations of any two or more members selected respectively from classes (1), (2)and (3); (f) combining in a weight ratio in the range of 1:100 to 100:1, dry basis, the aqueous dispersions formed in steps (d) and (e) with from 0 to an equal weight, based on the inorganic pigment present, of pigment bonding agent material, and from 0 to an equal weight, based on the inorganic pigment present, of nitrogenous material, and said pigment bonding agent material being selected from the class consisting of (i) water soluble alkali metal silicates precipitated in the presence of at least a part of the inorganic pigment composition, (ii) water soluble titanium compounds precipitated in the presence of at least a part of the inorganic pigment composition, (iii) water soluble and dispersible aminoplasts preformed and formed in situ and adhered to at least a part of the inorganic pigment composition, (v) water soluble and dispersible organic polymers having carboxyl, amine, sulfate and sulfonic acid groups and salts thereof precipitated in the presence of at least a part of the inorganic pigment composition, (vi) water soluble and dispersible organic silanes, and (vii) combinations of two or more members of the foregoing, and said nitrogenous material being selected from the class consisting of (i) oleophilic amines, (ii) oleophilic imines, (iii) oleophilic amine carboxylates, (iv) the oleophilic quaternary ammonium compounds, (v) water soluble polyamines, (vi) water soluble imines, and (vii) combinations of two or more members of the foregoing; and destabilizing the surface active agent material present to form an aqueous slurry of intrachromospheruloid/inorganic pigment composition, and (g) recovering said intrachromospheruloid/inorganic pigment composition.

In this embodiment the monomer material may comprise several portions added sequentially, at least one of the portions comprising cross-linking monomer as set forth and the cross-linking monomer may consist essentially of material copolymerizable with vinyl monomers and be wholly or partially selected from the unsaturated conjugated drying oils and their acids and derivatives thereof, in the ratio to the vinyl and/or other copolymerizable monomers of 0.2:99.8 to 20:80 by weight.

The product of this preferred embodiment is particularly desirable because we have discovered that it may be modified to be soft powdering as hereinafter disclosed whereas said technique is inapplicable to non-cross-linked oil soluble polymers.

For special purposes, and with less general advantages a less preferred embodiment of the invention may be employed wherein the monomer material in step (b) consists essentially of ethylenically unsaturated monomer material selected from the class consisting of monomers polymerizable through a single ethylenically unsaturated group, to produce intrachromospheruloids in step (d) consisting of organic color pigment embedded in essentially noncross-linked organic polymer material for combining in step (f) with the inorganic pigment composition provided in step (e).

Whether prepared by the preferred or less preferred embodiments the product may be recovered in step (g) in aqueous dispersion form, in presscake form, or in bulk dried or spray dried form and may be used in vehicles in which the polymer portion of the product is insoluble, and when, as above noted, the polymer portion of the product is cross-linked to essential insolubility in any physical solvent the products may be recovered in soft powdered form and/or be used in any suitable vehicle.

Thus, as just described, the polymer portion of the intrachromospheruloid pigment portion of applicants' invention is insoluble in the environment of intended use, and in the preferred practice of the invention is cross-linked to insolubility in all physical solvents, although in certain instances such cross-linking may be omitted with limitation of the special utility of the intrachromospheruloid/inorganic pigment product to environments in which its polymer portion is essentially insoluble. Further, in accordance with the invention, means are also provided for aiding the fixation of the intrachromospheruloid pigment to the inorganic pigment material and for aiding the fixation of the intrachromospheruloid/inorganic pigment product to the environment of intended use, by physical and/or chemical bonding.

We have found it to be essential to reduce the organic color pigment material to an average particle size essentially below 0.2 micron and preferably below 0.02 micron which values are well below the optimum pigmentary range, and that it is then possible to embed such ultra fine color particles within transparent polymer spheruloids insoluble in the environment of intended use, nonfusible at the temperatures of intended use, and which differ in refractive index from the environment of intended use, and which are of not more than 4 microns average particle size and to then combine the same with the inorganic pigment to thereby obtain the new and useful coloration characteristics of the present intrachromospheruloid/inorganic pigment composition invention. The reduction of organic pigment color size to such ultra fineness may be effected by micronizing in a liquid medium, e.g. in a ball-mill or preferably a sand-mill. The liquid medium may be an aqueous solution of dispersing agent preferably selected from those known to be suitable for effecting emulsion polymerization, or it may be a liquid body of monomer material with or without such dispersing agent, and with or without a volatile organic diluent miscible with said monomer, the monomer material being suitable for polymerization in the formation of the final product. The organic pigmentary color starting material may be in any conveniently available form, either as wet presscake which may or may not have been subjected to such special treatment as acid pasting; or it may be a dry, conventional essentially pure pigment composition commercially available or it may have been preformed as a laked color as in the case of pigments from water soluble acid or azo dyes.

The polymerization of the monomer or monomers with the organic pigment color composition is carried out in the presence of sufficient emulsifier material to effect emulsion polymerization of the monomer material, and the nature and quantity of initiator and emulsifier, the degree of conversion of monomer to polymer, and the temperature of polymerization are selected to produce intrachromospheruloid pigment having primary particles of an average size not exceeding 4 microns and preferably not exceeding 0.5 micron so that the potential color strength available may be effectively utilized and retained in the finished intrachromospheruloid/inorganic pigment product. The amount of dispersant or surface active agent material employed in aqueous micronizing of the organic color pigment material can be as low as is consistent with reduction of the particle size to the desired level and the maintenance of its size stability.

Functional groups may be introduced either into the initial intrachromospheruloid pigment composition by selection of the monomer or monomers or may be later introduced by means of graft polymerization techniques or by selection of the emulsifier or emulsifiers, particularly those of a polymeric character, which become incorporated with the intrachromospheruloid pigment particles, or in the final intrachromospheruloid/inorganic pigment product during the bonding or coagulation step.

In the case where two or more organic color pigments are combined in the spheruloids to produce new and novel shades, such combinations show little of the dulling of hue characteristic of normal physical mixtures when two or more organic pigment colors are blended together, but retain the original brilliance of hue characteristic of the individual colors, even after incorporation into the intrachromospheruloid/inorganic pigment product, to a marked degree.

Furthermore, when one such organic pigment color is possessed of markedly superior light-fastness the resultant intrachromospheruloid pigment composition takes on the light resistant characteristics of the superior component to a marked degree. Even those organic pigment colors which do not themselves possess any great degree of resistance of fading are found to be markedly improved when incorporated into intrachromospheruloid pigment compositions, with or without other more light stable pigment material, and this improvement is maintained even after incorporation into the intrachromospheruloid/inorganic pigment product of the invention.

Furthermore, intrachromospheruloid/inorganic pigment compositions, comprising two or more organic pigment colors either of similar or different hue in the intrachromospheruloid pigment, retain the true shade of the mixture with no tendency for separation into component pigment colors.

It has even been found possible to incorporate in the spheruloids with many of the organic color pigments used, a substantial amount (e.g. up to 10% by weight) of a hue deepening component such as carbon black, which gives deeper tonal shades without materially destroying or altering the coloration of the intrachromospheruloid composition or the intrachromospheruloid/inorganic pigment product, as it would do if simply mixed with the product.

We have found it also essential, in the provision of the particulate inorganic pigment portion of the body of the invention that said inorganic pigment component be essentially insoluble in water and be dispersed in same with from 0 to 150 parts by weight of surface active agent material per 100 parts by weight of said inorganic pigment material composition having primary particles of an average size less than 2 microns in diameter, and said surface active agent material being selected from the class consisting of the polymeric and nonpolymeric surface active agents and combinations thereof. This inorganic pigment composition is then combined in a weight ratio in the range of 1:100 to 100:1, dry basis, with the aqueous dispersions formed in steps (d), and (e), with from 0 to an equal weight, based on the inorganic pigment present, of pigment bonding agent material and from 0 to an equal weight, based on the inorganic pigment present, of nitrogenous material, said pigment bonding agent material being selected from the class consisting of (i) water soluble alkali metal silicates precipitated in the presence of at least a part of the inorganic pigment composition, (ii) water soluble titanium compounds precipitated in the presence of at least a part of the inorganic pigment composition, (iii) water soluble and dispersible aminoplasts preformed and formed in situ and adhered to at least a part of the inorganic pigment composition, (iv) water soluble and dispersible phenoplasts preformed and formed in situ and adhered to at least a part of the inorganic pigment composition, (v) water soluble and dispersible organic polymers having carboxyl, amine, sulfate and sulfonic acid groups and salts thereof precipitated in the presence of at least a part of the inorganic pigment composition, and (vi) water soluble and dispersible organic silanes and (vii) combinations of two or more members of the foregoing; and said nitrogenous material being selected from the class consisting of (i) oleophilic amines, (ii) oleophilic imines, (iii) oleophilic amine carboxylates and acetates, (iv) the oleophilic quaternary ammonium compounds, (v) water soluble polyamines, (vi) water soluble imines and polyimines and (vii) combinations of two or more members of the foregoing; and then (g) said intrachromospheruloid/inorganic pigment composition is recovered by appropriate methods e.g. by destabilizing the surface active agent material present to form an aqueous slurry of intrachromospheruloid/inorganic pigment composition, filtration, washing and recovery as a presscake or drying, during which recovery steps the intrachromospheruloid/inorganic pigment composition may be further modified, e.g. in the preferred embodiment by soft powdering techniques if desired, as hereinafter disclosed.

Thus, objects of the invention, severally and interdependently, are to provide new features and new combinations of steps, which contribute to produce new and improved pigment compositions and processes for production of same. Other objects and advantages of the invention will be apparent from the above general description and the following more particular descriptions of preferred embodiments thereof, which however, are illustrative but not restrictive of the invention, the scope of which is more particularly pointed out in the appended claims.

Before proceeding with the more particular descriptions, reference will be made to certain definitions of terms employed herein.

(1) Organic Color Pigments

The term "organic color pigments" as used herein designates the organic pigmentary materials which are colored as distinguished from water white.

The invention is generally applicable to such organic color pigments and is not limited to the use of any particular organic color pigment. As illustrative but not restrictive of those that may be used and improved by the invention are those organic color pigments set out in "The Chemistry of Synthetic Dyes" by K. Venkataraman, Vol. V, especially Section 6, pages 314–474, Academic Press, New York N.Y., (1971), herein incorporated by reference, which include pigments of the well known Azo class exemplified by the acetoacetarylide azo; the pyrazolone azo, the α-naphthol azo, the 2-hydroxy-3-naphtholic acid azo; the 2-hydroxy-3-naphtharylide azo and the naphtholsulfonic acid azo pigments; the triphenylmethane pigments and related compounds; the phthalocyanine pigments; the antraquinone, indigoid and related pigments; the quinacridone pigments; the dioxazine pigments; the azamethine pigments; the fluororubine pigments; the naphthindolizinedione pigments and other miscellaneous organic pigmentary compositions; in "The Chemistry of Synthetic Dyes and Pigments" by Herbert A. Lubs, Reinhold, New York (1955), herein incorporated by reference; and in "The Color Index", 3rd Edition (1973) published jointly by the "British Society of Dyers and Colourists" and the "American Association of Textile Chemists and Colorists", also herein incorporated by reference. Typical representatives of these organic color pigments are set forth in the examples herein by way of illustration.

(2) Inorganic Pigments

The term "inorganic pigments" and "inorganic pigment material" as used herein designates the inorganic pigmentary materials both natural and manufactured in origin which are usually described as white or "opaque white pigments". It also includes for the purposes herein the semi opaque white pigments or "transparent white pigments" or "extender or filler pigments".

The invention is generally applicable to such inorganic pigments and is not limited to the use of any particular inorganic pigment or pigments. As illustrative but not restrictive of those that may be used and improved by this invention are the opaque white and transparent white pigments such as are referred to in the Chemical Rubber Handbook 55th edition 1974–1975; herein incorporated by reference; in the 3rd edition (1973) of "The Color Index", Volume 3 published jointly by the "British Society of Dyers and Colourists" and the "American Association of Textile Chemists and Colorists", herein incorporated by reference; and in Volume 1 of "The Pigment Handbook", published by John Wiley and Sons 1973, edited by Temple C. Patton, also herein incorporated by reference.

Among the most useful of the inorganic pigments, but not restrictively, may be listed the siliceous pigments including the natural silica pigments, the precipitated silica pigments, the pyrogenic silica pigments, the alkaline earth silicate pigments, the aluminum silicate pigments, the zinc silicate pigments, the zirconium silicate pigments; the titanium dioxide pigments and pigment compositions; alkaline earth carbonate and sulfate pigments, the alumina and hydrated aluminum oxide pigments, antimony oxide pigments, zinc oxide pigments, zirconium oxide pigments and combinations of any two or more of such pigments. Typical representatives of these inorganic pigments are set forth in the Examples by way of illustration.

(3) Surface Active Agent Material

Among the dispersing and/or emulsifying agents available for use as surface active agents herein we have found that the only essential criterion for such agent is that it, or it in combination with one or more additional dispersants and/or emulsifiers which may be used, should be capable of supporting emulsion polymerization. Having regard to this criterion surface active agents or as they are more generally classified "Surfactants" (which encompasses both grinding, wetting and emulsifying agents) may be either anionic, nonionic, cationic or amphoteric; of either singular molecular structure or polymeric nature; it being understood that when two or more of such agents are employed together they must be compatible with each other. For example nonpolymeric or polymeric anionic surfactants may be combined with each other and with nonionic and/or amphoteric surfactants, polymeric or nonpolymeric; and nonpolymeric or polymeric cationic surfactants may be combined with each other or with nonionic and/or amphoteric surfactants; and amphoteric and/or nonionic surfactants may be combined with each other. Thus it is possible to use a very wide range of commercially available surface active agents for achieving the degrees of grinding, the emulsion polymerization, and the production of intrachromospheruloid pigments as latices suitable for particular uses, as hereinafter exemplified, comprehensive listings of which are set out in the treatises "Detergents and Emulsifiers 1974 Annual" by John W. McCutcheon, published by John W. McCutcheon, Inc., Morristown, N.J., especially under the headings of Emulsifiers Suitable for Emulsion Polymerization, etc., and "Surface Active Agents and Detergents" Anthony N. Schwartz et al, Interscience Publishers, Inc., New York (1958), Vol. 2, pages 153–172, each of which is herein incorporated by reference.

Among the commercially available surfactants may be mentioned the *anionic* surfactants, e.g. carboxylic acids and their derivatives, sulfonic esters, alkanesulfonates, alkylarylsulfonates and phosphate esters; the *nonionic* surfactants, e.g. polyethenoxy ethers of alkylphenols, polyethenoxy ethers of alcohols and mercaptans, difunctional and polyfunctional polyethenoxy esters, miscellaneous polyethenoxy esters, polyethenoxy compounds with amide and miscellaneous linkages and various polyhydroxy compounds; the *cationic* surfactants, e.g. the straight chain alkyl ammonium compounds, the cyclic alkylammonium compounds, the olefin derived compounds, and the quaternary compounds derived from the same; the *amphoteric* surfactants, e.g., those derived from betaines and phenolic solutions; and the *polymeric* surface active agents set out in the said McCutcheon and Schwartz et al treatises. Typical examples of representative surfactants of these classes and combinations thereof are set forth in the Examples hereinafter, it being understood that said Examples are but illustrative and not restrictive of the invention, e.g. the recently available fluorocarbon surfactants have also been found effective, especially when used in small proportions with other less expensive surfactants, for both the micronizing steps and the emulsion polymerization steps. Typical of these fluorocarbon surfactants are the "Zonyl" surfactants of the DuPont Company, such as Zonyl A or P (anionic), Zonyl C (cationic), Zonyl N (nonionic), and Zonyl B (amphoteric).

(4) Micronizing

The term "micronizing" as used herein connotes the physical reduction in particle size in a liquid medium of the organic color pigment materials by means of an appropriate grinding system, e.g. a ball-mill or a sand-mill, to the particle size desired in the step concerned, with the aid of a surface active system if necessary to assist the grinding and inhibit agglomeration of the micronized particles into aggregate particles of larger size. Both ball-mills and sand-mills or sand grinders are well known to the pigment art and commercially available. The balls in the case of a ball-mill, or the sand or like grinding material in the case of the sand-mill, are herein termed micronizing media.

(5) Monomer Materials

The monomer materials which may be used in practicing the present invention are the monomer compounds containing and emulsion polymerizable through one or more ethylenically unsaturated $>C = C<$ groups to form homopolymers, copolymers or grafted polymers to constitute the essentially transparent particles formed about the individual color pigment entities herein.

Such compounds containing and polymerizable through a single one of such groups produce linear polymers unless copolymerized with cross-linking monomer, i.e. monomer containing a plurality of such groups which category for the purpose of this invention, includes not only polyvinyl, polyalkyl and vinyl-allyl monomers but also the drying oil substances emulsion copolymerizable with other ethylenically unsaturated compounds.

The polymer bodies surrounding the pigment particles in accordance with this invention preferably are cross-linked to insolubility in all physical solvents, but may be insoluble only in the intended environment of use. With these criteria for guidance, the monomer materials and emulsion polymerization procedures employable may be selected by one skilled in the art from any of those available.

Among the mono-ethylenically unsaturated monomers available for preparation of the improved pigment composition are monovinyl aromatic compounds such as styrene, the methyl styrenes, the ethyl styrenes, the dimethyl styrenes, the diethyl styrenes, the isopropyl styrenes and mixed alkyl styrenes; nuclear substituted vinyl aryl compounds where the substitution is alkyl, aryl alkyl, aralkyl, cycloalkyl, alkoxy, aryloxy, chloro, fluoro, chloromethyl, fluoromethyl and trifluoromethyl nuclear derivatives; halogenated derivatives and these various aromatic vinyl compounds such as the mono and dichloro styrenes, the alkyl substituted mono and dichloro styrenes; the vinyl naphthalenes, e.g. methyl vinyl naphthalene and their halogenated derivatives; the vinyl aryl acids and vinyl alkyl acids such as acrylic acid and the alpha-alkyl substituted acrylic acids such as methacrylic acid, and esters of such acids as glycidyl, methyl, ethyl, propyl, butyl, isobutyl and other esters of aliphatic alcohols; the amides of acrylic and methacrylic acid and derivatives thereof such as the methacrylamides, acrylamides, N-methylacrylamides, N-N-diethylacrylamide, N-ethylmethacrylamide, N-N-dimethylmethacrylamide, etc.; the nitriles such as acrylonitrile, methacrylonitrile, ethylacrylonitrile, chloroacrylonitrile and other nitriles; the alkyl esters of alpha-ethylenic aliphatic dicarboxylic acids such as diethyl fumarate and diethyl-chloro maleate; the unsaturated ketones, methyl vinyl ketone and methyl isopropenyl ketone; the vinyl pyridines; the vinyl guinolines; vinyl furans; vinyl carbazoles, the esters of vinyl alcohols such as vinyl acetate; acetylamino substituted acrylic and methacrylic acids, and their esters, methyl, ethyl, propyl, and the like such as α-acetaminoacrylate and the α-n-butyraminoacrylates, etc.; the ethers of olefinic alcohols especially the ethers of vinyl and allyl type alcohols such as vinyl ethyl ether, vinyl butyl ether, vinyl tolyl ether, divinyl ether, methyl isopropenyl ether, methallyl ethyl ether; the unsaturated aldehydes such as acrolein and methacrolein and the like; the allyl and vinyl nitrogen ring compounds such as triallylcyanurate; copolymerizable alkenyl chlorides including methallyl chloride, allyl chloride, vinyl trichloride, vinylidene chloride, 1-chloro-1-fluoro ethylene and 4-chlorobutene-1; and the vinylidines.

Among the cross-linking or polyethylenically unsaturated monomers which may be used alone or in combination with other emulsion polymerizable ethylenically unsaturated compounds, are the polyvinyl, polyallyl and vinyl-allyl compounds such as polyvinyl aromatic compounds, for example divinylbenzene, divinyltoluene, divinylxyline, divinylethylbenzene, trivinylbenzene, divinylnaphthalene, divinylmethylnaphthalenes; the vinyl esters, allyl esters and vinyl allyl esters of carboxylic and polycarboxylic acids including polymerizable ester monomers such as diallyl maleate, vinylcrotonate, allyl methacrylate, allyl acrylate, ethylene glycol dimethacrylate, divinylsuccinate, divinyladipate, vinylacrylate, vinylmethacrylate.

The copolymerizable "drying oils" which may be used as cross-linking agents include the unsaturated vegetable oils and the unsaturated fish oils which oils are capable of forming films by oxidation on exposure to air and further includes these oils in their raw state, in bodied from and/or otherwise modified, as by air blowing. The term "drying oil substances" includes (1) the drying oils, especially those containing conjugated unsaturation e.g., tung oil, citicica oil, isano oil, conjugated linseed oil, conjugated soya bean oils, fish oil, etc. (2) the air blown or bodied drying oils, whether from conjugated or non-conjugated drying oils and whether bodied by heat and/or catalytically, (3) the fatty acids including their dimers, trimers and tetramers derived from such drying or modified drying oils.

In preparing modified improved intrachromospheruloid pigment compositions by graft polymerization techniques, active sites may be provided by grafting with butadiene, isoprene, piperyline, methyl pentadiene and/or other hydrocarbon dienes and also the polar dienes such as chloroprene and cyanobutadiene.

(6) Polymerization Initiator

Examples of suitable emulsion polymerization catalysts or initiators that may be used include water soluble catalysts such as the perborates, persulfates and perchlorates of potassium sodium and ammonia; which may be used with or without small amounts of heavy metal salts such as those of iron, cobalt, etc. with or without a reducing agent such as sodium bisulfite or metabisulfite, or the catalyst may be an inorganic peroxide such as barium peroxide, sodium peroxide, hydrogen peroxide; an aliphatic acyl peroxide such as acetyl peroxide, lauryl peroxide, stearyl peroxide; and aramatic acyl peroxide such as benzoyl peroxide, or phthaloyl peroxide; a mixed peroxide such as acetyl benzoyl peroxide, acetyl stearyl peroxide; organic aliphatic and aromatic azo compounds such as azobisisobutyronitrile and certain azo dye structures; or it may be a hydroperoxide such as cumene hydroperoxide or diisopropylbenzene hydroperoxide which is often used with a reducing agent such as tetraethylene pentamine, and ferrous sulfate as a source of iron with sodium or potassium pyrophosphate to complex the iron.

Heat or radiation may also serve to initiate or facilitate emulsion polymerization.

A mercaptan such as dodecylmercaptan may sometimes be used in small amounts as a polymerization initiator, whereas in larger amounts it serves as a polymerization modifier; or aluminum salts such as the halides; organic and inorganic acids; metal compounds of the unsaturated acids such as cobalt and manganese resinates, linoleates and maleates may be used. The catalyst system chosen is only important insofar as it affects the rate of the polymerization reaction, always taking into account that the system chosen must not react unfavorably with the pigment or pigments being used.

(7) pH Adjustment

By pH adjustment is meant the addition of either acid or base to adjust the pH for micronizing to within the desired range which may be most efficient for the purpose in question, e.g. to be compatible with the pigmentary, monomeric, and/or surfactant materials being used. Preferred additives are the organic acids such as acetic, formic, hydroxyacetic to lower the pH, and ammonium hydroxide to raise the pH. Inorganic acids and/or bases may be used provided they do not form objectionable amounts of salts which would interfere with the process or attack the equipment being used.

(8) Polymerization Vessel

By polymerization vessel is meant any suitable vessel equipped with the necessary mechanical stirrer, temperature controls, and apertures for addition of reactants prior and during the polymerization step, constructed of suitable materials such as stainless steel or preferably glass lined to avoid contamination of the polymerization ingredients.

(9) Emulsion Polymerization

By the term emulsion polymerization is meant the polymerization in aqueous medium of polymerizable ethylenically unsaturated monomer or monomers, linear or cross-linking in nature, in such a manner that the polymer formed is a latex.

(10) Latex

By the term latex is meant the aqueous dispersion of the intrachromospheruloid pigment composition in which the intrachromospheruloid pigment particles are so small that they are essentially nonsettling.

(11) Soft Powdering Agent(s)

The term soft powdering agent(s) or additive(s) as used herein connotes materials selected from the class consisting of aliphatic, cycloaliphatic and aromatic hydrocarbons and their alcohols having boiling points between 90° C. and 200° C. preferably the predominantly aliphatic hydrocarbon solvents of this class such as Solvent Naphtha, and Stoddard Solvent. Naphtha Solvent, or Solvent Naphtha is a mixture of low boiling hydrocarbons having a boiling point range of 90°–165° C. obtained in the distillation of coal tar, petroleum or shale oil, and may contain appreciable portions of benzene or its homologues. Stoddard Solvent is a petroleum distillate with a minimum flash point of 100° F., 90% distillable at 375° F. with an end point of 410° F.

In accordance with this invention, said hydrocarbon materials are preferably applied in conjunction with an oil soluble surface active agent. The oil-soluble surface active agent is selected from that class of materials extensively defined by Schwartz, Perry and Berch in their book "Surface Active Agents and Detergents", Vol. II, Interscience Publishers., New York (1958), especially at pages 244–247 and pages 597–605, herein incorporated by reference. Such useful surface active agents include the dialkyl sulfosuccinates, the mahogany sulfonates, long chain (16–18carbon atoms) alkyl aromatic sulfonates, dialkyl naphthalene sulfonic acids, esters of higher fatty acids, higher amine salts of naphthalene sulfonic acids, lanolin, lnolin fatty acids, naphthenic acids and their salts, glycol ethers, acyclic alcohols and keto alcohols, fatty alkylol amides and the sorbitan and polyethenoxy sorbitan nonionics.

(12) Soft Powder Products

The term "soft powder" or "soft Powdered" intrachromospheruloid/inorganic pigment as applied to products producible by the present invention connotes the physical characteristic resulting from the treatment herein disclosed of the aqueously wet, never previously dried, cross-linked insoluble intrachromospheruloid/inorganic pigment with the aforesaid soft powdering agents before drying the same to a dry pigment product, i.e. the characteristic that the soft powdered dried product has such a soft form that it is in, or readily reduced to, a fine soft powder without any extended attrition, thereby being more readily dispersible in any medium than the same product not so treated. The mechanism accounting for this characteristic is not clearly understood, but it is believed that the hydrocarbon components of the soft powdering additives, which are carried on to the surfaces of the intrachromospheruloid/inorganic pigment particles by means of the oil suluble surfactant components thereof subsequently removed in the wash water, inhibit hydrogen bridging between the intrachromospheruloid/inorganic pigment particles by occupying the sites at which such could occur until after the elimination from the system of the aqueous phase, and thereafter are substantially removable at a more elevated temperature when their presence is not desired in the soft powdered product.

(13) Coagulant

By coagulant we mean any additive capable of destablizing the emulsified system under consideraion, for causing coagulation of its solids content; the coagulant used will of course vary depending largely on the type of system, i.e. the type of surfactant used and/or the funtionality, if any, of the intrachromospheruloid polymer. For example, anionic systems may be coagulated with either acids such as acetic or formic, hydrochloric, sulfuric, alkaline earth metal salts, zinc and aluminum and other colorless ions of heavy metals, water soluble alcohols, or water insoluble amines preferably as their water soluble salts. Cationic systems may be coagulated with water insoluble acids, preferably as the water soluble alkali metal salts thereof and/or the water soluble amines thereof, and ammonium hydroxide or water soluble alcohols. Nonionic systems are often coagulated with water soluble alcohols with or without the addition of acids. Anionic latices of intrachormospheruloid pigment may also be coagulated by combining therewith cationic latices or substrate material surfaced with cationic polymer, and vice versa.

(14) Pigment Bonding Agents

The inorganic pigment material may be modified either physically or chemically by the addition or incorporation of modifying agent material during either the micronizing or polymerization steps or both.

Pigment bonding agents which may be used to aid fixation of the inorganic pigment to organic polymeric material may be inorganic, e.g. a water soluble alkali metal silicate or a water soluble titanium compound for example, titanium tetrachloride or oxychloride. Alternatively they may be organic, e.g. an aqueous dispersion of a water soluble organic condensation resin such as an aminoplast or a phenoplast, which may be formed in situ by sequential addition of aqueous solutions or reactants for forming such resins. By reactants which form aminoplastics or aminoplasts we mean area, melamine, thiourea and quanidine, etc., condensed with formaldehyde, glyoxal, etc. By reactants to form phenoplasts we mean phenol and/or substituted phenolic alochols such as the cresols, xylenols and/or resorcinol, etc., condensable with formaldehyde and/or higher aldehydes such as glyoxal or furfural, etc. We use the term phenoplasts in the same manner as used by T. S. Carswell in his book entitled "Phenoplasts. Their structure, Properties and Chemical Technology," published in 1947 by Interscience Publishers, Inc., New York, N.Y. We use the term aminoplastics in the same manner that C. P. Vale uses theis term in his book entitled, "Aminoplastics," published in 1940 by Cleaver-Hume Press, Ltd., London, England.

Or a bonding agent may be ethylenically unsaturated monomeric material to be adsorbed and/or absorbed by the inorganic material during the micronizing step, and then polymerizing said added monomer material with the aid of a polymerization initiator.

Also the water soluble organo-silane compounds, e.g. Z6020 Silane available from Dow Chemical Company may be used.

Bonding agents which may be used to aid the substantivity of the inorganic to the organic phase by chemical bonding include aqueous solutions or dispersions or organic polymers depositable on the inorganic pigment material and containing carboxy, amine, sulfate, and/or sulfonic acid groups, salts thereof, and nitrogenous containing material such as oleophilic amines, oleophilic imines, oleophilic amine carboxylates, oleophilic quaternary ammonium compounds, water soluble polyamines, water soluble imines and combinations thereof may also be used.

(15) Nitrogenous Material

By the term "nitrogenous material" we mean organic nitrogen containing material selected from oleophilic amines such as the primay and secondary amines derived from fatty acids such as cocoanut, soya, oleic and tallow such as are manufactured by Armak under the trade names "Armeens" and "Duomeens" as well as the carboxylate and acetate slats thereof e.g. "Armac" and "Duomac"; the quaternary ammonium compounds e.g. "Arquad" and the "Monoaquats" quaternized derivatives of substituted imidazolines manufactured by Mona Industries; polyamines such as tetraethylenepentamine; and water soluble imines and polyimines such as ethylenimine, 1,2-propylenimine, 2,3-butlenimine, 1,2-butylenimine and others as may be represented by the general formula

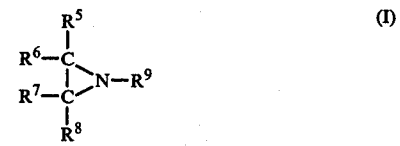

wherein $R^5$, $R^6$, $R^7$ and $R^8$ each represent hydrogen atom or an alkyl radical, $R^9$ represents hydrogen atom, an alkyl radical, an acyl radical or a group of one of the following three formulae:

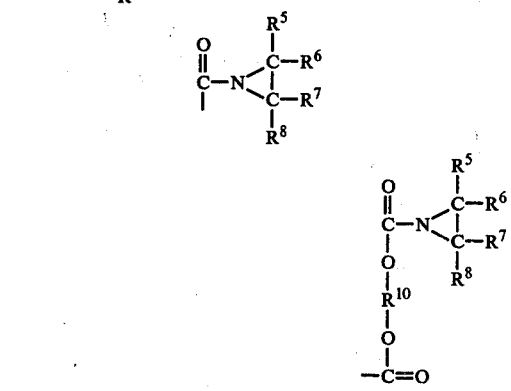

wherein $R^{10}$ is an alkylene radical
or the water soluble polyethylenimines such as are manufactured by Dow Chemical Company under the trade name of PEI 6, PEI 18, PEI 600.

(16) Pigment Modifying Agent

The organic pigment material and/or intrachromospheruloid/inorganic pigment material may be modified either physically or chemically by the addition or incorporation of modifying during or following the micronizing step. For example the modified may be a bonding agent to aid in bonding the organic pigment particles in the polymer spheruloids, or to aid the fixation of the intrachromospheruloid material to the inorganic component of the composition. The modifying agent may comprise one or more of those substances which can be employed, although not essential to the process, to obtain certain specific advantages or modifications to the process or products thereof. Such substances may include nitrogenous material such as water soluble or insoluble amines, imines and polyamines and polyimines, added to the organic color pigment during the micronizing step to render it more oleophilic, and/or water soluble or dispersible condensation resin products or the components thereof, added during the micronizing or subsequent steps.

(17) Separation by Screening

Separation by screening, or conventional screening where employed in the Examples herein, connotes that the micronized color pigment is washed away from the micronizing medium and the screen with diluting liquid or a part thereof.

(18) 50% Divinylbenzene

The term 50% divinylbenzene as used herein denotes the commercially available product regarded as an approximately equal mixture of divinyl and mono-vinyl materials.

(19) Sub-pigmentary

The term sub-pigmentary as used hereinafter denotes organic color pigments reduced to an average particle size of 0.2 micron or less in diameter which size is well below the conventional optimum pigmentary range, as heretofore noted.

(20) Microscopic Examination

The term microscopic examination as used in the Examples hereinafter denotes examination with an optical microscope, i.e. a Leitz "Ortholux" research microscope, which is regarded as having a resolving power of 0.2 micron and a lower limit of visibility for well separated particles of 0.02 micron diameter, and average particle sizes herein set forth were determined accordingly.

In the examples given hereinafter, a particular point of distinction between the preferred crosslinked embodiments of the invention and the less preferred non-cross-linked embodiments is that the cross-linking renders the spheruloids not only insoluble in physical solvents, but also nonfusible. Thus the preferred embodiments are particularly adapted for coloring plastic melts before extrusion, as the infusibility assures integrity of the spheruloids under extrusion temperatures and insures against any alteration of the flow characteristics of the melt, which may be caused by softening of the spheruloids in the case of the less preferred embodiments. In addition, the cross-linking of a polymer increases its density and thus increases its refractive index to a degree. Therefore the cross-linking, as well as the choice of monomer materials used, aids in adapting the product to have the necessary difference in refractive index from that of a vehicle in which it is intended to be used, particularly when the vehicle has a density or refractive index only slightly below that of the corresponding noncross-linked spheruloids.

Whether the spheruloids are cross-linked or non-cross-linked, their uniformity in size and spheruloidal nature particularly adapt them for use in electrostatic coating systems, and by controlling the polymerization conditions as above exemplified the size of the spheruloids may be maintained within specified limits adapting them for gloss or matte finishes or for special purposes as desired.

DESCRIPTION OF PREFERRED EMBODIMENTS

BRIEF DESCRIPTION OF DRAWINGS

In the accompanying drawings illustrative of preferred embodiments of the invention:

FIGS. 4 to 7 are process flow diagrams showing procedures employable for processing the slurry of FIG. 3 to recover the intrachromospheruloid/inorganic pigment composition in various other forms.

GENERAL PROCEDURE

Figure 1:
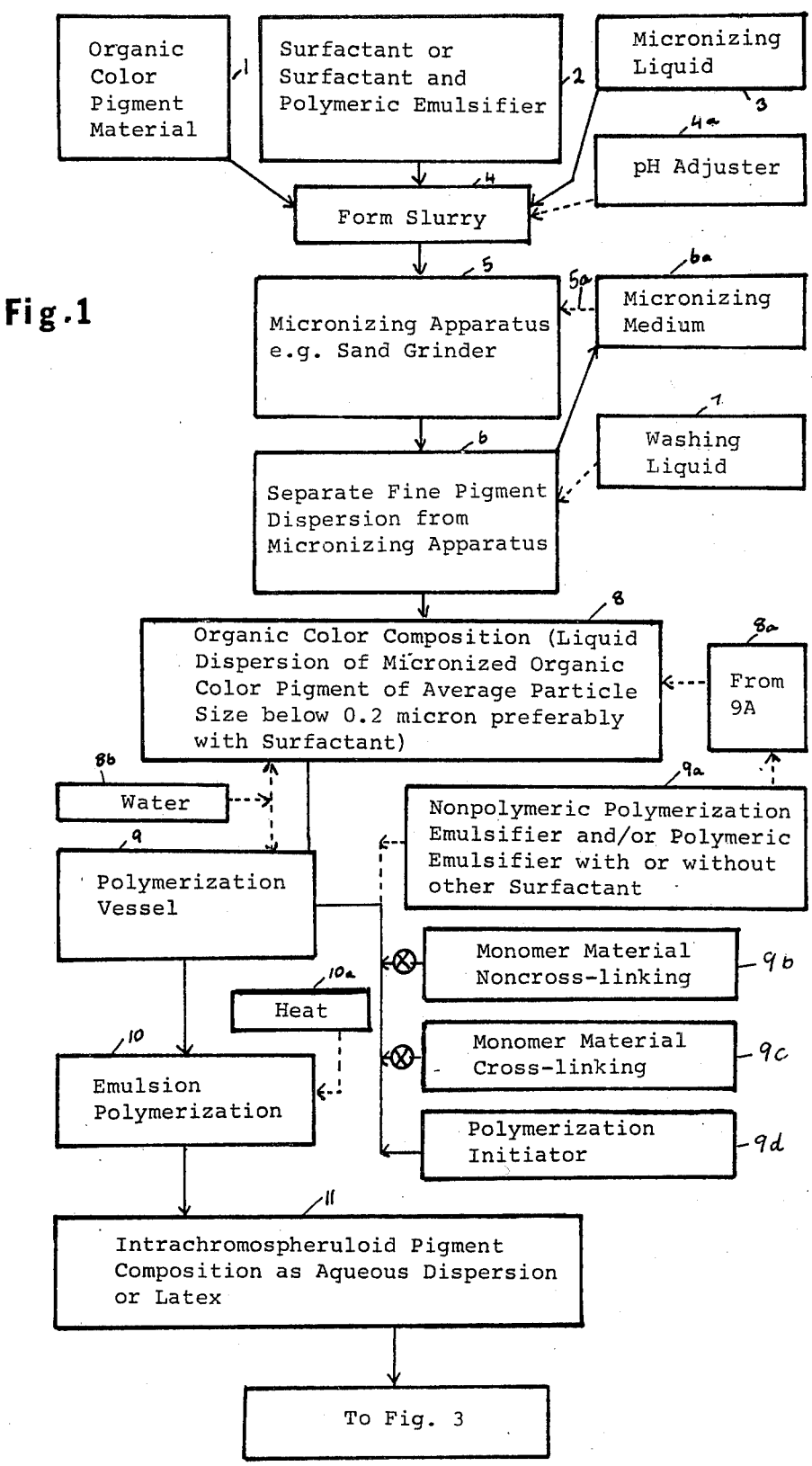
FIG. 1 is a process flow diagram of the procedure for production of the intrachromospheruloid pigment in latex form.

The general procedures for preparing intrachromospheruloid pigments in accordance with the process of the invention, are illustrated in the drawings. In these procedures, as shown in FIG. 1, (a) an organic color pigment composition 8 is first provided consisting essentially of liquid having dispersed therein micronized organic color pigment essentially insoluble in the said liquid.

When an aqueous micronizing liquid 3 is employed, it comprises surface active agent material 2 which stabilizes the dispersion of the micronized color pigment in said aqueous phase, in which the organic color pigment is so finely divided as to have an average particle size below the usual pigmentary range. As shown in FIG. 1 the micronizing may be accomplished by charging to a micronizing apparatus 5, e.g. a ball-mill or preferably a sand grinder, a slurry 4, of organic color pigment material 1 with sufficient surfactant or surface active agent material 2 to stabilize the dispersion to be produced. The charge of slurry 4 is then micronized as at 5 until the pigment particles are so finely divided that the average particulate entities thereof have an average particle size of less than 0.2 micron, and preferably of less than 0.02 micron. In this aqueous micronizing procedure the ratio of organic color pigment material to water to obtain efficient grinding should be in the range of 20:80 to 30:70 and the ratio of surface active agent material to water should be in the range of 5:95 to 20:80 parts by weight or even more. Applicable ratios are subject to variation depending on the particular organic pigment material and/or surface active agent material concerned, are not highly critical, and may be optimized empirically.

The separated organic color material composition 8, with or without added surface active agent material 8a (which may be provided at this stage if desired, especially if the dispersion is to be stored for a substantial time before further processing) is then ready for the next step of the procedure.

When a nonaqueous micronizing liquid 3 is employed, the present invention contemplates use as such liquid of a part or all of the ethylenically unsaturated monomer material to be employed in the polymerization step 10 with or without added volatile organic solvent miscible with the monomer material should such be desirable as diluent. In such instance the amount of surface active agent material 2 employed in the micronizing step 5 can be reduced to zero, or a part or all of the surface active agent or emulsifier to be used in the emulsion polymerization may be present during the micronizing step. Generally the same considerations as to proportions of liquids to solids and empirical practices apply whether the medium be aqueous or nonaqueous. Obviously, when micronizing in flammable material the temperature and the conditions of grinding, such as maintenance of an inert atmosphere and use of explosion-proof electrical equipment, must be controlled in the interests of safety. When it is desirable to employ a wash liquid 7 for removing fine pigment dispersion from the micronizing medium, it is desirable to use a washing liquid which is employed as a component in the polymerization 10. When such a nonaqueous micronizing system is employed the micronized color pigment material 6 is then emulsified at 8 with the aid of water 8b and surface active agent material 8a capable of supporting emulsion polymerization to form an organic color composition 8 containing therein sufficient organic color pigment, surface active agent material, monomer material and water to form an emulsion polymerization composition which is charged to the polymerization vessel 9. Should it be more convenient the necessary water 8b and emulsifier material 8a may be charged directly to the polymerization vessel 9 and the nonaqueous organic color composition 8 added thereafter.

Preferably in either of the above procedures the degree of micronization is monitored during step 5 by microscopic examination of samples of the micronized slurry to determine when the necessary organic color pigment particle size has been attained, at which time the organic color composition 8 is separated from the micronizing medium 6a, e.g. sand, which may be recycled as at 5a to the micronizing apparatus employed to carry out the micronizing step 5.

In the next step the finely divided pigment entities in said composition 8 are converted into intrachromospheruloid pigment by forming about said organic color pigment entities bodies of essentially transparent polymer of not over 4 microns in particle size diameter. To accomplish this step the organic color pigment composition 8 is charged to a polymerization vessel 9 with sufficient surface active agent material 9a (additional to that supplied at 2 or at 8a), if necessary, to provide a total content of surface active agent material appropriate for the emulsion polymerization of monomer material, e.g. 9b, with the aid of an emulsion polymerization initiator 9d, which materials are also charged to the polymerization vessel. Sufficient monomer material is charged so that when polymerized to the desired conversion, usually 100% conversion, the ratio of the organic pigment content to the polymer content of the intrachromospheruloid pigment will be in the range of 1:100 to 20:1 (preferably 1:10 to 4:10). As indicated at 10a heat may be supplied to expedite the polymerization 10, as is well known to those skilled in the emulsion polymerization art. By such procedures the conversion step (b) produces, from the micronized organic pigment material and monomer material supplied, an essentially stable aqueous dispersion, i.e. latex, of intrachromospheruloid pigment 11, which is further processed as hereinafter described to produce the intrachromospheruloid/inorganic pigment material.

Figure 2:
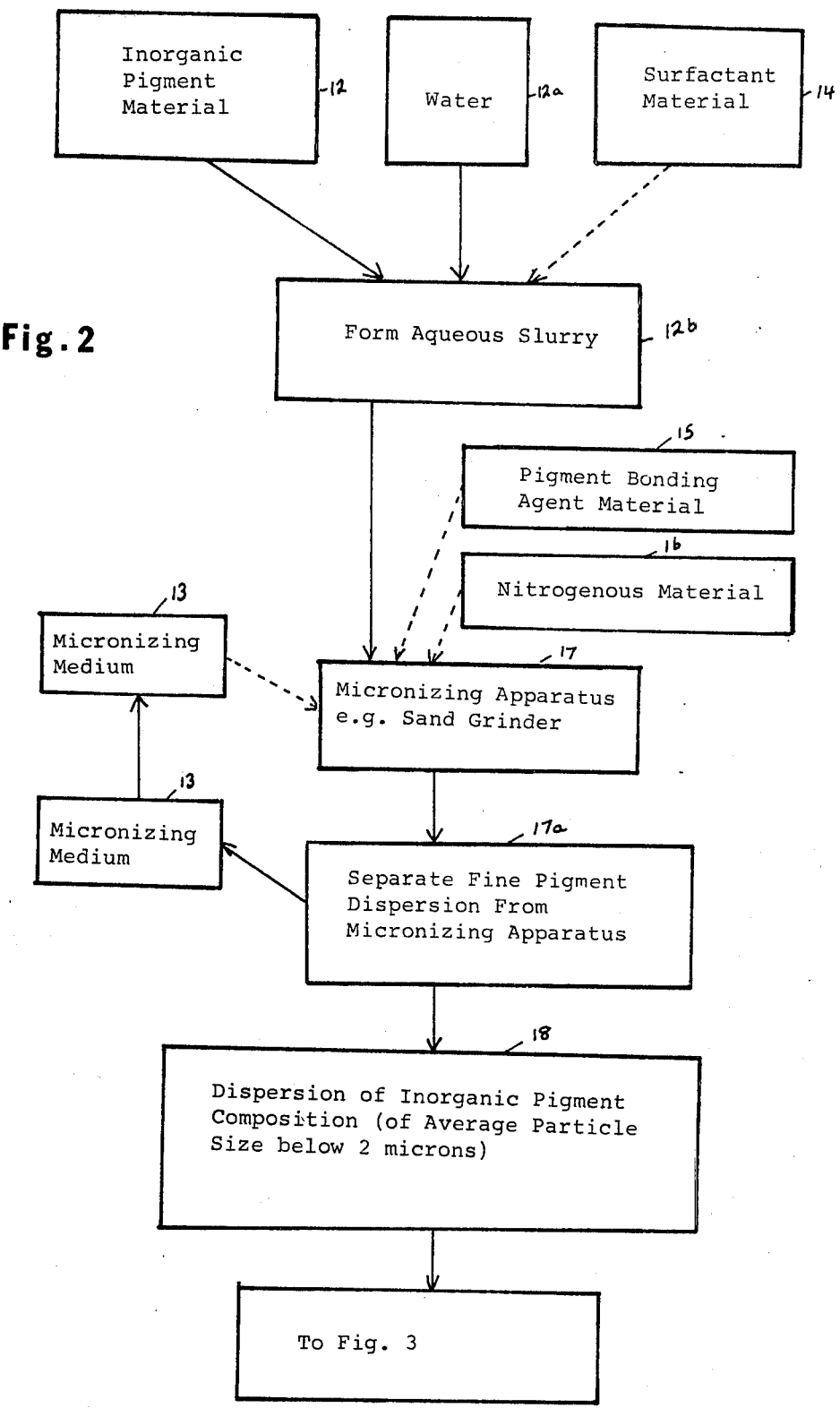
FIG. 2 is a process flow diagram of the procedure for production of the inorganic pigment composition in aqueous dispersion.
Figure 3:
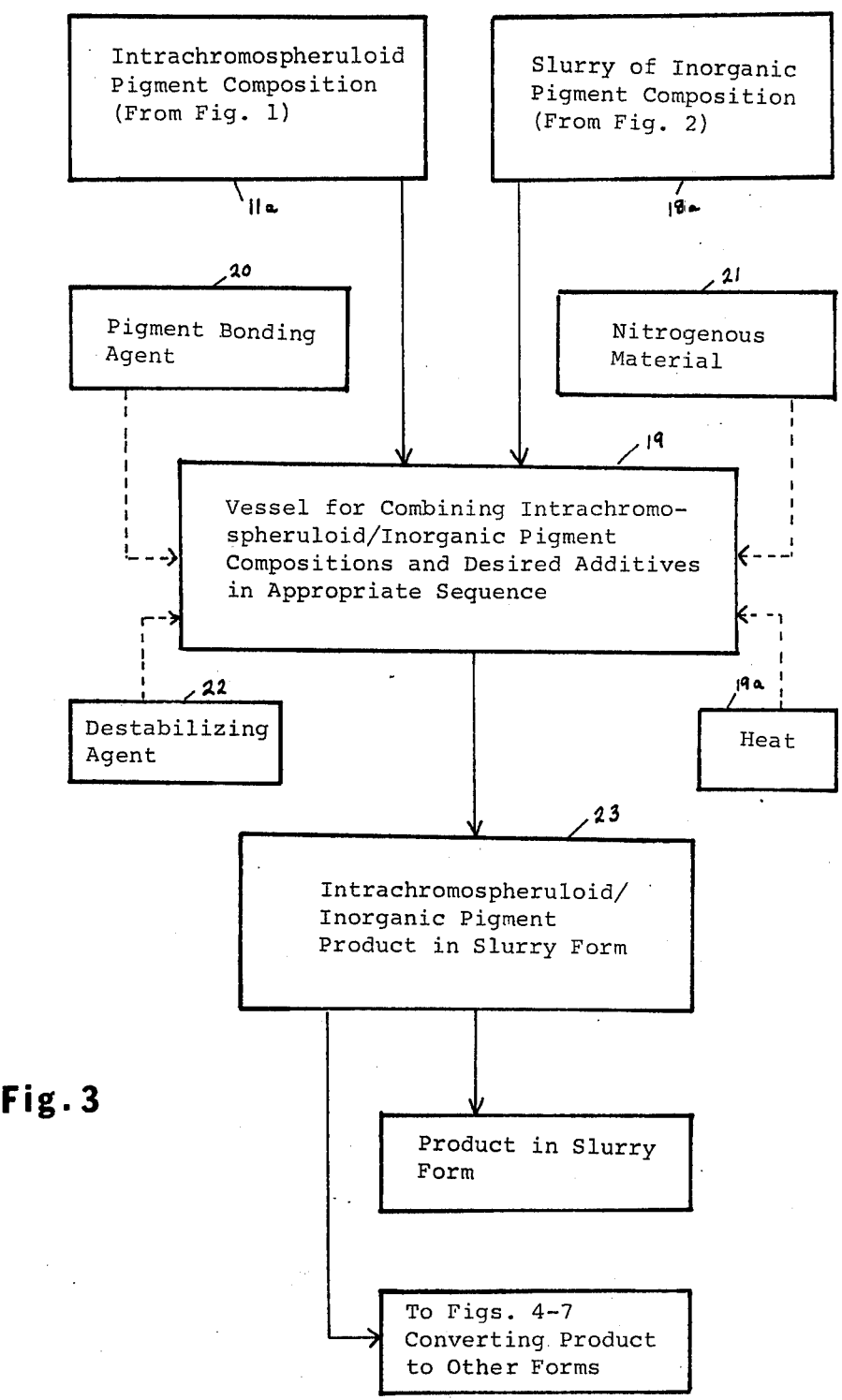
FIG. 3 is a process flow diagram of the procedure for combining the intrachromospheruloid pigment latex with the inorganic pigment composition dispersion, and recovering the pigment combination in slurry form.

In FIG. 2 an inorganic pigment composition 18 is provided consisting essentially of water having dispersed therein inorganic leuco pigment material the individual particulate entities thereof having been reduced in size until the primary particles thereof are of an average diameter less than 2 microns. This is accomplished as shown in FIG. 2 by charging to a micronizing apparatus 17 e.g. a sand-mill, colloid mill or ball-mill, a slurry 12b of inorganic pigment material 12 with sufficient water 12a to facilitate the dispersion and/or grinding and sufficient surface active agent material 14 to stabilize the dispersion so produced together with sufficient micronizing or dispersion medium 13 as may be required to effect particle size reduction. The charge of slurry 12b is then subjected to limited micronizing or dispersion as at 17 sufficient to produce a dispersion of inorganic pigment material 18 within the limits and range of primary particle size as desired and required for combination with the intrachromospheruloid pigment material as shown in FIG. 3. In this limited micronizing process the ratio of surface active agent material 14 to inorganic pigment material 12 may be from 0 to 150 parts by weight per 100 parts of inorganic pigment material employed, depending on the end use of the intrachromospheruloid/inorganic pigment composition and usually will be from 0 to 5 parts per 100 parts of inorganic pigment material.

During this micronizing or dispersing step 17 there may also be incorporated if desired additional chemical components such as pigment bonding agent material 15 and/or nitrogenous material 16 should it be desired to incorporate the same during step 17.

The dispersed or micronized inorganic pigment composition 17 is then separated by conventional means 17a e.g. screening, from the dispersion medium to yield a product 18 ready for combination with the intrachromospheruloid pigment produced as shown in FIG. 1.

In FIG. 3 combination is effected in an agitated reaction vessel 19 of the aqueous dispersion of intrachromospheruloid pigment 11 produced in FIG. 1 and the aqueous dispersion of inorganic pigment 18 produced in FIG. 2. Preferably although not essentially the aqueous inorganic pigment composition 18 is first charged, followed by the intrachromospheruloid pigment composition. In any event the aqueous dispersion of the two components is formed as shown at 19. Depending on the type and tinctorial strength of the intrachromospheruloid/inorganic pigment being manufactured it is understood that the combination of said components may be in a weight ratio range of from 1:100 to 100:1 dry basis. Also depending on the chemical nature of the two components 11 and 18, that is to say the presence of reactive chemical groups therein, the intrachromospheruloid/inorganic pigment composition may then be removed as at 23 with or without the assistance of heat as provided at 19a to give the intrachromospheruloid/inorganic pigment in aqueous slurry form. Or additional components such as pigment bonding agent material 20, nitrogenous material 21 and/or destabilizing agent 22 may be added to the combination reaction vessel 19 with or without the aid of heat 19a to produce the product 23.

In FIGS. 4, 5, 6 and 7 are shown various procedures employable to convert to other forms the intrachromospheruloid/inorganic pigment composition 23 produced in FIG. 3.

FIG. 4 shows the isolation of the composition by drying the slurry 23 as e.g. spray drying the slurry formed by combining 11 and 18 and preferably with 20, of FIG. 3, with or without 21 and/or 22 therein, to produce the pigment product in dry powdered form.

FIG. 5 shows how the aqueous slurry 23 when its polymer is cross-linked to insolubility may be treated as at 24a, prior to the drying step, with a soft powdering additive 24, and if desired, heat 24d, to produce the pigment product after drying, e.g. spray drying at 24b in dried soft powdered form 24c.

FIG. 6 shows how the aqueous slurry 23 may be coagulated as at 25a, with the aid of a coagulant 25, and if desired heat 25d, to provide a product that can be readily separated from the serum as at 25b e.g. by filtration and washing to produce the pigment product in wet presscake form 25c; or this wet presscake 25c may be further processed as at 25e by drying as e.g. spray drying to produce the pigment product is dried form as at 25f.

FIG. 7 shows how the aqueous slurry 23 when its polymer portion is cross-linked to insolubility in physical solvents, may be coagulated as at 26a with the aid of a coagulant 26, and with the further addition of a soft powdering additive 27 and if desired heat 26d. This soft powder treated product may then be processed as at 26b by separating from the serum, e.g. by filtration and washing to produce the soft powdered treated pigment product in wet presscake form 26c. Or this wet presscake 26c, which is essentially free of water soluble salts and diluents may be further processed as at 26e by drying as e.g. spray drying, to produce the pigment product in dried soft powdered form 26f, or if desired, the coagulated product 26a may be dried as at 26e as e.g. by spray drying to provide the pigment product in dried soft powdered form 26f.

Such dry soft powder intrachromospheruloid/inorganic pigment products are especially suited for coloration of thermoplastic and oil based paints and printing inks. When the products are retained in the wet aqueous state they show exceptional coloration and opacifying properties in aqueous based systems as in paper coloration, latex paints and similar usages.

DETAILED DESCRIPTION

Bearing in mind the foregoing, examples are herein set forth illustrative but not restrictive of the invention, and of the best modes known to Applicants for producing the same, the first group of Examples A-H setting forth detailed procedures for the preparation of preferred embodiments of the invention in various forms; the tabulated Examples of Tables 1-15 further exemplifying the preferred mode of practicing the invention for producing the product in various forms; the Examples of Tables 16-30 further exemplifying the less preferred modes of practicing the invention; and Examples 1 et seq. illustrating modifications and variant forms of the preceding Examples.

EXAMPLES A-H
DETAILED STEP-WISE PROCEDURES FOR PRODUCING INTRACHROMOSPHERULOID/INORGANIC PIGMENT COMPOSITIONS

Example A (Soft powdering procedure)

Step A 100 grams of Phthalocyanine Heliogen Blue BG presscake (Pigment Blue 15, CI 74160) containing 35% dry pigment were charged to a sand mill together with 150 ml. of water, 2 grams of Duponol ME (sodium lauryl sulfate), 2 grams of Tamol SN (condensed naphthalene sulfonic acid, sodium salt), and 5 grams of Tamol 731 (sodium salt of a polymeric carboxylic acid), together with 300 volumetric parts of Ottawa sand. The charge was milled until a representative sample under microscopic examination showed essentially all of the organic color particles to be below 0.2 micron in diameter. At this point 10 grams of dimethylaminoethylmethacrylate were added and the milling continued for a further three to four hours to imtimately mix and disperse said monomer with the organic color particles. Microscopic examination of a representative sample at this point showed essentially all of the organic color particles to be below 0.2 micron in diameter.

The microground organic pigment composition was then separated from the grinding medium by conventional means e.g. screening and charged to a reaction vessel equipped for emulsion polymerization together with 20 grams of Duponol ME (sodium lauryl sulfate) dissolved in sufficient water to adjust the total volume of the charge to 500 ml. The vessel was purged with nitrogen and 90 grams of a monomer mixture containing 70 grams of styrene and 20 grams of 50% divinylbenzene, the whole having dissolved therein 3 grams of azobisisobutyronitrile, were added and the system purged with nitrogen. The temperature of the reaction vessel was rapidly raised to 75-80° C. and held at that range for 4 to 5 hours.

On cooling an intensely colored, bright blue intrachromospheruloid pigment latex was obtained.

Step B 100 grams of a titanium dioxide pigment material, TiPure LW as a dry powder, was charged to a sand milling apparatus together with 50 grams of reinforcing grade silica pigment, HiSil 233 together with 5 grams of Duponol ME (sodium lauryl sulfate), and sufficient water to reduce the inorganic pigment solids content to between 15 and 20%. The charge was milled until a representative sample under microscopic examination showed essentially all the particles were below 2 microns in diameter.

The inorganic pigment composition was separated from the grinding medium by conventional means e.g. screening and placed in a reaction vessel equipped with temperature controls and means for producing turbulent agitation and the volume adjusted to 1500 ml. with water.

Step C

The intrachromospheruloid pigment latex produced in Step A was then run into the inorganic pigment dispersion of step B with agitation, followed by 10 ml. of a 10% aqueous solution of tetraethylenepentamine. The mixture was stirred for 10 minutes and then acidified to a pH of 5 to 5.5 with 30 ml. of glacial acetic acid, causing the entire charge to coagulate as a finely divided intrachromospheruloid/inorganic pigment composition. 40 ml. of a 20% solution of a dioctyl ester of sodium sulfosuccinate in Solvesso 140 were then run in and the charge heated with turbulent agitation to 75-80° C. during 2-3 hours and held at that temperature for 4 hours. The product was then filtered and washed to yield an intensely colored bright blue intrachromospheruloid/inorganic pigment composition which may be retained in a wet presscake form for use in aqueous systems or may be dried by any conventional methods e.g. spray drying, oven drying, to yield the product in soft powder form for use in coloration of nonaqueous systems such as oil based paints, thermoplastics and related areas. Microscopic examination of the intrachromospheruloid/inorganic pigment composition showed no separation of the components, that is to say all particles were evenly colored and appeared as individual color pigment entities.

Example B (Specific particle size range of inorganic pigment material)

The procedures given in Example 1 were followed with the exception that in step B the micronizing of the inorganic pigment composition was continued until microscopic examination revealed that all particulate inorganic material was essentially within the range of 0.1 to 2.0 microns in diameter, useful as in the preceding example.

Example C (Sequential addition of monomer material)

The procedures given in Example A were followed with the exception that in step A the monomer material was sequentially added; the first 50 gram portion being added at the start of the polymerization and the remaining 40 grams being added in two 20 gram portions at intervals of 2 hours from the start of the polymerization i.e. after the reaction temperature of 75-80° C. has been reached; the reaction being terminated 3 hours after the last addition of monomer material. The product was similarly useful.

Example D (Soft powdering and coagulation with organic base)

Step A

An intrachromospheruloid pigment dispersion was prepared according to the procedure outlined in Table 3, Example 2.

Step B 60 grams of a Titanium Dioxide pigment TiPure R900 were charged to a ball mill together with 300 ml. of water, sufficient grinding medium to grind the charge and 10 grams of Monaguat TIBC (a substituted imidazoline quaternized with benzyl chloride). The charge was ball milled for 24 hours during which period 20 grams of titanium tetrachloride were introduced slowly maintaining the temperature of the charge below 20° C. by means of external cooling. Microscopic examination of a representative sample at the end of this period showed no particulate inorganic pigment material greater than 2.0 microns in diameter.

The inorganic pigment suspension was discharged into a reaction vessel equipped with temperature controls, external heating means and apparatus for inducing turbulent agitation and diluted to 1000 ml. volume with water.

Step C 400 ml. of the intrachromospheruloid product from step A were run in with agitation followed by a slurry of 40 grams of a reinforcing grade silica pigment, HiSil 233 in 500 ml. of water containing 10 parts of a 10% aqueous solution of Monoquat TIBC. The composition slurry of intrachromospheruloid pigment/titanium dioxide pigment/silica pigment material was allowed to stir for 10 minutes at ambient temperature and then external heating was commenced. At the same time sufficient dilute ammonium hydroxide was run in to adjust the pH of the charge to between 9.5 and 10.0 followed by 40 ml. of a 20% solution of diamyl sodium sulfosuccinate dissolved in Solvent Naphtha.

Heating was continued over a period of 3-4 hours with turbulent agitation until the reaction temperature was between 75-80° C., and it was maintained at that temperature range for a further 3 hours.

The intrachromospheruloid/inorganic pigment composition was then filtered, washed free of water soluble salts and the presscake pigment material either retained as such for use in coloring aqueous systems such as latex paints paper in the beater; or dried by any convenient appropriate means, e.g. spray, oven drying, to produce a bright blue intrachromospheruloid/inorganic pigment in soft powder form.

Example E (Coagulation by reaction of anionic and cationic groups on the surface active agents employed)

Step A

An intrachromospheruloid pigment dispersion was prepared according to the procedure outlined in Table 2-5.

Step B

An inorganic pigment dispersion was prepared by ball milling together 40 grams of Titanium Dioxide pigment, TiPure LW (DuPont) and 30 grams of a paper grade silica pigment, HiSil 404 together with 20 grams of Duponol ME (sodium lauryl sulfate) and sufficient water to bring the inorganic pigment solids content to around 20%. The dispersion was ball milled until a representative sample under microscopic examination showed all of the titanium dioxide particles to be below 0.2 micron in diameter.

Step C

The product from step B was removed from the ball mill to a suitable reaction vessel as heretofore described and diluted to 1200 ml. volume with water. During one half an hour the product from step A was run in with continuous stirring. The admixture of the two dispersions causes the precipitation of the intrachromospheruloid/inorganic pigment combination due to the opposing nature of the surface active agent material employed in step A (cationic) and step B (anionic). When addition and precipitation were complete the product was heated with turbulent agitation to 75-80° C. during 2 hours, subsequently filtered, washed free of water soluble contaminants and dried to yield a dark green intrachromospheruloid/organic pigment product.

Example F (Coagulation by reaction of anionic and cationic polymeric surface active agents employed)

Step A

An intrachromospheruloid pigment was prepared by charging 55 grams of Phthalocyanine Heliogen Green A presscake (Pigment Green 7, CI 74260) containing 20 grams of dry solid pigment and 20 grams of azamethine Irgazin Yellow 3RLT, (Pigment Yellow 110) to a sand grinding apparatus together with 2 grams of Tamol SN (sodium salt of a condensed naphthalene sulfonic acid), 200 grams of a 10% aqueous solution of the ammonium salt of a copolymer of styrene, methacrylic acid and acrylonitrile, ratio 25/65/10, with sufficient grinding medium to effect micronization. The charge was milled until a representative sample under microscopic examination revealed that the average size of the particulate organic substance thereof was less than 0.2 micron. After separation from the grinding medium by conventional means e.g. screening, the organic pigment dispersion was charged to a reaction vessel equipped for emulsion polymerization together with 100 grams of a 10% aqueous solution of Duponol ME (sodium lauryl sulfate) and the volume adjusted to 500 ml. with additional water as required. The system was purged with nitrogen and a monomer solution containing 80 grams of styrene monomer, 20 grams of 50% divinylbenzene having 3 grams of azobisisobutyronitrile dissolved therein, was added. The temperature was raised rapidly with agitation to 80° C. and held at this temperature for four hours.

Step B 50 grams of a Titanium Dioxide pigment, (Unitane OR 600) manufactured by American Cyanamid, were charged to a ball mill together with 30 grams of a paper grade silica, (HiSil 404), manufactured by PPG Industries, 5 grams of Duomac T (N-tallow trimethylene diamine diacetate) and 100 grams of a 10% aqueous solution of a homopolymer of 4-vinyl-pyridine, together with 400 ml. of water and sufficient water to adjust the pH to between 4 and 5. The charge was ball milled until a representative sample under microscopic examination showed essentially all of the particulate inorganic pigment material to be between 0.2 and 0.5 micron in diameter. The inorganic pigment dispersion was separated from the grinding medium by conventional means e.g. screening and placed in a reaction vessel equipped with temperature controls, external heating and apparatus for producing turbulent agitation, and diluted to 1000 ml. with water.

Step C

The intrachromospheruloid pigment material produced in step A was slowly added to the inorganic pigment composition of step B with rapid agitation. Precipitation of the intrachromospheruloid/inorganic pigment composition occurred almost at once due to the reaction between the anionic polymeric surface active agent material present in the intrachromospheruloid pigment dispersion and the cationic polymeric surface active agent present in the inorganic pigment slurry. After the addition of the two dispersions was completed, the temperature of the reaction vessel was raised to 75–80° C., with turbulent agitation, during 2 to 3 hours and held there for 3 hours. The bright green intrachromospheruloid/inorganic pigment composition so produced may be spray dried, or it may be filtered, washed with dried by conventional means e.g. oven drying, for use in oil based vehicles.

Microscopic examination of the product revealed it to consist of bright green uniformly colored spheruloid particles below 0.5 micron in average particle diameter, with no evidence of separation of the components.

Example G (Aminoplast as pigment bonding agent)

The procedure of Example A was followed with the exception that in step C was added, prior to the acidification, an aqueous solution containing 15 grams of urea and stirred for 10 to 15 minutes. 50 grams of a 37% solution of formaldehyde were then run in and the reaction mixture stirred at room temperature for 2 hours. The acidification and the following steps outlined in Example A, were then followed to yield an intrachromospheruloid/inorganic pigment composition having reactive condensation resin material adsorbed therein, useful for textile printing formulations.

Example H (Polyimine as pigment bonding agent)

The procedure of Example G was followed with the exception that in step C in place of the aminoplast condensation resin components, was added 30 grams of a water soluble polyethylenimine, PEI 18 (manufactured by Dow) to yield an intrachromospheruloid/inorganic pigment composition containing polyethylenimine therein, said intrachromospheruloid/inorganic pigment composition having enhanced affinity for cellulosic materials by reason of said polyethylenimine.

For further exemplification of the wide range of combinations of organic color pigment material, surface active agent material, ethylenically unsaturated monomer material, inorganic leuco pigment material and pigment bonding agent material which may be employed in practicing the invention, reference is made to the following Examples presented in tabular form. These Examples further illustrate how it is possible to build into the intrachromospheruloid/inorganic pigment combinations so produced, useful and desirable physical and chemical properties by variations in procedure during the manufacturing steps. Intrachromospheruloid/inorganic pigment compositions may thus be readily manufactured with functional chemical groups by selection of the ethylenically unsaturated monomers employed and/or the choice of surface active agent material and pigment bonding agent material used.

TABLES 1–7

Preparation of Intrachromospheruloid Pigment Component Using Cross-linked Polymer Combinations.

TABLE 1

Preparation of Intrachromospheruloid Pigment (parts by weight)

| Example No. 1 | 1 | 2 | 3 | 4 | 5 |
|---|---|---|---|---|---|
| A. Micronizing Step | | | | | |
| 1. Pigment Class | Dioxazine | Phthalocyanine | Vat | Cond. Azo | Quinacridone |
| Trade Name | Carbazole Violet | Heliogen Blue BG | Indanthrene Pink R | Chromoptal Red BR | Magenta |
| Color Index Name | Violet 23 | Blue 15 | Red 1 | — | Red 122 |
| Color Index Number | 51319 | 74160 | 73360 | — | — |
| Pigment, dry basis | 20 | 25 | 35 | 20 | 30 |
| Presscake, dry solids | 28 | — | 38 | — | — |
| Presscake, wet | 72 | — | 92 | — | — |
| 2. Surface Active Agent* Material (Trade Name) | | | | | |
| Duponol ME[1] | 2 | — | 1 | 2 | — |

TABLE 1-continued

Preparation of Intrachromospheruloid Pigment
(parts by weight)

| Example No. 1 | 1 | 2 | 3 | 4 | 5 |
|---|---|---|---|---|---|
| Tamol SN[2] | 2 | — | 2 | — | — |
| Alipal CO 433[3] | 10 | 10 | — | — | 10 |
| Triton X 405[4] | — | 10 | 20 | 20 | 20 |
| Zonyl FSA[5] | — | 1 | — | 1 | 1 |
| 3. Water, quantity | 214 | 254 | 185 | 257 | 239 |
| 4. Micronizing | | | | | |
| Method | Sand | Ball | Ball | Sand | Sand |
| Time, hours, approx. | 48 | 60 | 60 | 48 | 48 |
| Temperature, °C. | 28 | 28 | 28 | 28 | 28 |
| Average Particle Size Diameter (microns) | <0.02 | <0.2 | <0.2 | <0.2 | <0.2 |
| 5. Separation | | | | | |
| Screening (X) | X | X | X | X | X |
| 6. Water dilution | 200 | 200 | 200 | 200 | 200 |
| 7. Yield | | | | | |
| Aqueous Pigment Dispersion | 500 | 500 | 500 | 500 | 500 |
| B. Polymerization Step | | | | | |
| 8. Surface Active Agent* | | | | | |
| a. Quantity, type | 20[1] | 40[4] | 10[1] | 20[1] | 20[1] |
| b. Quantity, type | — | — | 40[4] | — | — |
| Water | 80 | 60 | 50 | 80 | 80 |
| 9a. Monomer Material Non Crosslinking | | | | | |
| Styrene | 80 | — | 40 | — | — |
| Methylmethacrylate | — | 60 | 30 | 60 | — |
| Acrylonitrile | — | — | 10 | 10 | — |
| 9b. Monomer Material Crosslinking | | | | | |
| Divinylbenzene 50% | 20 | — | 10 | — | — |
| Ethyleneglycoldimethacrylate | — | 10 | — | 10 | 60 |
| 10. Polymerization Initiator | | | | | |
| AZDN[6] | — | — | 3 | 3 | 3 |
| Potassium persulfate | 3 | 3 | — | — | — |
| Sodium bisulfite | 1.5 | 1.5 | — | — | — |
| 11. Polymerization Conditions | | | | | |
| Time, hours, approx. | 7 | 7 | 6 | 6 | 6 |
| Temperature, °C. | 65 | 65 | 80 | 80 | 80 |
| Conversion, Approx. 100% (X) | X | X | X | X | X |
| 12. Intrachromospheruloid Pigment Dispersion Yield | 700 | 670 | 690 | 680 | 660 |
| Essentially non-settling (Latex) (X) | X | X | X | X | X |

*Capable of effecting emulsion polymerization.
[1] sodium lauryl sulfate (100% active)
[2] sodium salt of condensed naphthalene sulfonic acid
[3] sodium salt of a sulfate ester of an alkylphenoxy poly(ethylenoxy)ethanol 28% active
[4] octylphenoxy polyethoxy ethanol (70% active)
[5] fluorochemical surface active agent (50% active)
[6] azobisisobutyronitrile

TABLE 2

Preparation of Intrachromospheruloid Pigment
(parts by weight)

| Example No. 2 | 1 | 2 | 3 | 4 | 5 |
|---|---|---|---|---|---|
| A. Micronizing Step | | | | | |
| 1. Pigment Class | Phthalocyanine | Azamethine | Dioxazine | Azo | Triphenylmethane |
| Trade Name | Fastolux Green Y | Irgazin Red 2BLT | Heliogen Violet | Benzidine Yellow | Consol Green |
| Color Index Name | Green 36 | Red 180 | Violet 23 | Yellow 12 | Green 2 |
| Color Index Number | 74160 | — | 51319 | 21090 | 42040 & 49010 |
| Pigment, dry basis | 50 | 30 | 10 | 40 | 20 |
| Presscake, dry solids | 30 | — | 20 | 38 | — |
| Presscake, wet | 167 | — | 50 | 105 | — |
| 2. Surface Active Agent* Material (Trade Name) | | | | | |
| Duponol ME[1] | 2 | 5 | — | 4 | — |
| Blancol[2] | 2 | 2 | — | 2 | — |
| Triton X 405[3] | — | — | 45 | — | 10 |
| Duomeen T[4] | — | — | — | — | 20 |
| Tamol 731[5] | 6 | — | — | 4 | — |
| Acetic Acid | — | — | — | — | 10 |
| 3. Water, Quantity | 123 | 213 | 205 | 185 | 250 |
| 4. Micronizing | | | | | |
| Method | Sand | Ball | Sand | Ball | Sand |
| Time, hours, approx. | 48 | 60 | 48 | 60 | 48 |
| Temperature, °C. | 28 | 28 | 28 | 28 | 28 |
| Average Particle Size Diameter (microns) | <0.02 | <0.2 | <0.02 | <0.02 | <0.02 |
| 5. Separation | | | | | |
| Screening (X) | X | X | X | X | X |
| 6. Water, dilution | 200 | 200 | 200 | 200 | 200 |
| 7. Yield | | | | | |

TABLE 2-continued

Preparation of Intrachromospheruloid Pigment
(parts by weight)

| Example No. 2 | | 1 | 2 | 3 | 4 | 5 |
|---|---|---|---|---|---|---|
| | Aqueous Pigment Dispersion | 500 | 500 | 500 | 500 | 500 |
| B. | Polymerization Step | | | | | |
| | 8. Surface Active Agent* | | | | | |
| | a. Quantity, type | 20[1] | 20[1] | 45[3] | 20[1] | 20[3] |
| | b. Quantity, type | 10[5] | — | — | — | — |
| | Water | 70 | 80 | 55 | 80 | 80 |
| | 9. Monomer Material Non Crosslinking | | | | | |
| | Methylmethacrylate | 68 | 50 | 60 | 30 | — |
| | Cyclohexylmethacrylate | — | 10 | — | 30 | 60 |
| | Dimethylaminoethylmethacrylate | 1 | 2 | — | 5 | — |
| | 9B. Monomer Material Crosslinking | | | | | |
| | Divinylbenzene 50% | — | — | 20 | — | 10 |
| | Ethyleneglycoldimethacrylate | — | 8 | — | 4 | — |
| | Oiticia Oil | 1 | — | — | 1 | — |
| | 10. Polymerization Initiator | | | | | |
| | AZDN[6] | 2.5 | 2.5 | 3 | 3 | 2.5 |
| | 11. Polymerization Conditions | | | | | |
| | Time, hours, approx. | 6 | 6 | 7 | 7 | 6 |
| | Temperature, °C. | 80 | 80 | 80 | 80 | 80 |
| | Conversion, approx. 100% (X) | X | X | X | X | X |
| | 12. Intrachromospheruloid Pigment Dispersion | | | | | |
| | Yield | 670 | 670 | 680 | 670 | 670 |
| | Essentially non settling (Latex) (X) | X | X | X | X | X |

*Capable of effecting emulsion polymerization
[1] sodium lauryl sulfate (100% active)
[2] sodium salt of a sulfonated naphthaleneformaldehyde condensate (86% active)
[3] octylphenoxy polyethoxy ethanol (70% active)
[4] N-tallow trimethylene diamine (85% active)
[5] sodium salt of a polymeric carboxylic acid (100% active)
[6] azobisisobutyronitrile

TABLE 3

PREPARATION OF INTRACHROMOSPHERULOID PIGMENT
(parts by weight)

| Example No. 3 | | 1 | 2 | 3 | 4 | 5 |
|---|---|---|---|---|---|---|
| A. | Micronizing Step | | | | | |
| | 1. Pigment Class | Vat | Vat | Quinacridone | Phthalocyanine | Azo |
| | Trade Name | Perylene Red Toner | Sandothrene Blue NGD | Monastral Red Y | Heliogen Green G | Permanent Carmine |
| | Color Index Name | Red 123 | Blue 6 | Violet 19 | Green 7 | Red 5 |
| | Color Index Number | 71145 | 69825 | 46500 | 74260 | 12490 |
| | Pigment, dry basis | 30 | 20 | 25 | 35 | 25 |
| | Presscake, dry solids | — | 20 | — | 35 | — |
| | Presscake, wet | — | 100 | — | 100 | — |
| | 2. Surface Active Agent* Material (Trade Name) | | | | | |
| | Triton X 405[1] | 40 | — | — | 20 | 20 |
| | Monazoline T[2] | — | 20 | — | 10 | — |
| | Monaquat TIBC[3] | — | 20 | — | 10 | — |
| | Zonyl FSC[4] | — | 1 | 1 | — | — |
| | Duomeen T[5] | — | — | 20 | — | 20 |
| | Zonyl FSN[6] | 1 | — | — | — | 1 |
| | 3. Water | | | | | |
| | Quantity | 229 | 149 | 254 | 160 | 134 |
| | 4. Micronizing | | | | | |
| | Method | Sand | Ball | Ball | Sand | Ball |
| | Time, hours, approx. | 48 | 60 | 60 | 48 | 60 |
| | Temperature, °C. | 28 | 28 | 28 | 28 | 28 |
| | Average Particle Size Diameter (microns) | <0.2 | <0.02 | <0.2 | <0.02 | <0.2 |
| | 5. Separation | | | | | |
| | Screening (X) | X | X | X | X | X |
| | 6. Water Dilution | 200 | 200 | 200 | 200 | 200 |
| | 7. Yield | | | | | |
| | Aqueous Pigment Dispersion | 500 | 500 | 500 | 500 | 500 |
| B. | Polymerization Step | | | | | |
| | 8. Surface Active Agent* | | | | | |
| | a. Quantity, type | 40[1] | — | 10[5] | 20[3] | 40[1] |
| | b. Quantity, type | — | — | — | — | — |
| | Water | 60 | — | 90 | 80 | 60 |
| | 9. Monomer Material Non Crosslinking | | | | | |
| | Styrene | 60 | — | 60 | 40 | 60 |
| | Vinyltoluene | — | 70 | — | 30 | — |
| | Dimethylaminoethylmethacrylate | 5 | — | — | 10 | 5 |
| | 9B. Monomer Material Crosslinking | | | | | |
| | Ethyleneglycoldimethacrylate | — | — | 10 | — | — |
| | Allylacrylate | — | — | — | 10 | — |
| | Divinylbenzene 50% | 10 | 10 | — | 10 | 10 |

TABLE 3-continued
PREPARATION OF INTRACHROMOSPHERULOID PIGMENT
(parts by weight)

| Example No. 3 | | 1 | 2 | 3 | 4 | 5 |
|---|---|---|---|---|---|---|
| 10. | Polumerization Initiator | | | | | |
| | AZDN[7] | — | — | — | 3 | 2.5 |
| | Potassium persulfate | 2.5 | 3 | 2.5 | — | — |
| | Sodium bisulfite | 1.25 | 1.5 | 1.25 | — | — |
| 11. | | Polymerization Conditions | | | | |
| | Time, hours, approx. | 6 | 6 | 6 | 5 | 5 |
| | Temperature, °C. | 70 | 60 | 70 | 80 | 80 |
| | Conversion approx. 100% (X) | X | X | X | X | X |
| 12. | Intrachromospheruloid Pigment Dispersion | | | | | |
| | Yield | 675 | 580 | 670 | 700 | 675 |
| | Essentially non-settling (Latex) (X) | X | X | X | X | X |

*Capable of effecting emulsion polymerization
[1]octylphenoxy polyethoxy ethanol (70% active)
[2]substituted imidazoline of tall oil (100% active)
[3]substituted imidazoline quaternized with benzyl chloride (100% active)
[4]fluorochemical surface active agent (50% active)
[5]N-tallow trimethylene diamine (85% active)
[6]fluorochemical surface active agent (100% active)
[7]azobisisobutyronitrile

TABLE 4
Preparation of Intrachromosopheruloid Pigment
(parts by weight)

| Example No 4 | | 1 | 2 | 3 | 4 | 5 |
|---|---|---|---|---|---|---|
| A. | Micronizing Step | | | | | |
| 1. | Pigment Class | Vat | Dicxazine | Azo | Quinacridone | Azamethine |
| | Trade Name | Brilliant Orange GR | Heliogen Violet | Permagan Yellow | Magenta | Yellow 2GLT |
| | Color Index Name | Orange 7 | Violet 23 | Yellow 14 | Red 122 | Yellow 109 |
| | Color Index Number | 71105 | 51319 | 21095 | — | — |
| | Pigment, dry basis | 20 | 30 | 30 | 20 | 30 |
| | Presscake, dry solids | 20 | 30 | — | — | — |
| | Presscake, wet | 100 | 100 | — | — | — |
| 2. | Surface Active Agent* Material (Trade Name) | | | | | |
| | Dupanol ME[1] | — | 2 | 2 | — | 2 |
| | N-group polymer[2] | 20 | — | — | — | — |
| | SAMV amphoteric copolymer[3] | — | — | 28 | — | — |
| | SMA copolymer[4] | — | — | — | 20 | — |
| | Tamol 731[5] | — | 28 | — | — | — |
| | Triton X405[6] | 8 | — | — | 25 | 38 |
| 3. | Water | | | | | |
| | Quantity | 170 | 170 | 240 | 235 | 230 |
| 4. | Micronizing | | | | | |
| | Method | Sand | Sand | Ball | Ball | Ball |
| | Time, hours, approx. | 48 | 48 | 60 | 60 | 60 |
| | Temperature, °C. | 28 | 28 | 28 | 28 | 28 |
| | Average Particle Size Diameter (microns) | <0.02 | <0.02 | <0.02 | <0.2 | <0.2 |
| 5. | Separation | | | | | |
| | Screening (X) | X | X | X | X | X |
| 6. | Water Dilution | 200 | 200 | 200 | 200 | 200 |
| 7. | Yield | | | | | |
| | Aqueous Pigment Dispersion | 500 | 500 | 500 | 500 | 500 |
| B. | Polymerization Step | | | | | |
| 8. | Surface Active Agent* | | | | | |
| | a. Quantity, type | 10[1] | 20[1] | 10[1] | 10[1] | 40[6] |
| | b. Quantity, type | 10[2] | — | 12[3] | 20[4] | 20[3] |
| | Water | 80 | 80 | 78 | 70 | 40 |
| 9. | Monomer Material Non-Crosslinking | | | | | |
| | Styrene | — | 40 | 60 | 40 | 80 |
| | Methylmethacrylate | 60 | 20 | — | 40 | — |
| | Diethyaminoethylmethacrylate | — | — | 5 | 2 | 2 |
| 9B. | Monomer Material Crosslinking | | | | | |
| | Divinylbenzene 50% | — | 20 | 15 | — | 18 |
| | Ethyleneglycoldimethacrylate | 10 | — | — | 8 | — |
| 10. | Polymerization Initiator | | | | | |
| | AZDN[7] | 2 | 3 | 3 | 3 | 3 |
| 11. | Polymerization Conditions | | | | | |
| | Time, hours, approx. | 5 | 6 | 6 | 6 | 6 |
| | Temperature, °C. | 80 | 80 | 80 | 80 | 80 |
| | Conversion Approx. 100% (X) | X | X | X | X | X |
| 12. | Intrachromospheruloid Pigment Dispersion | | | | | |
| | Yield | 670 | 680 | 680 | 690 | 700 |
| | Essentially non-settling | | | | | |

TABLE 4-continued

| | Preparation of Intrachromosopheruloid Pigment (parts by weight) | | | | |
|---|---|---|---|---|---|
| Example No 4 | 1 | 2 | 3 | 4 | 5 |
| (Latex) (X) | X | X | X | X | X |

*Capable of effecting emulsion polymerization.
[1] sodium lauryl sulfate (100% active)
[2] 4-vinylpyridine homopolymer
[3] copolymer of styrene, acrylonitrile, methacrylic acid and 4-vinylpyridine, ratio 25/10/29/36
[4] copolymer of styrene, methacrylic acid and acrylonitrile, ratio 25/65/10
[5] sodium salt of polymeric carboxylic acid (100% active)
[6] octylphenoxy polyethoxy ehtanol (70% active)
[7] azobisisobutyronitrile

TABLE 5

| | | Preparation of Intrachromospheruloid Pigment (parts by weight) | | | | |
|---|---|---|---|---|---|---|
| Example No. 5 | | 1 | 2 | 3 | 4 | 5 |
| A. | Micronizing Step | | | | | |
| | 1. Pigment Class | Phthalocyanine | Vat | Azo | Phthalocyanine | Vat |
| | Trade Name | Polymon Blue G | Red FBB | Red Lake C | Heliogen Blue BG | Perylene Red |
| | Color Idex Name | Blue 16 | Red 10 | Red 53 | Blue 15 | Red 123 |
| | Color Index Number | 74100 | 67000 | 15585 | 74160 | 71145 |
| | Pigment, dry basis | 25 | 20 | 25 | 20 | 30 |
| | Presscake, dry solids | — | 20 | — | 35 | — |
| | Presscake, wet | — | 100 | — | 57 | — |
| | 2. Surface Active Agent* Material (Trade Name) | | | | | |
| | Dupanol ME[1] | 2 | 4 | — | 1 | 2 |
| | Alipal CO 433[2] | 6 | — | 10 | 10 | — |
| | Tamol SN[3] | — | — | 2 | — | 2 |
| | Tamol 731[4] | — | 5 | — | — | 6 |
| | Zonyl FSA[5] | 2 | 1 | — | 2 | — |
| | 3. Water | | | | | |
| | Quantity | 265 | 190 | 263 | 230 | 260 |
| | 4. Micronizing | | | | | |
| | Method | Sand | Sand | Ball | Sand | Sand |
| | Time, hours, approx. | 48 | 48 | 60 | 48 | 48 |
| | Temperature, °C. | 28 | 28 | 28 | 28 | 28 |
| | Average Particle Size Diameter (microns) | <0.2 | <0.2 | <0.2 | <0.02 | <0.02 |
| | 5. Separation | | | | | |
| | Screening (X) | X | X | X | X | X |
| | 6. Water Dilution | 200 | 200 | 200 | 200 | 200 |
| | 7. Yield | | | | | |
| | Aqueous Pigment Dispersion | 500 | 500 | 500 | 500 | 500 |
| B. | Polymerization Step | | | | | |
| | 8. Surface Active Agent* | | | | | |
| | a. Quantity, type | 20[1] | 20[1] | 10[1] | 10[1] | 20[1] |
| | b. Quantity, type | 10[4] | 10[4] | — | — | 10[4] |
| | Water | 70 | 70 | 90 | 90 | 70 |
| | 9. Monomer Material Non Crosslinking | | | | | |
| | Styrene | 60 | 60 | 61 | 70 | 40 |
| | 4-vinylpyridine | 10 | — | 10.4 | 10 | — |
| | Methacrylic Acid | — | 10 | 8.6 | — | 10 |
| | Dimethylaminoethylmethacrylate | 2 | — | — | — | — |
| | Methylmethacrylate | 8 | 10 | — | — | 30 |
| | 9B. Monomer Material Crosslinking | | | | | |
| | Ethyleneglycoldimethacrylate | 10 | — | — | 10 | 10 |
| | Divinylbenzene 50% | — | 20 | 20 | — | — |
| | 10. Polymerization Initiator | | | | | |
| | AZDN[6] | — | 3 | 3 | 3 | — |
| | Cumene hydroperoxide | 3 | — | — | — | 3 |
| | 11. Polymerization Conditions | | | | | |
| | Time, hours, approx. | 5 | 5 | 5 | 5 | 5 |
| | Temperature, °C. | 80 | 80 | 80 | 80 | 80 |
| | Conversion Approx 100% (X) | X | X | X | X | X |
| | 12. Intrachromospheruloid Pigment Dispersion | | | | | |
| | Yield | 690 | 700 | 700 | 690 | 690 |
| | Essentially non-settling (Latex) (X) | X | X | X | X | X |

*Capable of effecting emulsion polymerization.
[1] sodium lauryl sulfate (100% active)
[2] sodium salt of a sulfate ester of an alkylphenoxy poly(ethyleneoxy)ethanol (28% active)
[3] sodium salt of condensed naphthalene sulfonic acid
[4] sodium salt of polymeric carboxylic acid (100% active)
[5] fluorochemical surface active agent (50% active)
[6] azobisisobutyronitrile

TABLE 6

Preparation of Intrachromospheruloid Pigment (parts by weight)

| Example No. 6- | 1 | | 2 | |
|---|---|---|---|---|
| A. Micronizing Step | | | | |
| 1. Pigment Class | Quinacridone | Vat | Dioxazine | Triphenylmethane |
| Trade Name | Monastral Red Y | Brilliant Orange GR | Carbazole Violet | Irgalite Violet TRC |
| Color Index Name | Violet 19 | Orange 7 | Violet 23 | Violet 3 |
| Color Index Number | 46500 | 71105 | 51319 | 42535 |
| Pigment, dry basis | 20 | 10 | 20 | 10 |
| Presscake, dry solids | — | 20 | 28 | — |
| Presscake, wet | — | 50 | 72 | — |
| 2. Surface Active Agent* Material (Trade Name) | | | | |
| Aerosol 22[1] | 50 | | — | |
| Triton X 405[2] | 10 | | — | |
| Duomeen T[3] | — | | 20 | |
| Monaquat TIBC[4] | — | | 10 | |
| Acetic Acid | — | | 15 | |
| Ammonium hydroxide 28% | 10 | | — | |
| 3. Water, Quantity | 160 | | 173 | |
| 4. Micronizing | | | | |
| Method | Sand | | Ball | |
| Time, hours, approx. | 48 | | 60 | |
| Temperature, °C. | 28 | | 28 | |
| Average Particle Size Diameter (microns) | <0.2 | | <0.2 | |
| 5. Separation | | | | |
| Screening (X) | X | | X | |
| 6. Water, dilution | 200 | | 200 | |
| 7. Yield, Aqueous Pigment Dispersion | 500 | | 500 | |
| B. Polymerization Step | | | | |
| Surface Active Agent* | | | | |
| a. Quantity, type | 30[2] | | — | |
| b. Quantity, type | — | | — | |
| Water | 70 | | 100 | |
| 9. Monomer Material Non Crosslinking | | | | |
| Styrene | 60 | | 30 | |
| Methylmethacrylate | 8 | | 38 | |
| Dimethylaminoethylmethacrylate | 2 | | 2 | |
| 9B. Monomer Material Crosslinking | | | | |
| Divinylbenzene 50% | 10 | | — | |
| Ethyleneglycoldimethacrylate | — | | 10 | |
| 10. Polymerization Initiator | | | | |
| AZDN[5] | 3 | | 3 | |
| 11. Polymerization Conditions | | | | |
| Time, hours, approx. | 6 | | 6 | |
| Temperature, °C. | 80 | | 80 | |
| Conversion, Approx. 100% (X) | X | | X | |
| 12. Intrachromospheruloid Pigment Dispersion | | | | |
| Yield | 680 | | 680 | |
| Essentially non-settling (Latex) (X) | X | | X | |

*Capable of effecting emulsion polymerization
[1]tetrasodium N-(1,2-dicarboxyethyl)-N-octadecylsulfosuccinate (35% active)
[2]octylphenoxy polyethoxy ethanol (70% active)
[3]N-tallow trimethylene diamine (85% active)
[4]substituted imidazoline quaternized with benzyl chloride (100% active)
[5]azobisisobutyronitrile

TABLE 7

Preparation of Intrachromospheruloid Pigment (parts by weight)

| Example No. 7- | 1 | | 2 | |
|---|---|---|---|---|
| A. Micronizing Step | | | | |
| 1. Pigment Class | Vat | Vat | Phthalocyanine | Triphenylmethane |
| Trade Name | Indanthrene Pink R | Brilliant Orange RK | Heliogen Green A | Consol Green |
| Color Index Name | Red 1 | Orange 3 | Green 7 | Green 2 |
| Color Index Number | 73340 | 59300 | 74260 | 42040 49010 |
| Pigment, dry basis | 30 | 20 | 20 | 10 |
| Presscake, dry solids | 30 | 25 | 36 | — |
| Presscake, wet | 100 | 80 | 55 | — |
| 2. Surface Active Agent* Material (Trade Name) | | | | |
| Duponol ME[1] | 5 | | — | |
| Duomeen T[2] | — | | 20 | |
| Tamol SN[3] | 2 | | — | |
| Acetic Acid | — | | 10 | |
| 3. Water, Quantity | 63 | | 155 | |
| 4. Micronizing | | | | |

TABLE 7-continued

Preparation of Intrachromospheruloid Pigment (parts by weight)

| Example No. 7- | 1 | 2 |
|---|---|---|
| Method | Sand | Ball |
| Time, hours, approx. | 48 | 60 |
| Temperature, °C. | 28 | 28 |
| Average Particle Size Diameter (microns) | <0.02 | <0.2 |
| 5. Separation | | |
| Screening (X) | X | X |
| 6. Water, Dilution | 250 | 250 |
| 7. Yield, Aqueous Pigment Dispersion | 500 | 500 |
| B. Polymerization Step | | |
| 8. Surface Active Agent* | | |
| a. Quantity, type | 25[1] | 10[2] |
| b. Quantity, type | — | — |
| Water | 75 | 85 |
| Acetic Acid | — | 5 |
| 9a. Monomer Material Non Crosslinking | | |
| Styrene | — | 40 |
| Methylmethacrylate | 68 | 28 |
| Dimethylaminoethylmethacrylate | 2 | 2 |
| 9b. Monomer Material Crosslinking | | |
| Ethyleneglycoldimethacrylate | 10 | 10 |
| 10. Polymerization Initiator | | |
| AZDN[4] | 3 | 3 |
| 11. Polymerization Conditions | | |
| Time, hours, approx. | 7 | 7 |
| Temperature, °C. | 80 | 80 |
| Conversion, Approx. 100% (X) | X | X |
| 12. Intrachromospheruloid Pigment Dispersion | | |
| Yield | 680 | 680 |
| Essentially non-settling (Latex) (X) | X | X |

*Capable of effecting emulsion polymerization
[1] sodium lauryl sulfate (100% active)
[2] N-tallow trimethylene diamine (85% active)
[3] sodium salt of a condensed naphthalene sulfonic acid
[4] azobisisobutyronitrile

TABLES 8–15

Preparation of Intrachromospheruloid/Inorganic Pigment Composition from Intrachromospheruloid Pigment Material Produced in Tables 1–7.

TABLE 8

Preparation of Intrachromospheruloid/Inorganic Pigment Composition (parts by weight)

| Example No. 8- | 1 | 2 | 3 | 4 | 5 |
|---|---|---|---|---|---|
| Step A. | | | | | |
| 1. Inorganic Pigment Material | | | | | |
| Trade Name | Celite 281 | HiSil 404 | Cab-O-Sil M5 | Al-Sil-Ate HO | Excelopax |
| Amount (dry basis) | 100 | 100 | 100 | 100 | 100 |
| Water | 1000 | 1000 | 1000 | 1000 | 1000 |
| 2. Surface Active Agent Material | | | | | |
| Duponol ME[1] | 5 | — | — | — | 5 |
| Daxad 11[2] | — | 10 | — | 10 | — |
| Aerosol OT[3] | — | — | 10 | — | 5 |
| Blancol[4] | 2 | — | 2 | 2 | — |
| 3. Limited Micronizing (X) | X | X | X | X | X |
| 4. Primary Particle Size Diameter (microns) | <2.0 | <2.0 | <2.0 | <2.0 | <2.0 |
| 5. Separation from Micronizing Medium, Screening (X) | X | X | X | X | X |
| 6. Water, Dilution | 200 | 200 | 200 | 200 | 200 |
| 7. Temperature, °C. | 28 | 28 | 28 | 28 | 28 |
| pH | 8–9 | 8–9 | 8–9 | 8–9 | 8–9 |
| Step B. | | | | | |
| 8. Intrachromospheruloid Pigment, Dispersion from:- | | | | | |
| Table No. | 1-1 | 1-2 | 1-3 | 1-4 | 1-5 |
| Quantity | 700 | 670 | 690 | 680 | 660 |
| Pigment Solids | 120 | 95 | 125 | 100 | 90 |
| 9. Nitrogenous Material | | | | | |
| Tetraethylenepentamine | 2 | 2 | 2 | — | — |
| Monazoline T[5] | — | — | — | 2 | — |
| Monaquat TIBC[6] | — | — | — | — | 2 |
| 10. Temperature, °C. | 28 | 28 | 28 | 28 | 28 |
| pH | 8–9 | 8–9 | 8–9 | 8–9 | 8–9 |

TABLE 8-continued
Preparation of Intrachromospheruloid/Inorganic Pigment Composition
(parts by weight)

| Example No. 8- | 1 | 2 | 3 | 4 | 5 |
|---|---|---|---|---|---|
| 11. Bonding Agent Material | | | | | |
| "N" Sodium Silicate 28% | 50 | — | — | 50 | — |
| Urea | — | 10 | — | — | — |
| Formaldehyde 30% | — | 20 | — | — | — |
| Z6020 Silane[7] | — | — | — | — | 5 |
| 12. Destabilizing Agent Material | | | | | |
| a. Acid (X)[8] | X | X | X | X | X |
| b. Base (X) | — | — | — | — | — |
| c. Alcohol (X)[9] | X | X | — | — | — |
| 13. Temperature, °C. | 30 | 30 | 30 | 30 | 30 |
| pH | 4-5 | 4-5 | 4-5 | 4-5 | 4-5 |
| 14. Reaction Temperature, °C. | 75 | 75 | 75 | 75 | 75 |
| 15. Reaction Time, Hours, Approx. | 3 | 3 | 3 | 3 | 3 |
| 16. Primary Particle Size Diameter (microns) | <4.0 | <4.0 | <4.0 | <4.0 | <4.0 |
| 17. Volume - Intrachromospheruloid/Inorganic Pigment Composition Dispersion Approx. | 2000 | 2000 | 2000 | 2000 | 2000 |
| 18. Pigment Recovery Method | | | | | |
| a. Filtration (X) | — | — | — | — | — |
| b. Spray Drying (X) | X | X | X | X | X |
| 19. Product Available As:- | | | | | |
| a. Wet Coagulum (X) | — | — | — | , | — |
| b. Dry Coagulum (X) | — | — | — | — | — |
| c. Spray Dried Powder (X) | X | X | X | X | X |
| 20. Intrachromospheruloid/Inorganic Pigment Composition Yield (dry basis) | 267 | 255 | 289 | 265 | 241 |

[1] sodium lauryl sulfate 100% active
[2] polymerized sodium salts of alkyl napthalene sulfonate acid (87% active)
[3] dioctyl ester of sodium sulfosuccinic acid (100% active)
[4] sodium salt of a sulfonated napthalene formaldehyde condensate (86% active)
[5] substituted imidazoline of tall oil (100% active)
[6] substituted imidazoline quaternized with benzyl chloride (100% active)
[7] N-(2-aminoethyl)-3-aminopropyltrimethoxysilane
[8] acetic
[9] isopropyl
Celite 281 Trade Name for Johns-Manville natural silica
HiSil 404 Trade Name for PPG Industries precipitated silica, paper grade
Cab-O-Sil M5 Trade Name for Cabot Corporation pyrogenic silica
Al-Sil-Ate HO Trade Name for Freeport Kaolin aluminum silicate
Excelopax Trade Name for National Lead Industries zirconium silicate

TABLE 9
Preparation of Intrachromospheruloid/Inorganic Pigment Composition
(parts by weight)

| Example No. 9 | 1 | 2 | 3 | 4 | 5 |
|---|---|---|---|---|---|
| Step A. | | | | | |
| 1. Inorganic Pigment Material | | | | | |
| Trade Name | Aluminum Hydrate | Oncor 23-A | Zinc Oxide | Zirconium Oxide | TiPure LW |
| Amount (dry basis) | 60 | 40 | 40 | 40 | 50 |
| Water | 400 | 300 | 300 | 300 | 300 |
| 2. Surface Active Agent Material | | | | | |
| Alipal CO 433[1] | 10 | — | 5 | — | 5 |
| Duponol ME[2] | — | — | 10 | — | 5 |
| Duomeen T[3] | — | 10 | — | 10 | — |
| Acetic Acid | — | 5 | — | 5 | — |
| 3. Limited Micronizing (X) | X | X | X | X | X |
| 4. Primary Particle Size Diameter (microns) | <2.0 | <2.0 | <2.0 | <2.0 | 0.2-0.5 |
| 5. Separation from Micronizing Medium Screening (X) | X | X | X | X | X |
| 6. Water, Dilution | 300 | 200 | 200 | 200 | 200 |
| 7. Temperature, °C. | 28 | 28 | 28 | 28 | 28 |
| pH | 8-9 | 5 | 8-9 | 5 | 8-9 |
| Step B. | | | | | |
| 8. Intrachromospheruloid Pigment, Dispersion From: | | | | | |
| Table No. | 6-1 | 2-5 | 3-1 | 3-2 | 2-2 |
| Quantity | 680 | 134 | 67 | 58 | 134 |
| Pigment Solids | 100 | 18 | 10 | 10 | 20 |
| 9. Nitrogenous Material | | | | | |
| Duomac T[4] | — | 5 | — | — | — |
| PEI 18[5] | 5 | — | — | — | — |
| Tetraethylenepentamine | — | — | 2 | — | 2 |
| 10. Temperature, °C. | 28 | 28 | 28 | 28 | 28 |
| pH | 8-9 | 5 | 8-9 | 5 | 8-9 |
| 11. Bonding Agent Material | | | | | |
| Titanium oxychloride | — | 10 | — | — | — |

TABLE 9-continued

Preparation of Intrachromospheruloid/Inorganic Pigment Composition (parts by weight)

| Example No. 9 | 1 | 2 | 3 | 4 | 5 |
|---|---|---|---|---|---|
| SAMV amphoteric copolymer 20%[6] | — | — | — | 25 | — |
| SMA copolymer 20%[7] | — | — | — | — | 25 |
| Preformed Phenoplast[8] | — | — | 10 | — | — |
| 12. Destabilizing Agent Material | | | | | |
| a. Acid (X)[9] | X | — | — | — | X |
| b. Base (X)[10] | — | X | — | X | — |
| c. Alcohol (X)[11] | — | — | X | — | — |
| 13. Temperature, °C. | 30 | 30 | 30 | 30 | 30 |
| pH | 4–5 | 9–10 | 8–9 | 9–10 | 4–5 |
| 14. Reaction Temperature, °C. | 75 | 75 | 75 | 75 | 75 |
| 15. Reaction Time, hours, approx. | 4 | 4 | 4 | 4 | 4 |
| 16. Primary Particle Size Diameter (microns) | <4.0 | <4.0 | <4.0 | <4.0 | <4.0 |
| 17. Yield - Intrachromospheruloid/Inorganic Pigment Composition Dispersion Approx. | 1600 | 1200 | 1200 | 1200 | 1200 |
| 18. Pigment Recovery Method | | | | | |
| a. Filtration (X) | — | X | X | X | X |
| b. Spray Drying (X) | X | — | — | — | — |
| 19. Product Available As: | | | | | |
| a. Wet Coagulum (X) | — | X | X | X | X |
| b. Dry coagulum (X)[12] | — | X | X | X | X |
| c. Spray Dried Powder (X) | X | — | — | — | — |
| 20. Intrachromospheruloid/Inorganic Pigment Composition Yield (dry basis) Approx. | 206 | 60 | 60 | 55 | 75 |

[1] sodium salt of a sulfate ester of an alkylphenoxy poly(ethyleneoxy) ethanol (28% active)
[2] sodium lauryl sulfate (100% active)
[3] N-tallow trimethylene diamine (85% active)
[4] N-tallow trimethylene diamine diacetate (85% active)
[5] water soluble polyethylenimine, manufactured by Dow
[6] copolymer of styrene, acrylonitrile, methacrylic acid and 4-vinylpyridine ratio 25/10/29/36
[7] copolymer of styrene, methacrylic acid and acrylonitrile, ratio 25/65/10
[8] condensation resin produced from the reaction of 1 mole of m-phenylenediamine 1.5 moles of formaldehyde water dispersible
[9] acetic
[10] $NH_4OH$
[11] isopropyl
[12] when dried
Oncor 23A Trade Name for NL Industries Antimony oxide pigment
TiPure LW Trade Name for DuPont titanium dioxide pigment

TABLE 10

Preparation of Intrachromospheruloid/Inorganic Pigment Composition (parts by weight)

| Example No. 10 | 1 | 2 | 3 | 4 | 5 |
|---|---|---|---|---|---|
| Step A. | | | | | |
| 1. Inorganic Pigment Material | | | | | |
| Trade Name | Aluminum Hydrate | Oncor 23A | Zinc Oxide | Zirconium Oxide | TiPure LW |
| Amount (dry basis) | 80 | 40 | 40 | 50 | 50 |
| Water | 600 | 300 | 300 | 300 | 300 |
| 2. Surface Active Agent Material | | | | | |
| Triton X 305[1] | 10 | — | — | — | 10 |
| Polyfon H[2] | — | 5 | — | 2 | — |
| Santomerse ME[3] | — | — | 10 | 5 | — |
| Duponol ME[4] | 1 | 1 | 1 | — | 2 |
| 3. Limited Micronizing (X) | X | X | X | X | X |
| 4. Primary Particle Size Diameter (microns) | <2.0 | <2.0 | <2.0 | <2.0 | <2.0 |
| 5. Separation from Micronizing Medium, Screening (X) | X | X | X | X | X |
| 6. Water, Dilution | 200 | 200 | 200 | 200 | 200 |
| 7. Temperature, °C. | 28 | 28 | 28 | 28 | 28 |
| pH | 8–9 | 8–9 | 8–9 | 8–9 | 8–9 |
| Step B. | | | | | |
| 8. Intrachromospheruloid Pigment, Dispersion From:- | | | | | |
| Table No. | 2-1 | 2-4 | 2-3 | 5-4 | 7-1 |
| Quantity | 670 | 67 | 136 | 138 | 136 |
| Pigment Solids | 120 | 11 | 18 | 22 | 26 |
| 9. Nitrogenous Material | | | | | |
| Tetraethylenepentamine | — | 2 | — | 2 | 2 |
| 10. Temperature, °C. | 28 | 28 | 28 | 28 | 28 |
| pH | 8–9 | 8–9 | 8–9 | 8–9 | 8–9 |
| 11. Bonding Agent Material | | | | | |
| Z6020 Silane[5] | — | — | — | — | 5 |
| "N" Silicate 28% | — | 100 | — | — | — |
| 12. Destabilizing Agent Material | | | | | |
| a. Acid (X)[6] | X | X | — | X | X |
| b. Base (X) | — | — | — | — | — |

TABLE 10-continued

Preparation of Intrachromospheruloid/Inorganic Pigment Composition
(parts by weight)

| Example No. 10 | | 1 | 2 | 3 | 4 | 5 |
|---|---|---|---|---|---|---|
| | c. Alcohol (X)[7] | X | — | X | — | — |
| 13. | Temperature, °C. | 30 | 30 | 30 | 30 | 30 |
| | pH | 6-7 | 4-5 | 8-9 | 5 | 4-5 |
| 14. | Reaction Temperature, °C. | 80 | 80 | 80 | 80 | 80 |
| 15. | Reaction Time, hours, approx. | 3 | 3 | 3 | 3 | 3 |
| 16. | Primary Particle Size Diameter (microns) | <4.0 | <4.0 | <4.0 | <4.0 | <4.0 |
| 17. | Yield - Intrachromospheruloid/Inorganic Pigment Composition Dispersion (approx.) | 1500 | 1000 | 1000 | 1000 | 1000 |
| 18. | Pigment Recovery Method | | | | | |
| | a. Filtration (X) | X | X | X | X | X |
| | b. Spray Drying (X) | — | — | — | — | — |
| 19. | Product Available As:- | | | | | |
| | (a) Wet Coagulum (X) | X | X | X | X | X |
| | (b) Dry Coagulum (X)[8] | X | X | X | X | X |
| | (c) Spray Dried Powder (X) | — | — | — | — | — |
| 20. | Intrachromospheruloid/Inorganic Pigment Composition Yield (dry basis) Approx. | 200 | 79 | 58 | 72 | 81 |

[1] octylphenoxy polyethoxy ethanol (70% active)
[2] sodium lignin sulfonate (100% active)
[3] linear dodecylbenzene sodium sulfonate (58% active)
[4] sodium lauryl sulfate (100% active)
[5] N-(-2-aminoethyl)-3-aminopropyltrimethoxysilane
[6] aq. HCl
[7] isopropyl
[8] when dried Oncor 23A Trade Name for NL Industries antimony oxide pigment
TiPure LW Trade Name for DuPont Titanium dioxide pigment

TABLE 11

Preparation of Intrachromospheruloid/Inorganic Pigment Composition
(parts by weight)

| Example No. 11- | 1 | 2 | 3 | 4 | 5 |
|---|---|---|---|---|---|
| Step A. | | | | | |
| 1. Inorganic Pigment Material | | | | | |
| Trade Name | Ludox Colloidal Silica HS 40 | Micro-Cel T-38 | TiPure R941 Slurry | Calcium Carbonate | Alumina |
| Amount (dry basis) | 100 | 100 | 50 | 50 | 50 |
| Water | 1000 | 1000 | 250 | 300 | 300 |
| 2. Surface Active Agent Material | | | | | |
| Tamol SN[1] | — | 2 | — | 2 | — |
| Triton X 405[2] | — | 5 | — | 10 | 5 |
| Duomeen T[3] | — | — | — | — | 5 |
| Tamol 731[4] | — | 10 | — | — | — |
| Acetic Acid | — | — | — | — | 3 |
| 3. Limited Micronizing (X) | — | X | — | X | X |
| 4. Primary Particle Size Diameter (microns) | <0.02 | <2.0 | <2.0 | <2.0 | <2.0 |
| 5. Separation from Micronizing Medium Screening (X) | — | X | — | X | X |
| 6. Water, Dilution | — | 200 | — | 200 | 200 |
| 7. Temperature, °C. | 28 | 28 | 28 | 28 | 28 |
| pH | 8-9 | 8-9 | 8-9 | 8-9 | 5 |
| Step B. | | | | | |
| 8. Intrachromospheruloid Pigment, Dispersion From:- | | | | | |
| Table No. | 5-1 | 5-3 | 4-3 | 3-1 | 7-2 |
| Quantity | 690 | 700 | 136 | 135 | 68 |
| Pigment Solids | 115 | 125 | 22 | 21 | 11 |
| 9. Nitrogenous Material | | | | | |
| Duomeen TDO[5] | — | — | — | — | 5 |
| Tetraethylenepentamine | — | 2 | — | 2 | 2 |
| Duomac T[6] | 5 | 2 | 2 | — | — |
| 10. Temperature, °C. | 28 | 28 | 28 | 28 | 28 |
| pH | 8-9 | 8-9 | 8-9 | 8-9 | 5-6 |
| 11. Bonding Agent Material | | | | | |
| Z6062 Silane[7] | 5 | — | 5 | — | — |
| SMA copolymer[8] | — | — | — | 100 | — |
| N-Group Polymer[9] | — | 100 | — | — | — |
| Zirconium oxychloride | — | — | — | — | 10 |
| 12. Destabilizing Agent Material | | | | | |
| a. Acid (X)[10] | X | X | X | — | — |
| b. Base (X)[11] | — | — | — | — | X |
| c. Alcohol (X)[12] | — | — | — | X | — |
| 13. Temperature, °C. | 30-40 | 30-40 | 30-40 | 30-40 | 30-40 |
| pH | 4-5 | 6 | 4-5 | 8-9 | 9-10 |

TABLE 11-continued

Preparation of Intrachromospheruloid/Inorganic Pigment Composition
(parts by weight)

| Example No. 11- | 1 | 2 | 3 | 4 | 5 |
|---|---|---|---|---|---|
| 14. Reaction Temperature, °C. | 75 | 80 | 75 | 75 | 80 |
| 15. Reaction Time, Hours, Approx | 5 | 4 | 4 | 4 | 3 |
| 16. Primary Particle Size Diameter (microns) | <4.0 | <4.0 | <4.0 | <4.0 | <4.0 |
| 17. Yield - Intrachromospheruloid/Inorganic Pigment Composition Dispersion | 1500 | 1500 | 1000 | 800 | 800 |
| 18. Pigment Recovery Method | | | | | |
| a. Filtration (X) | — | — | X | X | X |
| b. Spray Drying (X) | X | X | — | — | — |
| 19. Product Available As:- | | | | | |
| a. Wet Coagulum (X) | — | — | X | X | X |
| b. Dry Coagulum (X)[13] | — | — | X | X | X |
| c. Spray Dried Powder (X) | X | X | — | — | — |
| 20. Intrachromospheruloid/Inorganic Pigment Composition Yield (dry basis) | 220 | 245 | 77 | 91 | 65 |

[1] sodium salt of condensed napthalene sulfonic acid
[2] octylphenoxy polyethoxy ethanol (70% active)
[3] N-tallow trimethylene diamine (85% active)
[4] sodium salt of polymeric carboxylic acid (100% active)
[5] N-tallow trimethylene diamine dioleate (100% active)
[6] N-tallow trimethylene diamine diacetate (85% active)
[7] aminofunctional silane (40% active)
[8] copolymer of styrene, methacrylic acid and acrylonitrile, ratio 25/65/10
[9] homopolymer of 4-vinylpyridine
[10] hydroxy acetic
[11] aq. NaOH
[12] isopropyl
[13] when dried
Ludox Trade Name for DuPont colloidal silica
Micro-Cel T38 Trade Name for Johns-Manville Calcium silicate
TiPure R941 Trade Name for DuPont titanium dioxide pigment

TABLE 12

Preparation of Intrachromospheruloid/Inorganic Pigment Composition
(parts by weight)

| Example No. 12- | 1 | 2 | 3 | 4 | 5 |
|---|---|---|---|---|---|
| Step A. | | | | | |
| 1. Inorganic Pigment Material | Silica | Silica | Cab-O-Sil M5 | Silica | Silica |
| Trade Name | Wet PP Paper Grade | Wet PP Reinforcing Grade | | Wet PP Paper Grade | Wet PP Reinforcing Grade |
| Amount (dry basis) | 50 | 50 | 50 | 50 | 50 |
| Water | 500 | 500 | 500 | 500 | 500 |
| 2. Surface Active Agent Material | | | | | |
| Alipal CO 433[1] | 90 | 90 | — | 90 | 90 |
| Triton X 400[2] | — | — | 40 | — | — |
| Acetic Acid | — | — | 20 | — | — |
| 3. Limited Micronizing (X) | — | — | — | — | — |
| 4. Primary Particle Size Diameter (microns) | 0.1–1.0 | 0.01–0.05 | <2.0 | 0.1–1.0 | 0.01–0.05 |
| 5. Separation from Micronizing Medium Screening (X) | — | — | — | — | — |
| 6. Water, Dilution | — | — | — | — | — |
| 7. Temperature, °C. | 28 | 28 | 28 | 28 | 28 |
| pH | 8–9 | 8–9 | 5 | 8–9 | 8–9 |
| Step B. | | | | | |
| 8. Intrachromospheruloid Pigment, Dispersion from:- | | | | | |
| Table No. | 1-5 | 5-5 | 4-1 | 4-2 | 5-2 |
| Quantity | 132 | 69 | 67 | 68 | 140 |
| Pigment Solids | 18 | 12 | 9 | 11 | 24 |
| 9. Nitrogenous Material | | | | | |
| Tetraethylenepentamine | 2 | 2 | 2 | — | — |
| 10. Temperature, °C. | 28 | 28 | 28 | 28 | 28 |
| pH | 8–9 | 8–9 | 5 | 8–9 | 8–9 |
| 11. Bonding Agent Material | | | | | |
| Z6020 Silane[3] | 1 | — | — | — | — |
| SMA copolymer[4] 20% | — | 50 | — | 100 | 50 |
| SAMV amphoteric copolymer[5] | — | — | 100 | — | 50 |
| N-group polymer[6] | 50 | — | — | — | — |
| 12. Destabilizing Agent Material | | | | | |
| a. Acid (X)[7] | X | — | — | — | — |
| b. Base (X)[8] | — | X | X | X | X |
| c. Alcohol (X) | — | — | — | — | — |
| 13. Temperature, °C. | 30 | 30 | 30 | 30 | 30 |
| pH | 4–5 | 8–9 | 8–9 | 8–9 | 8–9 |
| 14. Reaction Temperature, °C. | 60 | 60 | 60 | 60 | 60 |
| 15. Reaction Time, hours, approx. | 4 | 4 | 4 | 4 | 4 |

TABLE 12-continued

Preparation of Intrachromospheruloid/Inorganic Pigment Composition
(parts by weight)

| Example No. 12- | | 1 | 2 | 3 | 4 | 5 |
|---|---|---|---|---|---|---|
| 16. | Primary Particle Size Diameter (microns) | <4.0 | <4.0 | <4.0 | <4.0 | <4.0 |
| 17. | Yield - Intrachromospheruloid/ Inorganic Pigment Composition Dispersion | 1300 | 1400 | 1500 | 1400 | 1400 |
| 18. | Pigment Recovery Method | | | | | |
| | a. Filtration (X) | X | X | X | X | X |
| | b. Spray Drying (X) | X | X | X | X | X |
| 19. | Product Available as:- | | | | | |
| | a. Wet Coagulum (X) | X | X | X | X | X |
| | b. Dry Coagulum (X)[9] | X | X | X | X | X |
| | c. Spray Dried Powder (X)[10] | X | X | X | X | X |
| 20. | Intrachromospheruloid/ Inorganic Pigment Composition Yield (dry basis) | 119 | 72 | 159 | 81 | 94 |

[1] sodium salt of a sulfate ester of an alkylphenoxy poly(ethyleneoxy)ethanol 28% active)
[2] octylphenoxy polyethoxy ethanol (70% active)
[3] N-(2-aminoethyl)-3-aminopropyltrimethoxysilane
[4] copolymer of styrene, methacrylic acid and acrylonitrile, ratio 25/65/10
[5] copolymer of styrene, acrylonitrile, methacrylic acid and 4-vinylpyridine, ratio 25/10/29/36
[6] homopolymer of 4-vinylpyridine
[7] aq. $H_2SO_4$
[8] aq. NaOH
[9] when dried
[10] when spray dried
Cab-O-Sil M5 Trade Name for Cabot Corporation pyrogenic silica

TABLE 13

Preparation of Intrachromospheruloid/Inorganic Pigment Composition
(parts by weight)

| Example No. 13- | | 1 | 2 | 3 | 4 | 5 |
|---|---|---|---|---|---|---|
| Step A. | | | | | | |
| 1. | Inorganic Pigment Material | Silica | Silica Wet | Cab-O-Sil | Silica | Silica |
| | Trade Name | Wet PP Paper Grade | Reinforcing Grade | M5 | Wet PP Paper Grade | Wet PP Reinforcing Grade |
| | Amount (dry basis) | 50 | 50 | 50 | 50 | 50 |
| | Water | 500 | 500 | 500 | 500 | 500 |
| 2. | Surface Active Agent Material | | | | | |
| | Triton X 405[1] | 10 | — | — | — | — |
| | Duponol ME[2] | — | 10 | — | — | — |
| | Duomeen T[3] | 2 | — | — | — | — |
| | Acetic Acid | 5 | — | 5 | 5 | — |
| 3. | Limited Micronizing (X) | — | — | — | — | — |
| 4. | Primary Particle Size Diameter (microns) | 0.1–1.0 | 0.01–0.05 | <2.0 | 0.1–1.0 | 0.01–0.05 |
| 5. | Separation from Micronizing Medium Screening (X) | — | — | — | — | — |
| 6. | Water, Dilution | — | — | — | — | — |
| 7. | Temperature, °C. | 28 | 28 | 28 | 28 | 28 |
| | pH | 5–6 | 8–9 | 5–6 | 5–6 | 8–9 |
| Step B. | | | | | | |
| 8. | Intrachromospheruloid Pigment, Dispersion From:- | | | | | |
| | Table No. | 6-2 | 4-5 | 3-3 | 3-4 | 4-5 |
| | Quantity | 68 | 140 | 134 | 140 | 140 |
| | Pigment Solids | 11 | 26 | 19 | 27 | 26 |
| 9. | Nitrogenous Material | | | | | |
| | PEI 600[4] | 2 | — | 2 | — | — |
| | Tetraethylenepentamine | — | 2 | — | 2 | 2 |
| 10. | Temperature, °C. | 28 | 28 | 28 | 28 | 28 |
| | pH | 5–6 | 8–9 | 5–6 | 5–6 | 8–9 |
| 11. | Bonding Agent Material | | | | | |
| | "N" Sodium Silicate 28% | — | 50 | — | — | — |
| | N-group polymer 20%[5] | 25 | — | 25 | 25 | — |
| | SMA copolymer 20%[6] | — | — | — | — | 25 |
| | SAMV amphoteric copolymer 20%[7] | — | — | — | — | 25 |
| 12. | Destablizing Agent Material | | | | | |
| | a. Acid (X)[8] | — | X | — | — | X |
| | b. Base (X)[9] | X | — | X | X | — |
| | c. Alcohol (X) | — | — | — | — | — |
| 13. | Temperature, °C. | 30–40 | 30–40 | 30–40 | 30–40 | 30–40 |
| | pH | 8–9 | 4–5 | 8–9 | 8–9 | 4–5 |
| 14. | Reaction Temperature, °C. | 80 | 80 | 80 | 80 | 80 |
| 15. | Reaction Time, hours, approx. | 4 | 4 | 4 | 4 | 4 |
| 16. | Primary Particle Size Diameter (microns) | <4.0 | <4.0 | <4.0 | <4.0 | 4.0 |
| 17. | Yield - Intrachromospheruloid/ Inorganic Pigment Composition Dispersion Approx. | 1300 | 1300 | 1200 | 1200 | 1300 |

TABLE 13-continued

Preparation of Intrachromospheruloid/Inorganic Pigment Composition
(parts by weight)

| Example No. 13- | | 1 | 2 | 3 | 4 | 5 |
|---|---|---|---|---|---|---|
| 18. | Pigment Recovery Method | | | | | |
| | a. Filtration (X) | X | X | X | X | X |
| | b. Spray Drying (X) | X | X | X | X | X |
| 19. | Product Available As:- | | | | | |
| | a. Wet Coagulum (X) | X | X | X | X | X |
| | b. Dry Coagulum (X)[10] | X | X | X | X | X |
| | c. Spray Dried Powder (X)[11] | X | X | X | X | X |
| 20. | Intrachromospheruloid/Inorganic Pigment Composition Yield (dry basis) | 66 | 90 | 74 | 82 | 86 |

[1] octylphenoxy polyethoxy ethanol (70% active)
[2] sodium lauryl sulfate (100% active)
[3] N-tallow trimethylene diamine (85% active)
[4] water soluble polyethylenimine, manufactured by Dow
[5] homopolymer of 4-vinylpyridine
[6] copolymer of styrene, methacrylic acid and acrylonitrile, ratio 25/65/10
[7] copolymer of styrene, acrylonitrile, methacrylic acid and 4-vinylpyridine ratio 25/10/29/36
[8] acetic
[9] $NH_4OH$
[10] when dried
[11] when spray dried
Cab-O-Sil M5 Trade Name for Cabot Corporation pyrogenic silica

TABLE 14

Preparation of Intrachromospheruloid/Inorganic Pigment Composition
(parts by weight)

| Example No. 14- | | 1 | | 2 | |
|---|---|---|---|---|---|
| Step A. | | | | | |
| 1. | Inorganic Pigment Material | | | | |
| | Trade Name | HiSil 233 | TiPure R941 Slurry | HiSil 404 | TiPure LW |
| | Amount, (dry basis) | 30 | 40 | 30 | 40 |
| | Water | | 400 | | 400 |
| 2. | Surface Active Agent Material | | | | |
| | Duponol ME[1] | | — | | 3 |
| | Blancol[2] | | — | | 2 |
| | Tamol 731[3] | | — | | 7 |
| | Monazoline T[4] | | 20 | | — |
| | Acetic Acid | | 10 | | — |
| 3. | Limited Micronizing (X) | | X | | X |
| 4. | Primary Particle Size Diameter (microns) | | 0.1–2.0 | | <2.0 |
| 5. | Separation from Micronizing Medium Screening (X) | | X | | X |
| 6. | Water, Dilution | | 200 | | 200 |
| 7. | Temperature, ° C. | | 28 | | 28 |
| | pH | | 5 | | 8–9 |
| Step B. | | | | | |
| 8. | Intrachromospheruloid/Pigment, Dispersion From:- | | | | |
| | Table No. | | 3–5 | | 1–1 |
| | Quantity | | 135 | | 140 |
| | Pigment Solids | | 20 | | 24 |
| 9. | Nitrogenous Material | | | | |
| | Tetraethylenepentamine | | — | | 2 |
| 10. | Temperature, ° C. | | 28 | | 28 |
| | pH | | 5 | | 8–9 |
| 11. | Bonding Agent Material | | — | | — |
| 12. | Destabilizing Agent Material | | | | |
| | a. Acid (X)[5] | | — | | X |
| | b. Base (X)[6] | | X | | — |
| | c. Alcohol (X) | | — | | — |
| 13. | Temperature, ° C. | | 30–40 | | 30–40 |
| | pH | | 8–9 | | 4–5 |
| 14. | Reaction Temperature, ° C. | | 80 | | 80 |
| 15. | Reaction Time, hours Approx. | | 5 | | 5 |
| 16. | Primary Particle Size Diameter (microns) | | <4.0 | | <4.0 |
| 17. | Yield - Intrachromospheruloid/Inorganic Pigment Composition Dispersion Approx. | | 1500 | | 1500 |
| 18. | Pigment Recovery Method | | | | |
| | a. Filtration (X) | | X | | X |
| | b. Spray Drying (X) | | X | | X |
| 19. | Product Available As:- | | | | |
| | a. Wet Coagulum (X) | | X | | X |
| | b. Dry Coagulum (X)[7] | | X | | X |
| | c. Spray Dried Powder (X)[8] | | X | | X |
| 20. | Intrachromospheruloid/Inorganic Pigment Composition | | | | |

TABLE 14-continued

Preparation of Intrachromospheruloid/Inorganic Pigment Composition
(parts by weight)

| Example No. 14- | 1 | 2 |
|---|---|---|
| Yield (dry basis) | 90 | 94 |

[1] sodium lauryl sulfate (100% active)
[2] sodium salt of a sulfonated naphthalene-formaldehyde condensate (86% active)
[3] sodium salt of a polymeric carboxylic acid (100% active)
[4] substituted imidazoline of tall oil (100% active)
[5] hydroxy acetic
[6] $NH_4OH$
[7] when dried
[8] when spray dried
HiSil 233 Trade Name for PPG Industries precipitated silica, reinforcing grade
HiSil 404 Trade Name for PPG Industries precipitated silica, paper grade
TiPure R941 Trade Name for DuPont titanium dioxide pigment
TiPure LW Trade Name for DuPont titanium dioxide pigment

TABLE 15

Preparation of Intrachromospheruloid/Inorganic Pigment Composition
(parts by weight)

| Example No. 15- | 1 | | | 2 | |
|---|---|---|---|---|---|
| Step A. | | | | | |
| 1. Inorganic Pigment Material | Silica | | | Silica | |
| Trade Name | Wet PP Paper Grade | TiPure R941 Slurry | Wet PP Reinforcing Grade | | TiPure LW |
| Amount (dry basis) | 25 | 40 | 30 | | 40 |
| Water | | 500 | | | 500 |
| 2. Surface Active Agent Material | | | | | |
| Duponol ME[1] | | 2 | | | 2 |
| Alipal CO 433[2] | | 90 | | | 90 |
| 3. Limited Micronizing (X) | | X | | | X |
| 4. Primary Particle Size Diameter (microns) | <2.0 | 0.2–0.5 | <2.0 | | <0.2 |
| 5. Separation from Micronizing Medium Screening (X) | | X | | | X |
| 6. Water, Dilution | | 200 | | | 200 |
| 7. Temperature, °C. | | 28 | | | 28 |
| pH | | 8–9 | | | 8–9 |
| Step B. | | | | | |
| 8. Intrachromospheruloid Pigment, Dispersion From:- | | | | | |
| Table No. | | 2–4 | | | 5–3 |
| Quantity | | 134 | | | 140 |
| Pigment Solids | | 22 | | | 25 |
| 9. Nitrogenous Material | | | | | |
| Monaquat TIBC[3] | | 2 | | | 2 |
| 10. Temperature, °C. | | 28 | | | 28 |
| pH | | 8–9 | | | 8–9 |
| 11. Bonding Agent Material | | | | | |
| "N" Sodium Silicate | | 50 | | | — |
| SMA copolymer 20%[4] | | — | | | 50 |
| 12. Destabilizing Agent Material | | | | | |
| a. Acid (X)[5] | | X | | | X |
| b. Base (X) | | — | | | — |
| c. Alcohol (X)[6] | | X | | | X |
| 13. Temperature, °C. | | 30–40 | | | 30–40 |
| pH | | 4–5 | | | 4–5 |
| 14. Reaction Temperature, °C. | | 75 | | | 75 |
| 15. Reaction Time, hours, approx. | | 5 | | | 5 |
| 16. Primary Particle Size Diameter (microns) | | <4.0 | | | <4.0 |
| 17. Yield - Intrachromospheruloid/ Inorganic Pigment Composition Dispersion | | 1800 | | | 1800 |
| 18. Pigment Recovery Method | | | | | |
| a. Filtration (X) | | X | | | X |
| b. Spray Drying (X) | | X | | | X |
| 19. Product Available As: | | | | | |
| a. Wet Coagulum (X) | | X | | | X |
| b. Dry Coagulum (X)[7] | | X | | | X |
| c. Spray Dried Powder (X)[8] | | X | | | X |
| 20. Intrachromospheruloid/ Inorganic Pigment Composition | | | | | |

TABLE 15-continued

Preparation of Intrachromospheruloid/Inorganic Pigment Composition
(parts by weight)

| Example No. 15- | 1 | 2 |
|---|---|---|
| Yield (dry basis) | 101 | 105 |

[1] sodium lauryl sulfate (100% active)
[2] sodium salt of a sulfate ester of an alkylphenoxy poly(ethylenoxy)ethanol (28% active)
[3] substituted imidazoline quaternized with benzyl chloride (100% active)
[4] copolymer of styrene, methacrylic acid and acrylonitrile, ratio 25/65/10
[5] acetic
[6] isopropyl
[7] when dried
[8] when spray dried
TiPure R941 Trade Name for DuPont titanium dioxide pigment
TiPure LW Trade Name for DuPont titanium dioxide pigment

TABLES 16–22

Preparation of Intrachromospheruloid Pigment Component Using Noncross-linked Polymer Combinations.

TABLE 16

Preparation of Intrachromospheruloid Pigment
(Parts by weight)

| Example No. 16- | 1 | 2 | 3 | 4 | 5 |
|---|---|---|---|---|---|
| A. Micronizing Step | | | | | |
| 1. Pigment Class | Phthalocyanine | Quinacridone | Azamethine | Dioxazine | Azo |
| Trade Name | Heliogen Blue BG | Monastral Red B | Irgazin Yellow 3RLT | Irgazin Violet 6RLT | Hansa Yellow G |
| Color Index Name | Blue 15 | Violet 19 | Yellow 110 | — | Yellow 1 |
| Color Index Number | 74160 | 46500 | — | — | 11680 |
| Pigment, dry basis | 20 | 30 | 40 | 20 | 40 |
| Presscake, dry solids | 35 | — | — | — | 35 |
| Presscake, wet | 57 | — | — | — | 115 |
| 2. Surface Active Agent* Material (Trade Name) | | | | | |
| Alipal CO 433[1] | 18 | 178 | — | 10 | 5 |
| Tamol SN[2] | 2 | 2 | 1 | — | — |
| Duponol ME[3] | — | — | 2 | 5 | 5 |
| Tamol 731[4] | — | — | 7 | 5 | 5 |
| Triton X 405[5] | — | — | — | — | 10 |
| 3. Water | | | | | |
| Quantity | 163 | 220 | 250 | 260 | 260 |
| 4. Micronizing | | | | | |
| Method | sand | sand | sand | ball | sand |
| Time, hours, approx. | 48 | 24 | 48 | 60 | 48 |
| Temperature, 0° C. | 28 | 28 | 28 | 28 | 28 |
| Average Particle Size Diameter (microns) | <0.02 | <0.2 | <0.2 | <0.02 | <0.2 |
| 5. Separation | | | | | |
| Screening (X) | X | X | X | X | X |
| 6. Water Dilution | 160 | 70 | 200 | 200 | 200 |
| 7. | | | | | |
| Aqueous 400 | 500 | 500 | 500 | 600 | |
| Dispersion Polymerization Step | | | | | |
| 8. Surface Active Agent* | | | | | |
| a. Quantity Type | 60[1] | — | 25[3] | 25[3] | 20[3] |
| b. Quantity Type | — | — | 10[4] | — | — |
| Water | 40 | — | 65 | 75 | 80 |
| 9. Monomer Material Non-crosslinking | | | | | |
| Styrene | 100 | — | — | 40 | — |
| Vinyltoluene | — | 95 | — | — | — |
| Acrylonitrile | — | 5 | — | 10 | 10 |
| Methylmethacrylate | — | — | 70 | 20 | 60 |
| 10. Polymerization Initiator | | | | | |
| AZDN[6] | — | 3 | 3 | — | 3 |
| Potassium Persulfate | 3 | — | — | 3 | — |
| Sodium bisulfite | 1.5 | — | — | 1.5 | — |
| 11. Polymerization Condition | | | | | |
| Time, hours | 6 | 5 | 5 | 6 | 5 |
| Temperature, 0° C. | 65 | 80 | 80 | 70 | 80 |
| Conversion, approx. 100% (X) | X | X | X | X | X |
| 12. Intrachromospheruloid Pigment Dispersion | | | | | |
| Yield | 600 | 600 | 670 | 670 | 770 |
| Essentially non-settling | | | | | |

TABLE 16-continued

| | Preparation of Intrachromospheruloid Pigment (Parts by weight) | | | | |
|---|---|---|---|---|---|
| Example No. 16- | 1 | 2 | 3 | 4 | 5 |
| (Latex) (X) | X | X | X | X | X |

*Capable of effecting emulsion polymerization
[1] Sodium salt of a sulfate ester of an alkylphenoxy poly (ethyleneoxy) ethanol (28% active)
[2] Sodium salt of a condensed naphthalene sulfonic acid
[3] Sodium lauryl sulfate (100% active)
[4] Sodium salt of polymeric carboxylic acid (100% active)
[5] Octylphenoxy polyethoxy ethanol (70% active)
[6] Azobisisobutyronitrile

TABLE 17

| | | Preparation of Intrachromospheruloid Pigment (parts by weight) | | | | |
|---|---|---|---|---|---|---|
| Example No. 17- | | 1 | 2 | 3 | 4 | 5 |
| A. | Micronizing Step | | | | | |
| | 1. Pigment Class | Triphenyl- | Vat | Misc. | Dioxazine | Cond. Azo |
| | Trade Name | methane Rhodamine Y | Perylene Red | Green B | Heliogen Violet R | Chromoptal Red BR |
| | Color Index Name | Red 81 | Red 29 | Green 8 | Violet 23 | — |
| | Color Index Number | 45160 | 71140 | 10006 | 51319 | — |
| | Pigment, dry basis | 20 | 25 | 25 | 20 | 20 |
| | Presscake, dry solids | 30 | 25 | 40 | — | — |
| | Presscake, wet | 67 | 100 | 63 | — | — |
| | 2. Surface Active Agent* Material (Trade Name) | | | | | |
| | Duponol ME[1] | 2 | 5 | — | 10 | — |
| | Blancol[2] | 1 | 2 | — | 2 | — |
| | Triton X 405[3] | — | — | 40 | — | 10 |
| | Duomeen T[4] | — | — | — | — | 20 |
| | Tamol 731[5] | 7 | — | — | — | — |
| | 3. Water | | | | | |
| | Quantity | 223 | 193 | 197 | 268 | 250 |
| | 4. Micronizing | | | | | |
| | Method | Sand | Sand | Sand | Ball | Ball |
| | Timee hours, approx. | 48 | 48 | 1 | 60 | 60 |
| | Temperature, °C. | 28 | 28 | 28 | 28 | 28 |
| | Average Particle Size Diameter (microns) | <0.02 | <0.02 | <0.2 | <0.02 | <0.2 |
| | 5. Separation | | | | | |
| | Screening (X) | X | X | X | X | X |
| | 6. Water Dilution | 200 | 200 | 200 | 200 | 200 |
| | 7. Yield | | | | | |
| | Aqueous Pigment Dispersion | 500 | 500 | 500 | 500 | 500 |
| B. | Polymerization Step | | | | | |
| | 8. Surface Active Agent* | | | | | |
| | a. Quantity, type | 20[1] | 25[1] | 10[1] | 25[1] | 20[3] |
| | b. Quantity, type | 20[3] | — | 50[3] | — | 10[4] |
| | Water | 80 | 75 | 40 | 75 | 70 |
| | 9. Monomer Material Non Crosslinking | | | | | |
| | Styrene | 40 | — | 50 | 48 | — |
| | Cyclohexylmethacrylate | 20 | 20 | — | — | — |
| | Methylmethacrylate | — | 20 | — | — | 38 |
| | Dimethylaminoethylmethacrylate | — | — | — | 2 | 2 |
| | Acrylonitrile | — | — | 10 | — | 10 |
| | 10. Polymerization Initiator | | | | | |
| | AZDN[6] | 2.5 | 2 | 2.5 | 2.5 | 2.5 |
| | Cumene hydroperoxide | — | 2 | — | — | — |
| | 11. Polymerization Conditions | | | | | |
| | Time, hours | 5 | 5 | 5 | 5 | 5 |
| | Temperature, °C. | 80 | 80 | 80 | 80 | 80 |
| | Conversion Approx. 100% (X) | X | X | X | X | X |
| | 12. Intrachromospheruloid Pigment Dispersion | | | | | |
| | Yield | 660 | 640 | 660 | 650 | 650 |
| | Essentially non-settling (Latex) (X) | X | X | X | X | X |

*Capable of effecting emulsion polymerization
[1] sodium lauryl sulfate (100% active)
[2] sodium salt of a sulfonated naphthaleneformaldehyde condensate (86% active)
[3] octylphenoxy polyethoxy ethanol (70% active)
[4] N-tallow trimethylene diamine (85% active)
[5] sodium salt of polymeric carboxylic acid (100% active)
[6] azobisisobutyronitrile

TABLE 18

| | | Preparation of Intrachromospheruloid Pigment (parts by weight) | | | | |
|---|---|---|---|---|---|---|
| Example No. 18- | | 1 | 2 | 3 | 4 | 5 |
| A. | Micronizing Step | | | | | |
| | 1. Pigment Class | Phthalo- | Quinacridone | Azamethine | Dioxazine | Azo |

TABLE 18-continued

Preparation of Intrachromospheruloid Pigment
(parts by weight)

| Example No. 18- | | 1 | 2 | 3 | 4 | 5 |
|---|---|---|---|---|---|---|
| | Trade Name | cyanine Heliogen Green A | Magenta | Irgazin Yellow 2GLT | Carbazole Violet | Pigment Carmine FFY |
| | Color Index Name | Green 7 | Red 122 | Yellow 109 | Violet 23 | Red 5 |
| | Color Index Number | 74160 | — | — | 51319 | 12490 |
| | Pigment, dry basis | 10 | 30 | 25 | 20 | 25 |
| | Presscake, dry solids | — | — | — | 20 | 25 |
| | Presscake, wet | — | — | — | 100 | 100 |
| 2. | Surface Active Agent* Material (Trade Name) | | | | | |
| | Triton X 405[1] | 40 | — | — | 20 | 10 |
| | Monazoline T[2] | — | 20 | — | 10 | 20 |
| | Monaquat TIBC[3] | — | 20 | 10 | 20 | — |
| | Zonyl FSC[4] | — | 1 | 1 | — | — |
| | Armac C[5] | — | — | 10 | — | 20 |
| | Zonyl FSN[6] | 1 | — | — | — | 1 |
| 3. | Water | | | | | |
| | Quantity | 249 | 229 | 254 | 150 | 149 |
| 4. | Micronizing | | | | | |
| | Method | Sand | Ball | Sand | Sand | Ball |
| | Time, hours, approx. | 24 | 36 | 48 | 48 | 24 |
| | Temperature, °C. | 28 | 28 | 28 | 28 | 28 |
| | Average Particle Size Diameter (microns) | <0.2 | <0.2 | <0.02 | <0.02 | <0.2 |
| 5. | Separation | | | | | |
| | Screening (X) | X | X | X | X | X |
| 6. | Water dilution | 200 | 200 | 200 | 200 | 200 |
| 7. | Yield | | | | | |
| | Aqueous Pigment Dispersion | 500 | 500 | 500 | 500 | 500 |
| B. | Polymerization Step | | | | | |
| 8. | Surface Active Agent* | | | | | |
| | a. Quantity, type | 50[1] | 20[1] | 40[3] | 40[1] | 45[1] |
| | b. Quantity, type | — | — | — | 20[2] | — |
| | Water | 50 | 80 | 60 | 40 | 55 |
| 9. | Monomer Material Non Crosslinking | | | | | |
| | Styrene | 40 | — | 30 | 10 | 45 |
| | Vinyltoluene | — | 40 | 30 | 20 | — |
| | Methylmethacrylate | 15 | — | — | 30 | — |
| | Dimethylaminoethylmethacrylate | 5 | 10 | 10 | 10 | 5 |
| 10. | Polymerization Initiator | | | | | |
| | AZDN[7] | 2.5 | 2.5 | 3 | 3 | 2.5 |
| 11. | Polymerization Conditions | | | | | |
| | Time, hours | 5 | 5 | 6 | 6 | 5 |
| | Temperature, °C. | 80 | 80 | 80 | 80 | 80 |
| | Conversion Approx. 100% (X) | X | X | X | X | X |
| 12. | Intrachromospheruloid Pigment Dispersion | | | | | |
| | Yield | 660 | 650 | 670 | 670 | 650 |
| | Essentially non-settling (Latex) (X) | X | X | X | X | X |

*Capable of effecting emulsion polymerization.
[1]octylphenoxy polyethoxy ethanol (70% active)
[2]substituted imidazoline of tall oil (100% active)
[3]substituted imidazoline quaternized with benzyl chloride (100% active)
[4]fluorochemical surface active agent (50% active)
[5]N-cocoa amine acetate (100% active)
[6]fluorochemical surface active agent (100% active)
[7]azobisisobutyronitrile

TABLE 19

Preparation of Intrachromospheruloid Pigment
(parts by weight)

| Example No. 19- | | 1 | 2 | 3 | 4 | 5 |
|---|---|---|---|---|---|---|
| A. | Micronizing Step | | | | | |
| 1. | Pigment Class | Phthalocyanine | Quinacridone | Azamethine | Azo | Triphenylmethane |
| | Trade Name | Green EXY | Magenta | Irgazin Orange RLT | Permagan Yellow | Victoria Blue |
| | Color Index Name | Green 41 | Red 122 | Orange 42 | Yellow 14 | Blue 1 |
| | Color Index Number | — | — | — | 21095 | 42595 |
| | Pigment, dry basis | 20 | 30 | 30 | 35 | 30 |
| | Presscake, dry solids | 20 | 25 | — | — | — |
| | Presscake, wet | 100 | 120 | — | — | — |
| 2. | Surface Active Agent* Material (Trade Name) | | | | | |
| | Duponol ME[1] | 2 | 2 | 2 | — | 2 |
| | N-group polymer ME[1] | 20 | — | — | — | — |
| | SAMV - amphoteric Copolymer[3] | — | — | 20 | — | — |
| | SMA Copolymer[4] | — | — | — | 20 | — |
| | Tamol 731[5] | — | 20 | — | — | — |
| | Triton X 405[6] | 10 | — | — | 25 | 30 |

TABLE 19-continued

Preparation of Intrachromospheruloid Pigment
(parts by weight)

| Example No. 19- | | 1 | 2 | 3 | 4 | 5 |
|---|---|---|---|---|---|---|
| 3. | Water | | | | | |
| | Quantity | 268 | 258 | 248 | 220 | 238 |
| 4. | Micronizing | | | | | |
| | Method | Sand | Sand | Sand | Sand | Sand |
| | Time, hours, approx. | 48 | 48 | 48 | 48 | 48 |
| | Temperature, °C. | 28 | 28 | 28 | 28 | 28 |
| | Average Particle Size Diameter (microns) | <0.02 | <0.02 | <0.2 | <0.2 | <0.2 |
| 5. | Separation | | | | | |
| | Screening (X) | X | X | X | X | X |
| 6. | Water Dilution | 200 | 200 | 200 | 200 | 200 |
| 7. | Yield | | | | | |
| | Aqueous Pigment Dispersion | 500 | 500 | 500 | 500 | 500 |
| B. | Polymerization Step | | | | | |
| 8. | Surface Active Agent* | | | | | |
| | a. Quantity, type | $25^1$ | $25^1$ | $20^1$ | $75^6$ | $25^1$ |
| | b. Quantity, type | — | — | $20^6$ | — | $30^3$ |
| | Water | 75 | 75 | 60 | 25 | 45 |
| 9. | Monomer Material Non Crosslinking | | | | | |
| | Styrene | 70 | — | 40 | 80 | — |
| | Methylmethacrylate | — | 70 | 40 | — | 80 |
| | Cyclohexylmethacrylate | 10 | 10 | — | — | — |
| 10. | Polymerization Initiator | | | | | |
| | $AZDN^7$ | — | — | 1 | 3 | 3 |
| | Cumene hydroperoxide | 3 | 3 | 2 | — | — |
| 11. | Polymerization Conditions | | | | | |
| | Time, hours | 6 | 6 | 6 | 6 | 6 |
| | Temperature, °C. | 75 | 75 | 75 | 75 | 75 |
| | Conversion Approx. 100% (X) | X | X | X | X | X |
| 12. | Intrachromospheruloid Pigment Dispersion | | | | | |
| | Yield | 680 | 680 | 680 | 680 | 680 |
| | Essentially non-settling (Latex) (X) | X | X | X | X | X |

*Capable of effecting emulsion polymerization
[1] sodium lauryl sulfate (100% active)
[2] 4-vinylpyridine homopolymer
[3] copolymer of styrene, acrylonitrile, methacrylic acid and 4-vinylpyridine ratio 25/10/29/36
[4] copolymer of styrene, methacrylic and acrylonitrile ratio 25/65/10
[5] sodium salt of polymeric carboxylic acid (100% active)
[6] octylphenoxy polyethoxy ethanol (70% active)
[7] azobisisobutyronitrile

TABLE 20

Preparation of Intrachromospheruloid Pigment
(parts by weight)

| Example No. 20- | | 1 | 2 | 3 | 4 | 5 |
|---|---|---|---|---|---|---|
| A. | Micronizing Step | | | | | |
| 1. | Pigment Class | Vat | Phthalocyanine | Misc. | Azo | Vat |
| | Trade Name | Indanthrene Pink R | Heliogen Blue BGS | Green Gold | Permanent Carmine | Ponsol Jade Green |
| | Color Index Name | Red 1 | Blue 15 | Green 10 | Red 5 | Green 1 |
| | Color Index Number | 73360 | 74160 | 12775 | 12490 | 58925 |
| | Pigment, dry basis | 20 | 25 | 25 | 30 | 35 |
| | Presscake, dry solids | 35 | — | — | — | 20 |
| | Presscake, wet | 57 | — | — | — | 175 |
| 2. | Surface Active Agent* Material (Trade Name) | | | | | |
| | Duponol $ME^1$ | 2 | — | — | — | 2 |
| | Alipal CO 433$^2$ | 7 | 10 | 10 | 10 | 8 |
| | Tamol $SN^3$ | 2 | — | 2 | — | 2 |
| | Tamol 731$^4$ | — | 5 | — | — | — |
| | Zonyl $FSA^5$ | — | 1 | — | 1 | — |
| 3. | Water | | | | | |
| | Quantity | 232 | 259 | 263 | 259 | 215 |
| 4. | Micronizing | | | | | |
| | Method | Sand | Ball | Ball | Sand | Sand |
| | Time, hours, approx. | 48 | 60 | 60 | 48 | 48 |
| | Temperature, °C. | 28 | 28 | 28 | 28 | 28 |
| | Average Particle Size Diameter (microns) | <0.2 | <0.02 | <0.2 | <0.2 | <0.02 |
| 5. | Separation | | | | | |
| | Screening (X) | X | X | X | X | X |
| 6. | Water Dilution | 200 | 200 | 200 | 200 | 200 |
| 7. | Yield | | | | | |
| | Aqueous Pigment Dispersion | 500 | 500 | 500 | 500 | 500 |
| B. | Polymerization Step | | | | | |
| 8. | Surface Active Agent* | | | | | |
| | a. Quantity, type | $20^1$ | $20^1$ | $20^1$ | $20^1$ | $20^1$ |
| | b. Quantity, type | — | — | — | — | — |

TABLE 20-continued

Preparation of Intrachromospheruloid Pigment
(parts by weight)

| Example No. 20- | 1 | 2 | 3 | 4 | 5 |
|---|---|---|---|---|---|
| Water | 80 | 80 | 80 | 80 | 80 |
| 9. Monomer Material | | | | | |
| Non Crosslinking | | | | | |
| Styrene | 70 | 30 | 51 | 70 | — |
| Dimethylaminoethylmethacrylate | 5 | — | — | 10 | 5 |
| 4-vinylpyridine | 10 | — | 10.4 | — | 10 |
| Methacrylic Acid | — | 10 | 8.6 | — | — |
| Methylmethacrylate | 5 | 40 | 20 | — | 75 |
| 10. Polymerization Initiator | | | | | |
| AZDN[6] | 3 | — | 3 | 3 | 3 |
| Cumene hydroperoxide | — | 3 | — | — | — |
| 11. Polymerization Conditions | | | | | |
| Time, hours | 5 | 5 | 6 | 5 | 6 |
| Temperature, °C. | 80 | 80 | 75 | 80 | 75 |
| Conversion Approx. 100% (X) | X | X | X | X | X |
| 12. Intrachromospheruloid Pigment Dispersion | | | | | |
| Yield | 690 | 680 | 690 | 680 | 690 |
| Essentially non-settling (Latex) (X) | X | X | X | X | X |

<sup>o</sup>Capable of effecting emulsion polymerization.
[1]sodium lauryl sulfate (100% active)
[2]sodium salt of a sulfate ester of an alkylphenoxy poly(ethyleneoxy)ethanol (28% active)
[3]sodium salt of condensed naphthalene sulfonic acid
[4]sodium salt of polymeric carboxylic acid (100% active)
[5]fluorochemical surface active agent (50% active)
[6]azobisisobutyronitrile

TABLE 21

Preparation of Intrachromospheruloid Pigment
(parts by weight)

| Example No. 21- | 1 | | 2 | |
|---|---|---|---|---|
| A. Micronizing Step | | | | |
| 1. Pigment Class | Phthalocyanine | Vat methane | Dioxazine | Triphenyl-methane |
| Trade Name | Heliogen Green A | Carbanthrene Yellow G | Irgazin Violet 6RLT | Rhodamine B |
| Color Index Name | Green 7 | Yellow 1 | — | Violet 1 |
| Color Index Number | 74160 | 70600 | — | 45170 |
| Pigment, dry basis | 20 | 20 | 30 | 10 |
| Presscake, dry solids | 35 | 20 | — | — |
| Presscake, wet | 57 | 100 | — | — |
| 2. Surface Active Agent* Material (Trade Name) | | | | |
| Tamol 731[1] | 7 | | — | |
| Duponol ME[2] | 2 | | — | |
| Alipal CO 433[3] | 10 | | — | |
| Duomeen T[4] | — | | 15 | |
| Ammonium hydroxide 28% | 5 | | — | |
| Acetic Acid | — | | 7 | |
| 3. Water, quantity | 69 | | 188 | |
| 4. Micronizing | | | | |
| Method | Sand | | Sand | |
| Time, hours, approx. | 48 | | 48 | |
| Temperature, °C. | 28 | | 28 | |
| Average Particle Size Diameter, (microns) | <0.02 | | <0.2 | |
| 5. Separation | | | | |
| Screening (X) | X | | X | |
| 6. Water Dilution | 250 | | 250 | |
| 7. Yield | | | | |
| Aqueous Pigment Dispersion | 500 | | 500 | |
| B. Polymerization Step | | | | |
| 8. Surface Active Agent* | | | | |
| a. Quantity, type | 20[1] | | 15[4] | |
| b. Quantity, type | — | | — | |
| Water | 80 | | 75 | |
| Acetic Acid | — | | 10 | |
| 9. Monomer Material | | | | |
| Non Crosslinking | | | | |
| Styrene | 45 | | 80 | |
| Methylmethacrylate | 35 | | — | |
| 10. Polymerization Initiator | | | | |
| AZDN[5] | 3 | | 3 | |
| 11. Polymerization Conditions | | | | |
| Time, hours | 5 | | 6 | |
| Temperature, °C. | 80 | | 75 | |
| Conversion Approx. 100% (X) | X | | X | |
| 12. Intrachromospheruloid Pigment Dispersion | | | | |
| Yield | 680 | | 680 | |
| Essentially non-settling | | | | |

TABLE 21-continued

Preparation of Intrachromospheruloid Pigment
(parts by weight)

| Example No. 21- | 1 | 2 |
|---|---|---|
| (Latex) (X) | X | X |

*Capable of effecting emulsion polymerization
[1] sodium salt of a polymeric carboxylic acid (100% active)
[2] sodium lauryl sulfate (100% active)
[3] sodium salt of a sulfate ester of an alkylphenoxy poly(ethyleneoxy)ethanol (28% active)
[4] N-tallow trimethylene diamine (85% active)
[5] azobisisobutyronitrile

TABLE 22

Preparation of Intrachromospheruloid Pigment
(parts by weight)

| Example No. 22- | 1 | | 2 | |
|---|---|---|---|---|
| A. Micronizing Step | | | | |
| 1. Pigment Class | Vat | Azo | Azamethine | Triphenyl-methane |
| Trade Name | Perylene Red Presscake | Permanent Carmine FFY | Irgazin Red 2 BLT | Rhodamine Y |
| Color Index Name | Red 29 | Red 5 | Red 180 | Red 81 |
| Color Index Number | 71140 | 12490 | — | 45160 |
| Pigment, dry basis | 25 | 10 | 20 | 10 |
| Presscake, dry solids | 25 | 25 | — | — |
| Presscake, wet | 100 | 40 | — | — |
| 2. Surface Active Agent* Material (Trade Name) | | | | |
| Triton X 405[1] | 20 | | — | |
| Duponol ME[2] | 2 | | — | |
| Duomeen T[3] | — | | 24 | |
| Acetic Acid | — | | 12 | |
| 3. Water, Quantity | 88 | | 234 | |
| 4. Micronizing | | | | |
| Method | Sand | | Ball | |
| Time, hours, approx. | 48 | | 60 | |
| Temperature, °C. | 28 | | 28 | |
| Average Particle Size Diameter (microns) | <0.02 | | <0.2 | |
| 5. Separation | | | | |
| Screening (X) | X | | X | |
| 6. Water, dilution | 250 | | 200 | |
| 7. Yield | | | | |
| Aqueous Pigment Dispersion | 500 | | 500 | |
| B. Polymerization Step | | | | |
| 8. Surface Active Agent* | | | | |
| a. Quantity, type | 20 | | — | |
| b. Quantity, type | 10 | | — | |
| Water | 70 | | 100 | |
| 9. Monomer Material Non Crosslinking | | | | |
| Methylmethacrylate | 40 | | 58 | |
| Cyclohexylmethacrylate | 20 | | — | |
| Dimethylaminoethylmethacrylate | 2 | | 2 | |
| 10. Polymerization Initiator | | | | |
| AZDN[4] | 2.5 | | 2.5 | |
| 11. Polymerization Conditions | | | | |
| Time, hours | 5 | | 5 | |
| Temperature, °C. | 80 | | 80 | |
| Conversion Approx. 100% (X) | X | | X | |
| 12. Intrachromospheruloid Pigment Dispersion | | | | |
| Yield | 662 | | 660 | |
| Essentially non-settling (Latex) (X) | X | | X | |

*Capable of effecting emulsion polymerization
[1] octylphenoxy polyethoxy ethanol (70% active)
[2] sodium lauryl sulfate (100% active)
[3] N-tallow trimethylene diamine (85% active)
[4] azobisisobutyronitrile

TABLES 23–30
Preparation of Intrachromospheruloid/Inorganic Pigment Compositions from Intrachromospheruloid Pigment Material Produced in Tables 16–22.

TABLE 23

Preparation of Intrachromospheruloid/Inorganic Pigment Composition
(parts by weight)

| Example No. 23- | 1 | 2 | 3 | 4 | 5 |
|---|---|---|---|---|---|
| Step A | | | | | |

TABLE 23-continued

Preparation of Intrachromospheruloid/Inorganic Pigment Composition (parts by weight)

| Example No. 23- | | 1 | 2 | 3 | 4 | 5 |
|---|---|---|---|---|---|---|
| 1. | Inorganic Pigment Material | | | | | |
| | Trade Name | Celite 281 | HiSil 404 | Cab-O-Sil M5 | Al-Sil-Ate H0 | Excelopax |
| | Amount, dry basis | 100 | 100 | 100 | 80 | 100 |
| | Water | 1000 | 1000 | 1000 | 1000 | 600 |
| 2. | Surface Active Agent Material | | | | | |
| | Duponol ME[1] | 5 | 5 | — | — | 5 |
| | Aerosol 22[2] | — | — | 20 | — | — |
| | Triton X 305[3] | — | — | — | 5 | — |
| | Tamol SN[4] | — | — | — | 1 | 1 |
| 3. | Limited Micronizing (X) | X | X | X | X | X |
| 4. | Primary Particle Size | | | | | |
| | Diameter (microns) | <2.0 | <2.0 | <2.0 | <2.0 | <2.0 |
| 5. | Separation from Micronizing | | | | | |
| | Medium, Screening (X) | X | X | X | X | X |
| 6. | Water, Dilution | 200 | 200 | 200 | 200 | 200 |
| 7. | Temperature, °C. | 28 | 28 | 28 | 28 | 28 |
| | pH | 8-9 | 8-9 | 8-9 | 8-9 | 8-9 |
| Step B | | | | | | |
| 8. | Intrachromospheruloid Pigment, Dispersion From: | | | | | |
| | Table No. | 16-1 | 16-3 | 16-5 | 16-4 | 17-2 |
| | Quantity | 600 | 670 | 770 | 670 | 640 |
| | Pigment solids | 120 | 110 | 110 | 90 | 65 |
| 9. | Nitrogenous Material | | | | | |
| | Tetraethylenepentamine | 2 | 2 | 2 | — | — |
| | Monazoline T[5] | — | — | — | 2 | — |
| | Monaquat TIBC[6] | — | — | — | — | 2 |
| 10. | Temperature, °C. | 28 | 28 | 28 | 28 | 28 |
| | pH | 8-9 | 8-9 | 8-9 | 8-9 | 8-9 |
| 11. | Bonding Agent Material | | | | | |
| | "N" sodium silicate 28% | 50 | — | — | 50 | — |
| | Urea | — | 10 | — | — | — |
| | Formaldehyde 30% | — | 20 | — | — | — |
| | Z6020 Silane[7] | — | — | — | — | 5 |
| 12. | Destabilizing Agent Material | | | | | |
| | (a) acid (X)[8] | X | X | X | X | X |
| | (b) base (X) | — | — | — | — | — |
| | (c) alcohol (X)[9] | X | X | — | — | — |
| 13. | Temperature, °C. | 30 | 30 | 30 | 30 | 30 |
| | pH | 4-5 | 4-5 | 4-5 | 4-5 | 4-5 |
| 14. | Reaction Temperature, °C. | 75 | 75 | 75 | 75 | 75 |
| 15. | Reaction Time, hours, approx. | 3 | 3 | 3 | 3 | 3 |
| 16. | Primary Particle Size | | | | | |
| | Diameter (microns) | <4 | <4 | <4 | <4 | <4 |
| 17. | Yield - Intrachromospheruloid/ Inorganic Pigment Composition Dispersion, Approx. | 2000 | 2000 | 2000 | 2000 | 1500 |
| 18. | Pigment Recovery Method | | | | | |
| | (a) Filtration (X) | — | — | — | — | — |
| | (b) Spray Drying (X) | X | X | X | X | X |
| 19. | Product Available as: | | | | | |
| | (a) Wet Coagulum (X) | — | — | — | — | — |
| | (b) Dry Coagulum (X) | — | — | — | — | — |
| | (c) Spray Dried Powder (X) | X | X | X | X | X |
| 20. | Intrachromospheroloid/ Inorganic Pigment Composition Yield (dry basis) approx | 265 | 269 | 257 | 226 | 210 |

[1] sodium lauryl sulfate (100% active)
[2] tetrasodium N-(1,2,dicarboxy)-n-octadecylsulfosuccinamate (35% active)
[3] octylphenoxy polyethoxy ethanol (70% active)
[4] sodium salt of a condensed naphthaline sulfonic acid
[5] substituted imidazoline of tall oil (100% active)
[6] substituted imidazoline quaternized with benzyl chloride (100% active)
[7] N-(2-aminoethyl)-3-aminopropyltrimethoxysilane
[8] acetic
[9] isopropyl
Celite 281 Trade Name for Johns-Manville natural silica
HiSil 404 Trade Name for PPG Industries precipitated silica paper grade
Cab-O-Sil M5 Trade Name for PPG Industries precipitated silica reinforcing grade
Al-Sil-Ate HO Trade Name for Freeport Kaolin aluminum silicate
Execelopax Trade Name for NL Industries zirconium silicate

TABLE 24

Preparation of Intrachromospheruloid/Inorganic Pigment Composition (parts by weight)

| Example No. 24- | | 1 | 2 | 3 | 4 | 5 |
|---|---|---|---|---|---|---|
| Step A | | | | | | |
| 1. | Inorganic Pigment Material | | | | | |
| | Trade Name | Aluminum Hydrate | Oncor 23A | Zinc Oxide | Zirconium Oxide | TiPure LW |
| | Amount, dry basis | 70 | 40 | 40 | 50 | 50 |
| | Water | 500 | 300 | 300 | 300 | 300 |

TABLE 24-continued

Preparation of Intrachromospheruloid/Inorganic Pigment Composition
(parts by weight)

| Example No. 24- | | 1 | 2 | 3 | 4 | 5 |
|---|---|---|---|---|---|---|
| 2. | Surface Active Agent Material | | | | | |
| | Duponol ME[1] | 10 | — | 10 | — | — |
| | Duomeen T[2] | — | 10 | — | 10 | — |
| | Alipal CO 433[3] | — | — | — | — | 10 |
| | Acetic Acid | — | 5 | — | 5 | — |
| 3. | Limited Micronizing (X) | X | X | X | X | X |
| 4. | Primary Particle Size | | | | | |
| | Diameter (microns) | <2.0 | <2.0 | <2.0 | <2.0 | <2.0 |
| 5. | Separation from Micronizing | | | | | |
| | Medium Screening (X) | X | X | X | X | X |
| 6. | Water, Dilution | 300 | 200 | 200 | 200 | 200 |
| 7. | Temperature, °C. | 28 | 28 | 28 | 28 | 28 |
| | pH | 8-9 | 5 | 8-9 | 5 | 8-9 |
| Step B | | | | | | |
| 8. | Intrachromospheruloid Pigment, Dispersion From: | | | | | |
| | Table No. | 22-1 | 18-2 | 17-3 | 18-3 | 18-1 |
| | Quantity | 133 | 130 | 132 | 134 | 132 |
| | Pigment Solids | 19 | 16 | 17 | 19 | 14 |
| 9. | Nitrogenous Material | | | | | |
| | Duomac T[4] | — | 5 | — | — | — |
| | PEI 18[5] | 5 | — | — | — | — |
| | Tetraethylenepentamine | — | — | 2 | — | 2 |
| 10. | Temperature, °C. | 28 | 28 | 28 | 28 | 28 |
| | pH | 8-9 | 5 | 8-9 | 5 | 8-9 |
| 11. | Bonding Agent Material | | | | | |
| | Titanium oxychloride | — | 10 | — | — | — |
| | SAMV Copolymer 20%[6] | — | — | — | 100 | — |
| | SMA Copolymer 20%[7] | — | — | — | — | 100 |
| | Preformed aminoplast[8] | — | — | 10 | — | — |
| 12. | Destabilizing Agent Material | | | | | |
| | (a) Acid (X)[9] | X | — | — | — | X |
| | (b) Base (X)[10] | — | X | — | X | — |
| | (c) Alcohol (X)[11] | — | — | X | — | — |
| 13. | Temperature, °C. | 30 | 30 | 30 | 30 | 30 |
| | pH | 4-5 | 9-10 | 8-9 | 9-10 | 4-5 |
| 14. | Reaction Temperature, °C. | 75 | 75 | 75 | 75 | 75 |
| 15. | Reaction Time, Hours, Approx. | 4 | 4 | 4 | 4 | 4 |
| 16. | Primary Particle Size | | | | | |
| | Diameter (microns) | <4.0 | <4.0 | <4.0 | Inorganic 4.0 | <4.0 |
| 17. | Yield - Intrachromospheruloid/ Inorganic Pigment Composition Dispersion Approx. | 1000 | 1000 | 1000 | 1000 | 1000 |
| 18. | Pigment Recovery Method | | | | | |
| | (a) Filtration (X) | X | X | X | X | X |
| | (b) Spray Drying (X) | — | — | — | — | — |
| 19. | Product Available as:- | | | | | |
| | (a) Wet coagulum (X) | X | X | X | X | X |
| | (b) Dry coagulum (X)[12] | X | — | X | X | X |
| | (c) Spray Dried Powder (X) | — | — | — | — | — |
| 20. | Intrachromospheruloid/ Inorganic Pigment Composition Yield (dry basis) approx. | 94 | 62 | 67 | 89 | 84 |

[1] sodium lauryl sulfate (100% active)
[2] N-tallow trimethylene diamine (85% active)
[3] sodium salt of a sulfate ester of an alkylphenoxy poly(ethyleneoxy)ethanol 28% active
[4] N-tallow trimethylene diamine diacetate (85% active)
[5] water soluble polyethylenimine, manufactured by Dow
[6] copolymer of styrene, acrylonitrile, methacrylic acid and 4-vinylpyridine ratio 25/10/29/36
[7] copolymer of styrene, methacrylic acid and acrylonitrile, ratio 25/65/10
[8] condensation product of 1 mole of melamine with 1.5 moles of formaldehyde
[9] acetic
[10] $NH_4OH$
[11] isopropyl
[12] when dried
Oncor 23A Trade Name for NL Industries antimony oxide pigment
TiPure LW Trade Name for Dupont titanium dioxide pigment

TABLE 25

Preparation of Intrachromospheruloid/Inorganic Pigment Composition
(parts by weight)

| Example No. 25- | | 1 | 2 | 3 | 4 | 5 |
|---|---|---|---|---|---|---|
| Step A | | | | | | |
| 1. | Inorganic Pigment Material | | | | | |
| | Trade Name | Aluminum Hydrate | Oncor 23A | Zinc Oxide | Zirconium Oxide | TiPure LW |
| | Amount, (dry basis) | 60 | 50 | 50 | 40 | 40 |
| | Water | 400 | 300 | 300 | 300 | 300 |
| 2. | Surface Active Agent Material | | | | | |
| | Alipal CO 433[1] | 10 | — | — | — | — |
| | Duponol ME[2] | — | 5 | — | 5 | — |
| | Triton X 405[3] | — | — | 10 | — | 10 |

TABLE 25-continued

Preparation of Intrachromospheruloid/Inorganic Pigment Composition (parts by weight)

| Example No. 25- | | 1 | 2 | 3 | 4 | 5 |
|---|---|---|---|---|---|---|
| | Polyfon H[4] | 1 | — | 1 | — | 1 |
| 3. | Limited Micronizing (X) | X | X | X | X | X |
| 4. | Primary Particle Size Diameter (microns) | <2.0 | <2.0 | <2.0 | <2.0 | <2.0 |
| 5. | Separation from Micronizing Medium Screening (X) | X | X | X | X | X |
| 6. | Water, Dilution | 300 | 200 | 300 | 200 | 300 |
| 7. | Temperature, °C. | 28 | 28 | 28 | 28 | 28 |
| | pH | 8–9 | 8–9 | 8–9 | 8–9 | 8–9 |
| Step B | | | | | | |
| 8. | Intrachromospheruloid Pigment, Dispersion From:- | | | | | |
| | Table No. | 20-3 | 20-4 | 20-5 | 17-3 | 18-1 |
| | Quantity | 69 | 136 | 138 | 132 | 66 |
| | Pigment Solids | 11 | 22 | 25 | 17 | 7 |
| 9. | Nitrogenous Material | | | | | |
| | Tetraethylenepentamine | — | 2 | — | 2 | 2 |
| 10. | Temperature, °C. | 28 | 28 | 28 | 28 | 28 |
| | pH | 8–9 | 8–9 | 8–9 | 8–9 | 8–9 |
| 11. | Bonding Agent Material | | | | | |
| | Z6020 Silane[5] | — | — | — | — | 5 |
| | "N" Sodium Silicate 28% | — | 25 | — | — | — |
| 12. | Destabilizing Agent Material | | | | | |
| | (a) Acid (X)[6] | X | X | — | X | X |
| | (b) Base (X) | — | — | — | — | — |
| | (c) Alcohol (X)[7] | X | — | X | — | — |
| 13. | Temperature, °C. | 30 | 30 | 30 | 30 | 30 |
| | pH | 6–7 | 4–5 | 8–9 | 5 | 4–5 |
| 14. | Reaction Temperature, °C. | 80 | 80 | 80 | 80 | 80 |
| 15. | Reaction Time, hours, approx. | 3 | 3 | 3 | 3 | 4 |
| 16. | Primary Particle Size Diameter (microns) | <4.0 | <4.0 | <4.0 | <4.0 | <4.0 |
| 17. | Yield - Intrachromospheruloid/ Inorganic Pigment Composition Dispersion Approx. | 1000 | 1000 | 1000 | 1000 | 1000 |
| 18 | Pigment Recovery Method | | | | | |
| | (a) Filtration (X) | X | X | X | X | X |
| | (b) Spray Drying (X) | X | X | X | X | X |
| 19. | Product Available as:- | | | | | |
| | (a) Wet Coagulum (X) | X | X | X | X | X |
| | (b) Dry Coagulum (X)[8] | X | X | X | X | X |
| | (c) Spray Dried Powder (X)[9] | X | X | X | X | X |
| 20. | Intrachromospheruloid/ Inorganic Pigment Composition Yield (dry basis) | 71 | 79 | 75 | 57 | 52 |

[1] sodium salt of a sulfate ester of an alkylphenoxy poly(ethyleneoxy)ethanol (28% active)
[2] sodium lauryl sulfate (100% active)
[3] octylphenoxy polyethoxy ethanol (70% active)
[4] sodium lignin sulfonate (100% active)
[5] N-(2-aminoethyl)-3-aminopropyltrimethoxysilane
[6] hydroxyacetic
[7] isopropyl
[8] when dried
[9] when spray dried
Oncor 23A Trade Name for NL Industries antimony oxide pigment
TiPure LW Trade Name for DuPont titanium dioxide pigment

TABLE 26

Preparation of Intrachromospheruloid/Inorganic Pigment Composition (parts by weight)

| Example No. 26- | | 1 | 2 | 3 | 4 | 5 |
|---|---|---|---|---|---|---|
| Step A | | | | | | |
| 1. | Inorganic Pigment Material | | | | | |
| | Trade Name | Ludox Colloidal Silica HS40 | Micro-Cel TiPure T.38 | Calcium R941 Slurry | Alumina Carbonate | |
| | Amount (dry basis) | 100 | 100 | 50 | 50 | 50 |
| | Water | 1000 | 1000 | 200 | 300 | 300 |
| 2. | Surface Active Agent Material | | | | | |
| | Tamol 731[1] | — | 10 | — | — | — |
| | Tamol SN[2] | — | 2 | — | — | — |
| | Triton X 405[3] | — | 5 | — | 5 | 5 |
| | Duomeen T[4] | — | — | — | — | 5 |
| | Acetic Acid | — | — | — | — | 3 |
| 3. | Limited Micronizing (X) | — | X | — | X | X |
| 4. | Primary Particle Size Diameter (microns) | <0.02 | <2.0 | <2.0 | <2.0 | <2.0 |
| 5. | Separation from Micronizing Medium Screening (X) | — | X | — | X | X |
| 6. | Water, Dilution | — | 300 | — | 300 | 300 |
| 7. | Temperature, °C. | 28 | 28 | 28 | 28 | 28 |
| | pH | 8–9 | 8–9 | 8–9 | 8–9 | 5 |
| Step B | | | | | | |

TABLE 26-continued

Preparation of Intrachromospheruloid/Inorganic Pigment Composition
(parts by weight)

| Example No. 26- | | 1 | 2 | 3 | 4 | 5 |
|---|---|---|---|---|---|---|
| 8. | Intrachromospheruloid Pigment, Dispersion From:- | | | | | |
| | Table No. | 16-2 | 17-1 | 16-2 | 17-1 | 17-5 |
| | Quantity | 600 | 660 | 120 | 66 | 65 |
| | Pigment Solids | 130 | 80 | 26 | 8 | 7 |
| 9. | Nitrogenous Material | | | | | |
| | Armac T[5] | 5 | — | — | — | — |
| | Tetraethylenepentamine | — | 2 | — | 5 | 5 |
| | Duomac T[6] | — | 2 | 2 | — | — |
| 10. | Temperature, °C. | 28 | 28 | 28 | 28 | 28 |
| | pH | 8-9 | 8-9 | 8-9 | 8-9 | 5 |
| 11. | Bonding Agent Material | | | | | |
| | Z6062 Silane[7] | 5 | — | 5 | — | — |
| | SMA Copolymer 20%[8] | — | — | — | 100 | — |
| | N-Group Polymer 20%[9] | — | 100 | — | — | — |
| | Zirconium oxychloride | — | — | — | — | 10 |
| 12. | Destabilizing Agent Material | | | | | |
| | (a) Acid (X)[10] | X | X | X | — | — |
| | (b) Base (X)[11] | — | — | — | — | X |
| | (c) Alcohol (X)[12] | — | — | — | X | — |
| 13. | Temperature, °C. | 30-40 | 30-40 | 30-40 | 30-40 | 30-40 |
| | pH | 4-5 | 6 | 4-5 | 8-9 | 9-10 |
| 14. | Reaction Temperature, °C. | 75 | 80 | 75 | 75 | 80 |
| 15. | Reaction Time, hours, approx. | 5 | 4 | 4 | 4 | 3 |
| 16. | Primary Particle Size | | | | | |
| | Diameter (microns) | <4 | <4 | <4 | <4 | <4 |
| 17. | Yield - Intrachromospheruloid/ Inorganic Pigment Composition Dispersion Approx. | 1600 | 1600 | 500 | 1000 | 800 |
| 18. | Pigment Recovery Method | | | | | |
| | (a) Filtration (X) | — | — | X | X | X |
| | (b) Spray Drying (X) | X | X | — | — | — |
| 19. | Product Available as:- | | | | | |
| | (a) Wet Coagulum (X) | — | — | X | X | X |
| | (b) Dry coagulum (X)[13] | — | — | X | X | X |
| | (c) Spray Dried Powder (X) | X | X | — | — | — |
| 20. | Intrachromospheroloid/Inorganic Pigment Composition Yield | | | | | |
| | Yield (dry basis) approx. | 240 | 192 | 81 | 78 | 61 |

[1] sodium salt of polymeric carboxylic acid (100% active)
[2] sodium salt of condensed naphthalene sulfonic acid
[3] octylphen polyethoxy ethanol (70% active)
[4] N-tallow trimethylene diamine (85% active)
[5] acetic acid salt of N-alkylamine (100% active)
[6] N-tallow trimethylene diamine diacetate (85% active)
[7] N-(2-aminoethyl)-3-Aminopropyltrimethoxysilane
[8] copolymer of styrene, methacrylic acid and acrylonitrile, ratio 25/65/10
[9] homopolymer of 4-vinylpyridine
[10] acetic
[11] NH$_4$OH
[12] isopropyl
[13] when dried Ludox Trade Name for DuPont colloidal silica
Micro-Cel T38 Trade Name for Johns-Manville calcium silicate
TiPure R941 Trade Name for DuPont titanium dioxide

TABLE 27

Preparation of Intrachromospheruloid/Inorganic Pigment Composition
(parts by weight)

| Example No. 27- | | 1 | 2 | 3 | 4 | 5 |
|---|---|---|---|---|---|---|
| Step A | | | | | | |
| 1. | Inorganic Pigment Material | | | | | |
| | Trade Name | Silica Wet PP Paper Grade | Silica Wet PP Reinforcing Grade | Cab-O-Sil H5 | Silica Wet PP Paper Grade | Silica Wet PP Reinforcing Grade |
| | Amount (dry basis) | 50 | 50 | 50 | 50 | 50 |
| | Water | 500 | 500 | 500 | 500 | 500 |
| 2. | Surface Active Agent Material | | | | | |
| | Alipal Co 433[1] | — | 20 | 20 | 20 | 20 |
| | Triton X 400[2] | 40 | — | — | — | — |
| | Acetic Acid | 20 | — | — | — | — |
| 3. | Limited Micronizing (X) | — | — | — | — | — |
| 4. | Primary Particle Size | | | | | |
| | Diameter (microns) | 0.1-1.0 | 0.01-0.05 | <2.0 | 0.1-1.0 | 0.01-0.05 |
| 5. | Separation from Micronizing Medium Screening (X) | — | — | — | — | — |
| 6. | Water, Dilution | — | — | — | — | — |
| 7. | Temperature, °C | 28 | 28 | 28 | 28 | 28 |
| | pH | 5 | 8-9 | 8-9 | 8-9 | 8-9 |
| Step B | | | | | | |
| 8. | Intrachromospheruloid Pigment, Dispersion From:- | | | | | |
| | Table No. | 18-5 | 21-1 | 19-2 | 19-4 | 19-5 |

TABLE 27-continued

Preparation of Intrachromospheruloid/Inorganic Pigment Composition
(parts by weight)

| Example No. 27- | | 1 | 2 | 3 | 4 | 5 |
|---|---|---|---|---|---|---|
| | Quantity | 65 | 68 | 68 | 136 | 68 |
| | Pigment Solids | 7 | 12 | 11 | 23 | 11 |
| 9. | Nitrogenous Material | | | | | |
| | Tetraethylenepentamine | 2 | 2 | 2 | — | — |
| 10. | Temperature, °C. | 28 | 28 | 28 | 28 | 28 |
| | pH | 4-5 | 8-9 | 8-9 | 8-9 | 8-9 |
| 11. | Bonding Agent Material | | | | | |
| | Z6020 silane[3] | 1 | — | — | — | — |
| | SMA Copolymer 20%[4] | — | 50 | — | 100 | 50 |
| | SAMV Amphoteric Copolymer[5] 20% | — | — | 100 | — | 50 |
| | N-Group Copolymer[6] 20% | 50 | — | — | — | — |
| 12. | Destabilizing Agent Material | | | | | |
| | (a) Acid (X)[7] | — | X | X | X | X |
| | (b) Base (X)[8] | X | — | — | — | — |
| | (c) Alcohol (X)[9] | — | X | X | X | X |
| 13. | Temperature, °C. | | | | | |
| | pH | 4-5 | 8-9 | 8-9 | 8-9 | 8-9 |
| 14. | Reaction Temperature, °C. | 50 | 50 | 50 | 50 | 50 |
| 15. | Reaction Time, Hours, Approx. | 4 | 4 | 4 | 4 | 4 |
| 16. | Primary Particle Size Diameter (microns) | <4 | <4 | <4 | <4 | <4 |
| 17. | Yield - Intrachromospheruloid/Inorganic Pigment Composition Dispersion approx. | 1000 | 1000 | 1000 | 1000 | 1000 |
| 18. | Pigment Recovery Method | | | | | |
| | (a) Filtration (X) | X | X | X | X | X |
| | (b) Spray Drying (X) | X | X | X | X | X |
| 19. | Product Available as:- | | | | | |
| | (a) Wet Coagulum (X) | X | X | X | X | X |
| | (b) Dry Coagulum (X)[10] | X | X | X | X | X |
| | (c) Spray Dried Powder (X)[11] | X | X | X | X | X |
| 20. | Intrachromospheruloid/Inorganic Pigment Composition Yield (Dry Basis) Approx. | 67 | 62 | 81 | 93 | 81 |

[1] sodium salt of a sulfate ester of an alkylphenoxy poly(ethyleneoxy)ethanol 28% active)
[2] octylphenoxy polyethoxy ethanol (70% active)
[3] N-(2-aminoethyl)-3-aminopropyltrimethoxysilane
[4] copolymer of styrene, methacrylic acid and acrylonitrile, ratio 25/65/10
[5] copolymer of styrene, acrylonitrile, methacrylic acid and 4-vinylpyridine, ratio 25/10/29/36
[6] homopolymer of 4-vinylpyridine
[7] acetic
[8] $NH_4OH$
[9] isopropyl
[10] when dried
[11] when spray dried
Cab-O-Sil H5 Trade Name for Cabot Corporation pyrogenic silica

TABLE 28

Preparation of Intrachromospheruloid/Inorganic Pigment Composition
(parts by weight)

| Example No. 28- | | 1 | 2 | 3 | 4 | 5 |
|---|---|---|---|---|---|---|
| Step A | | | | | | |
| 1. | Inorganic Pigment Material | Silica | Silica | | Silica | Silica |
| | Trade Name | Wet PP Paper Grade | Wet PP Reinforcing Grade | Cab-O-Sil M5 | Wet PP Paper Grade | Wet PP Reinforcing Grade |
| | Amount, (dry basis) | 50 | 50 | 50 | 50 | 50 |
| | Water | 800 | 800 | 800 | 800 | 800 |
| 2. | Surface Active Agent Material | | | | | |
| | Duponol ME[1] | — | 10 | — | — | — |
| | Triton X 405[2] | 10 | — | — | — | — |
| | Duomeen T[3] | 2 | — | — | — | — |
| | Acetic Acid | 5 | — | 5 | 5 | — |
| 3. | Limited Micronizing (X) | — | — | — | — | — |
| 4. | Primary Particle Size Diameter, (microns) | 0.1-1.0 | 0.01-0.05 | <2.0 | 0.1-1.0 | 0.01-0.05 |
| 5. | Separation from Micronizing Medium Screening (X) | — | — | — | — | — |
| 6. | Water, Dilution | — | — | — | — | — |
| 7. | Temperature, °C. | 28 | 28 | 28 | 28 | 28 |
| | pH | 5-6 | 8-9 | 5 | 5 | 8-9 |
| Step B | | | | | | |
| 8. | Intrachromospheruloid Pigment, Dispersion From:- | | | | | |
| | Table No. | 19-1 | 19-3 | 21-2 | 22-2 | 20-2 |
| | Quantity | 68 | 68 | 68 | 66 | 68 |
| | Pigment Solids | 10 | 11 | 12 | 9 | 10 |
| 9. | Nitrogenous Material | | | | | |
| | PEI 600[4] | 2 | — | 2 | — | — |
| | Tetraethylenepentamine | — | 2 | — | 2 | 2 |
| 10. | Temperature, °C. | 28 | 28 | 28 | 28 | 28 |
| | pH | 5-6 | 8-9 | 5 | 5 | 8-9 |
| 11. | Bonding Agent Material | | | | | |

TABLE 28-continued

Preparation of Intrachromospheruloid/Inorganic Pigment Composition (parts by weight)

| Example No. 28- | | 1 | 2 | 3 | 4 | 5 |
|---|---|---|---|---|---|---|
| | N-Sodium Silicate 28% | — | 50 | — | — | — |
| | N-Group Polymer 20%[5] | 50 | — | 50 | 50 | — |
| | SMA Copolymer 20%[6] | — | — | — | — | 25 |
| | SAMV Amphoteric Copolymer 20%[7] | — | — | — | — | 25 |
| 12 | Destabilizing Agent Material | | | | | |
| | (a) Acid (X)[8] | — | X | — | — | X |
| | (b) Base (X)[9] | X | — | X | X | — |
| | (c) Alcohol (X) | — | — | — | — | — |
| 13. | Temperature, °C. | 30–40 | 30–40 | 30–40 | 30–40 | 30–40 |
| | pH | 8–9 | 4–5 | 8–9 | 8–9 | 4–5 |
| 14. | Reaction Temperature, °C. | 80 | 80 | 80 | 80 | 80 |
| 15. | Reaction Time, hours, approx. | 4 | 4 | 4 | 4 | 4 |
| 16. | Primary Particle Size Diameter (microns) | <4 | <4 | <4 | <4 | <4 |
| 17. | Yield - Intrachromospheruloid/ Inorganic Pigment Composition Dispersion approx. | 1000 | 1000 | 1000 | 1000 | 1000 |
| 18. | Pigment Recovery Method | | | | | |
| | (a) Filtration (X) | — | — | — | — | — |
| | (b) Spray Drying (X) | X | X | X | X | X |
| 19. | Product Available As:- | | | | | |
| | (a) Wet Coagulum (X) | — | — | — | — | — |
| | (b) Dry Coagulum (X) | — | — | — | — | — |
| | (c) Spray Dried Powder (X) | X | X | X | X | X |
| 20. | Intrachromospheruloid/ Inorganic Pigment Composition Yield (Dry Basis) | 70 | 75 | 72 | 69 | 70 |

[1] sodium lauryl sulfate (100% active)
[2] octylphenoxy polyethoxy ethanol (70% active)
[3] N-tallow trimethylene diamine (85% active)
[4] water soluble polyethylenimine, manufactured by Dow
[5] homopolymer of 4-vinylpyridine
[6] copolymer of styrene, methacrylic acid and acrylonitrile, ratio 25/65/10
[7] copolymer of styrene, acrylonitrile, methacrylic acid and 4-vinylpyridine, ratio 25/10/29/36
[8] acetic
[9] NH$_4$OH
Cab-O-Sil M5 Trade Name for Cabot Corporation pyrogenic silica

TABLE 29

Preparation of Intrachromospheruloid/Inorganic Pigment Composition (parts by weight)

| Example No. 29- | 1 | 2 |
|---|---|---|
| Step A | | |
| 1. Inorganic Pigment Material | | |
| Trade Name | Hi Sil 233   TiPure R941 Slurry | HiSil 404   TiPure LW |
| Amount (dry basis) | 30           40 | 30           40 |
| Water | 400 | 400 |
| 2. Surface Active Agent Material | | |
| DuPonol ME[1] | — | 2 |
| Tamol SN[2] | — | 2 |
| Tamol 731[3] | — | 6 |
| Duomeen T[4] | 10 | — |
| Acetic Acid | 5 | — |
| 3. Limited Micronizing (X) | X | X |
| 4. Primary Particle Size Diameter (microns) | <2.0 | <2.0 |
| 5. Separation from Micronizing Medium Screening (X) | X | X |
| 6. Water, Dilution | 300 | 300 |
| 7. Temperature, °C. | 28 | 28 |
| pH | 5 | 8–9 |
| Step B | | |
| 8. Intrachromospheruloid Pigment, Dispersion From:- | | |
| Table No. | 18–4 | 20–1 |
| Quantity | 134 | 138 |
| Pigment Solids | 18 | 22 |
| 9. Nitrogenous Material | | |
| Tetraethylenepentamine | — | 2 |
| 10. Temperature, °C. | 28 | 28 |
| pH | 5 | 8–9 |
| 11. Bonding Agent Material | — | — |
| 12. Destabilizing Agent Material | | |
| (a) Acid (X)[5] | — | X |
| (b) Base (X)[6] | X | — |
| (c) Alcohol (X) | — | — |
| 13. Temperature, °C. | 30–40 | 30–40 |
| pH | 8–9 | 4–5 |
| 14. Reaction Temperature, °C. | 80 | 80 |
| 15. Reaction Time, Hours, Approx. | 5 | 5 |
| 16. Primary Particle Size Diameter (microns) | <4.0 | <4.0 |

TABLE 29-continued

Preparation of Intrachromospheruloid/Inorganic Pigment Composition
(parts by weight)

| Example No. 29- | 1 | 2 |
|---|---|---|
| 17. Yield - Intrachromospheruloid Inorganic Pigment Composition Dispersion Approx. | 1000 | 1000 |
| 18. Pigment Recovery Method | | |
| (a) Filtration (X) | — | X |
| (b) Spray Drying (X) | X | — |
| 19. Product Available as:- | | |
| (a) Wet Coagulum (X) | — | X |
| (b) Dry Coagulum (X)[7] | — | X |
| (c) Spray Dried Powder (X) | X | — |
| 20. Intrachromospheruloid/ Inorganic Pigment Composition Yield (Dry Basis) approx. | 88 | 92 |

[1] sodium lauryl sulfate (100% active)
[2] sodium salt of a condensed naphthalene sulfonic acid
[3] sodium salt of a polymeric carboxylic acid (100% active)
[4] N-tallow trimethylene diamine (85% active)
[5] aq. $H_2SO_4$
[7] when dried HiSil 233 Trade Name for PPG Industries precipitated silica, reinforcing grade
TiPure R941 Trade Name for DuPont titanium dioxide pigment
HiSil 404 Trade Name for PPG Industries precipitated silica, paper grade
TiPure LW Trade Name for DuPont titanium dioxide pigment

TABLE 30

Preparation of Intrachromospheruloid/Inorganic Pigment Composition
(parts by weight)

| Example No. 30- | 1 | | 2 | |
|---|---|---|---|---|
| Step A | | | | |
| 1. Inorganic Pigment Material | | | | |
| Trade Name | Silica Wet PP Paper Grade | TiPure R941 Slurry | Silica Wet PP Reinforcing Grade | TiPure LW |
| Amount (dry basis) | 25 | 40 | 30 | 40 |
| Water | 500 | | 500 | |
| 2. Surface Active Agent Material | | | | |
| Duponol ME[1] | 2 | | 2 | |
| Alipal CO 433[2] | 90 | | 90 | |
| 3. Limited Micronizing (X) | X | | X | |
| 4. Primary Particle Size Diameter (microns) | <2.0 | 0.2–0.5 | <2.0 | <0.2 |
| 5. Separation from Micronizing Medium Screening (X) | X | | X | |
| 6. Water, Dilution | 200 | | 200 | |
| 7. Temperature, °C. | 28 | | 28 | |
| pH | 8–9 | | 8–9 | |
| Step B | | | | |
| 8. Intrachromospheruloid Pigment Dispersion From:- | | | | |
| Table No. | 17-2 | | 17-4 | |
| Quantity | 128 | | 130 | |
| Pigment Solids | 13 | | 14 | |
| 9. Nitrogenous Material | | | | |
| Monaquat TIBC[3] | 2 | | 2 | |
| 10. Temperature, °C. | 28 | | 28 | |
| pH | 8–9 | | 8–9 | |
| 11. Bonding Agent Material | | | | |
| "N" Sodium Silicate | 50 | | — | |
| SMA Copolymer 20%[4] | — | | 25 | |
| 12. Destabilizing Agent Material | | | | |
| (a) Acid (X)[5] | X | | X | |
| (b) Base (X) | — | | — | |
| (c) Alcohol (X)[6] | X | | X | |
| 13. Temperature, °C. | 30–40 | | 30–40 | |
| pH | 4–5 | | 4–5 | |
| 14. Reaction Temperature, °C. | 75 | | 75 | |
| 15. Reaction Time, Hours, Approx. | 5 | | 5 | |
| 16. Primary Particle Size Diameter (microns) | <4 | | <4 | |
| 17. Yield - Intrachromospheruloid/ Inorganic Pigment Composition Dispersion Approx. | 1200 | | 1200 | |
| 18. Pigment Recovery Method | | | | |
| (a) Filtration (X) | X | | X | |
| (b) Spray Drying (X) | — | | — | |
| 19. Product Available As:- | | | | |
| (a) Wet Coagulum (X) | X | | X | |
| (b) Dry Coagulum (X)[7] | X | | X | |
| (c) Spray Dried Powder (X) | — | | — | |
| 20. Intrachromospheruloid/ Inorganic Pigment Composition | | | | |

TABLE 30-continued

Preparation of Intrachromospheruloid/Inorganic Pigment Composition
(parts by weight)

| Example No. 30- | 1 | 2 |
|---|---|---|
| Yield (Dry Basis) Approx. | 92 | 89 |

[1]sodium lauryl sulfate (100% active)
[2]sodium salt of a sulfate ester of an alkylphenoxy poly(ethylenoxy)ethanol
[3]substituted imidazoline quaternized with benzyl chloride (100% active)
[4]copolymer of styrene, methacrylic acid and acrylonitrile, ratio 25/65/10
[2]sodium salt of a sulfate ester of an alkylphenoxy poly(ethylenoxy)ethanol
[3]substituted imidazoline quaternized with benzyl chloride (100% active)
[4]copolymer of styrene, methacrylic acid and acrylonitirle, ratio 25/65/10
[5]aq. HCl
[6]isopropyl
[7]when dried
TiPure R941 Trade Name for DuPont titanium dioxide pigment
TiPure LW Trade Namefor DuPont titanium dioxide pigment.

The following Examples showing the method of preparation of special intrachromospheruloid/inorganic pigment compositions are again given in detailed procedural form to further supplement and exemplify the preceding Tables and Examples.

EXAMPLES 1 et seq.

Detailed Step-wise Procedures for Producing Intrachromospheruloid/Inorganic Pigment Compositions Example 1 (Soft powdering procedure and product)

The procedure of Example A was followed with the exception that in step C in place of the 25 ml. of 33% solution of Aerosol OT in Solvesso 140 was used 40 ml. of a 10% solution of sorbitan monolaurate in Solvent Naphtha. A very soft bright blue product was obtained.

Example 2 (Soft powdering procedure and product)

The procedure of Example E was followed with the exception that in step C was added 40 ml. of a 10% solution of octylphenoxydiethoxyethanol in Solvesso 140. A deep green, soft powdered product was obtained.

Example 3 (Soft powdering procedure and product)

The procedure of Example F was followed with the exception that in step C was added 30 ml. of a 20% solution of diamyl sodium sulfosuccinate in Solvent Naphtha. A dark green soft powdered product was obtained.

Example 4 (Soft powdering procedure and product)

The procedure of Example G was followed with the exception that in step C was added 30 ml. of a 10% solution of sorbitan monolaurate dissolved in Solvent Naphtha. A bright blue soft powdered product was obtained containing reactive condensation resin material therein.

Depending on the end use envisioned, i.e. whether the intrachromospheruloid/inorganic pigment composition is to be utilized in aqueous or nonaqueous system, the preceding Examples 1 through 4 may be isolated by conventional filtration, washing and drying to yield the product in soft powder form as a dry pigment, or the pigment may be isolated by spray drying of the slurry directly; or when a spray dried product free of water soluble salts and contaminators is desired, the filtered and washed wet coagulum may be reslurried in water and the slurry then spray dried.

Example 5 (Organic color ground with anionic surface active agent and minor amount of amine)

Step A 40 grams of Perylene Red Toner (Pigment Red 123, CI 71145) were charged to a sand mill together with 5 grams of Tamol 731 (sodium salt of polymeric carboxylic acid), 25 grams of Alipal CO 433 (sodium salt of a sulfate ester of an alkylphenoxy poly(ethyleneoxy) ethanol 28% active), 300 ml. of water, 10 ml. of 28% ammonium hydroxide and sufficient grinding media (e.g. Ottawa sand) to ensure efficient grinding. The charge was milled for 20 hours at which point 2 grams of Duomeen TDO (N-tallow trimethylene diamine dioleate) dissolved in 10 grams of dimethylaminoethylmethacrylate were added and the milling continued for a further 20 hours. Microscopic examination of a representative sample at this point showed essentially all of the organic color particles to be below 0.2 micron in diameter. The microground organic color pigment composition was then separated from the grinding medium by conventional means, e.g. screening and charged to a reaction vessel equipped for emulsion polymerization together with 20 grams of Duponol ME (sodium lauryl sulfate) dissolved in sufficient water to bring the total volume of the charge to 600 ml. The system was purged with nitrogen and 80 grams of a monomer mixture containing 28 grams of methylmethacrylate, 40 grams of styrene, 10 grams of ethyleneglycoldimethacrylate and 2 grams of Tung Oil were added and the reaction temperature raised to 40°-45° C. with efficient agitation. 3 grams of cumene hydroperoxide were then run in and the temperature raised to 75°-80° C. and held there for 7 hours. On cooling a bright red latex was obtained.

Step B 40 grams (dry basis) of a wet precipitated reinforcing grade silica pigment having primary particles of an average size from 0.01 to 0.05 micron together with 60 grams (dry basis) of a commercially available Titanium Dioxide slurry (TiPure LW, DuPont) having primary particles of an average size of 0.2 to 0.5 micron in diameter, were charged to a reaction vessel and slurried up with 20 ml. of 28% ammonium hydroxide solution, 20 grams of the ammonium salt of a styrene/methacrylic acid/acrylonitrile copolymer (ratio 25/65/10) together with sufficient water to adjust the volume to 1500 ml.

Step C

The intrachromospheruloid pigment latex produced in step A was then run into the inorganic pigment slurry of step B with agitation, followed by 10 ml. of a 10% aqueous solution of tetraethylenepentaminediamine. The reaction was stirred for 10 to 15 minutes and then acidified with sufficient glacial acetic acid to adjust the pH to between 5.0 and 5.5 to coagulate the intrachromospheruloid/inorganic pigment composition. 40 ml. of 10% solution of sorbitan monolaurate dissolved in Solvent Naphtha was added and the reaction heated with turbulent agitation to 80°-85° C. and maintained at this temperature for 4-5 hours. The serum was then separated from the coagulum by conventional means e.g. filtration and washing, to yield a bright red intrachromospheruloid/inorganic pigment composition in soft powder presscake form for use in aqueous based systems. This presscake could also be made oleophilic by drying e.g. oven drying to yield the product in dry soft powder form.

Example 6 (Using polymeric surfact active agents)

The procedure of the preceding example was followed with the exception that in place of 20 grams of Duponol ME (sodium lauryl sulfate) in the polymerization (step A) was used 30 grams of the ammonium salt of a styrene/methacrylic acid/acrylonitrile copolymer, (ammonium salt, ratio 25/65/10). A bright red intrachromospheruloid/inorganic pigment was produced containing essentially polymeric surface active agent material.

Example 7 (Micronizing in monomer material)

The procedure of Example A was followed with the exception that in step A in place of the Phthalocyanine Blue presscake was used 20 grams of dry Irgazin Yellow 3RLT (Pigment Yellow 110) and the micronizing was carried out in the monomer material was follows.

20 grams of dry Irgazin Yellow 3RLT was charged to a sand mill equipped with nitrogen blanket and explosion proof electrical fittings and micronized in a mixture consisting of 70 grams of styrene, 10 grams of cyclohexylmethacrylate, 30 grams of methylmethacrylate, 20 grams of 50% divinylbenzene and 10 grams of a dioctyl ester of sodium sulfosuccinate, until a representative sample under microscopic examination showed no color particles above 0.2 micron in diameter. The dispersion of color pigment in the monomer mixture was separated by conventional screening from the grinding medium and charged to a vessel equipped for emulsion polymerization containing 500 ml. of water having dissolved therein 25 grams of Duponol ME (sodium lauryl sulfate) and 30 grams of Alipal CO 433 (sodium salt of a sulfate ester of an alkylphenoxy poly(ethyleneoxy) ethanol 28% active). The addition of the color pigment/monomer dispersion was made with rapid agitation to ensure effective emulsification in the aqueous solution. The system was then purged with nitrogen and the temperature raised to 40°-45° C. when 3 grams of cumene hydroperoxide were added and heating continued to 75°-80° C. The reaction was held at this temperature for 7-8 hours to complete the emulsion polymerization. A bright orange yellow intrachromospheruloid pigment latex was obtained.

This latex was combined with inorganic pigment material as in Example 1 to give a bright reddish yellow intrachromospheruloid/inorganic pigment composition.

Example 8 (Sequential addition of cross-linking monomer)

The procedure of Example A was followed with the exception that in step A the initial polymerization was made omitting the cross-linking monomer to produce a noncross-linked intrachromospheruloid latex. This latex was then cooled to 40°-45° C. and a further 20 grams of monomer material consisting of 10 grams of methylmethacrylate and 10 grams of ethyleneglycoldimethacrylate added. After 1 hour of stirring to ensure efficient absorption of the added monomer material, the reaction temperature was raised to 80° C. and 1½ grams of cumene hydroperoxide added. The reaction was held at 75°-80° C. for 7 hours and then cooled to yield the deep blue intrachromospheruloid pigment composition in stable latex form, the spheruloids thereof being cross-linked to essential insolubility in all physical solvents.

OTHER EXAMPLES

It was shown in Example 8 that the spheruloids of the composition may be produced initially as noncross-linked particles, and be thereafter cross-linked by absorbing cross-linking monomer thereinto and subjecting the same to further polymerization. It has thus been shown that any of the noncross-linked products exemplified may be prepared in cross-linked form by the concurrent or sequential polymerization therewith of cross-linking monomers.

Since the criteria common to the noncross-linked and cross-linked embodiments of the invention are that the products be insoluble in the vehicle of intended use and have a different refractive index than the latter, it will be apparent from the foregoing that the cross-linking monomers, in the Examples producing cross-linked products, may also be replaced by noncross-linking monomers, where the criteria will be satisfied by the environment of use.

While there have been described herein what are at present considered preferred embodiments of the invention, it will be obvious to those skilled in the art that modifications and changes may be made therein without departing from the essence of the invention. For example, the micronized materials in liquid media may be stored after preparation, especially if they contain adequate emulsifier, such previously prepared micronized dispersions may be blended, preferably under further micronization, to provide in liquid media micronized mixed pigments for the process; the modes of combining, heating and polymerizing the ingredients may be varied dependent upon the volumes of materials being handled in manners known to those skilled in the emulsion polymerization art; etc. It is therefore understood that the exemplary embodiments are illustrative and not restrictive of the invention, the scope of which is defined in the appended claims, and that all modifications that come within the meaning and range of equivalents of the claims are intended to be included therein.

This application is one of the following series of applications:

| Number | Case Number | Serial Number | Title |
| --- | --- | --- | --- |
| First | 90-A | 712,257 | Intrachromospheruloid Pigments and Processes for Producing Same |
| Second | 90-B | 712,254 | Intraleucospheruloid Pigments and Processes for Producing Same |
| Third | 90-C | 712,255 | Intrachromospheruloid/Inorganic Pigment Compositions and Processes for Producing Same |
| Fourth | 90-D | 712,256 | Intraleucospheruloid/Organic Color Pigment Compositions and Processes for Producing Same |
| Fifth | 90-E | 712,252 | Intrachromospheruloid/Intraleucospheruloid Pigment Compositions and Processes for Producing Same |
| Sixth | 90-F | 712,253 | Intrachromoleucospheruloid Pigment Compositions and Processes for Producing Same |

All of the cases of this series are herein incorporated by reference. The titles of the respective cases indicate the lines of division between the subjects matter thereof. Thus the product of the first case consists essentially of transparent emulsion polymer particles, preferably cross-linked to insolubility in physical solvents and having primary particles of colloidal size (spheruloids), enhancing the optical properties of still smaller particles of organic color pigment (chromo pigment) embedded within them (intra). The second case, in lieu of the organic color pigment has embedded within its spheruloids inorganic white pigment (leuco pigment) enhanced thereby. The product of the third case is a special combination of intrachromospheruloid pigment affixed to leuco pigment and coloring the light reaching and reflected from the latter. The product of the fourth case is a special combination of intraleucospheruloid having chromo pigment material affixed thereto and illuminating the same. The product of the fifth case is a special combination of intrachromospheruloid and intraleucospheruloid pigments bonded together giveing mutually enhanced tinctorial properties. The product of the sixth case differs from the foregoing in that its spheruloids have embedded therein and enhance the tinctorial effects of composite particles of essentially transparent organic color (chromo) and inorganic white (leuco) components wedded to each other.

Also incorporated by reference herein are our co-pending applications Ser. Nos. 712,213 and 712,160. (Cases 88 and 89) filed concurrently herewith and respectively entitled "Improved Vinylic Filler Products and Processes for Producing Same" and "Improved Vinylic Filler Pigments and Processes for Producing Same", which co-pending applications apply to materials different from those concerned in the above listed series of applications, i.e. non-intrachromo- and non-intraleuco- pigment materials, the applicants' soft powdering techniques constituting parts of certain combinations disclosed and claimed in the present application.

We claim:

1. A process for producing insoluble intrachromospheruloid/inorganic pigment composition, which process comprises, in combination:
   (a) providing in liquid medium a particulate color pigment composition consisting essentially of organic color pigment composition dispersed in said liquid medium with 0–100% by weight of the total of surface active agent material set forth in (c), said organic color pigment composition being essentially insoluble in water and having primary particles of an average size less than 0.2 micron in diameter;
   (b) forming an aqueous emulsion polymerization system consisting essentially of (1) the composition of (a), (2) the balance, if any, of 100% of the total of surface active agent material set forth in (c), (3) monomer material selected in the ratio of said monomer material to said pigment composition lying in the range of 100:1 to 1:20 by weight, said monomer material being ethylenically unsaturated monomer material selected from the class consisting of (i) monomer material polymerizable through a single ethylenically unsaturated group in the amount of 0% to 99.8% by weight of said added monomer material and (ii) monomer material polymerizable through a plurality of ethylenically unsaturated groups in an amount, in the range of 0.2 to 100% by weight of said added monomer material, sufficient to produce polymer cross-linked to essential insolubility in any physical solvent and (4) emulsion polymerization initiator in an effective amount in the range of 0.2 to 10% by weight of the said added monomer material, dispersed in an aqueous medium;
   (c) the ratio of the total of the surface active agent material present after (b) to said particulate pigment composition and monomer material lying in the range of 2:1 to 1:40 by weight, and being capable of effecting emulsion polymerization of the selected ethylenically unsaturated monomer material to yield polymer particles with the pigment provided in step (a) embedded therein;
   (d) effecting emulsion polymerization of the combination formed in (b) under agitation and at sufficient temperatures in the range of 0 to 200° C. for sufficient time in the range of a few minutes to 24 hours to permit the polymerization to proceed far enough in the range from 50 to 100% conversion by weight of said monomer material to produce in aqueous dispersion an intrachromospheruloid pigment consisting essentially of spheruloids of organic polymer material, cross-linked to essential insolubility in any physical solvent, having primary particles of an average size not exceeding 4 microns in diameter, and having embedded therein the still smaller size particles of said particulate pigment composition; and
   (e) providing a particulate inorganic pigment combination consisting essentially of inorganic pigment composition dispersed in an aqueous medium with from 0 to 150 parts by weight of surface active agent material per 100 parts by weight of said inorganic pigment composition said inorganic pigment composition being essentially insoluble in water and having primary particles of an average size less than 2 microns in diameter;
   (f) combining in a weight ratio in the range of 1:100 to 100:1, dry basis, the aqueous dispersions formed in steps (d) and (e), with from 0 to an equal weight, based on the inorganic pigment present, of pigment bonding agent material, and from 0 to an equal weight, based on the inorganic pigment present, of nitrogenous material and destabilizing the surface active agent material present to form an aqueous slurry of intrachromospheruloid/inorganic pigment composition, and
   (g) recovering said intrachromospheruloid/inorganic pigment composition.

2. A process as claimed in claim 1, in which the ratio in step (c) is selected to produce intrachromospheruloid pigment dispersion in step (d) in the form of a latex for combining in step (f).

3. A process according to claim 1, in which the ethylenically unsaturated monomer material in step (b) comprises several portions sequentially added and sequentially polymerized in step (d) at least one of said several portions comprising monomer material polymerizable through at least two ethylenically unsaturated groups in a sufficient proportion to cross-link the polymer of the intrachromospheruloids to essential insolubility in any physical solvent.

4. A process according to claim 1, in which the intrachromospheruloid pigment composition formed in step (d) has its primary particles of an average size not exceeding 0.5 micron in diameter.

5. A process according to claim 1, in which the monomer material in step (b) (ii) having a plurality of polymerizable ethylenically unsaturated groups essentially comprise material copolymerizable with vinyl monomers and selected from the unsaturated conjugated drying oils and their acids and derivatives of the foregoing, the ratio of said drying oil material to the other monomer material in step (b) lying in the range of 0.2:99.8 to 20:80 by weight.

6. A process according to claim 1, wherein said surface active agent material in step (c) is selected from the class of polymeric and nonpolymeric surface active agents which consists of (1) cationic surface active agents, (2) combinations of cationic and nonionic surface active agents, (3) anionic surface active agent when from 0.1 to said equal weight of nitrogenous material is present, and (4) nonionic surface active agents when the selected monomer material comprises monomer having cationic groups sufficient to yield therewith said polymer spheruloids with the said particulate pigment composition provided in step (a) embedded therein.

7. A process according to claim 1, wherein (f) said organic color pigment composition supplied for step (a) is a relatively coarse particulate organic color pigment composition and in step (a) is micronized in the liquid medium with the aid of the surface active agent present therein until said organic color pigment composition has primary particles of an average size of less than 0.2 micron in diameter.

8. A process according to claim 7, wherein the said organic color pigment composition supplied for step (a) is micronized with at least 2% by weight of the monomer material supplied in step (b)(2).

9. A process according to claim 1, wherein said inorganic pigment composition supplied for step (e) is a relatively coarse particulate inorganic pigment composition and in step (e) is micronized in the aqueous medium with the aid of any surface active agent present therein until said inorganic pigment composition has primary particles of an average size less than 2 microns in diameter.

10. A process according to claim 9, wherein said inorganic pigment composition supplied for step (e) is micronized therein until said inorganic pigment composition has primary particles of an average size greater than 0.1 micron and less than 2 microns in diameter.

11. A process according to claim 9, wherein the said inorganic pigment composition supplied for step (e) is micronized with an amount in the range of 2% to 100% by weight of pigment bonding agent material based on the inorganic pigment and said bonding material being from the class consisting of (i) water soluble alkali metal silicates precipitated in the presence of at least a part of the inorganic pigment composition, (ii) water soluble titanium compounds precipitated in the presence of at least a part of the inorganic pigment composition, (iii) water soluble and dispersible aminoplasts preformed and formed in situ and adhered to at least a part of the inorganic pigment composition, (iv) water soluble and dispersible phenoplasts preformed and formed in situ and adhered to at least a part of the inorganic pigment composition, (v) water soluble and dispersible organic polymers having carboxyl, amine, sulfate and sulfonic acid groups and salts thereof precipitated in the presence of at least a part of the inorganic pigment composition, and (vi) water soluble and dispersible organic silanes.

12. A process according to claim 9, wherein the said inorganic pigment composition supplied for step (e) is micronized with at least 2% by weight of nitrogenous material based on the inorganic pigment, dry basis.

13. A process according to claim 1, in which the surface active agent material employed in steps (c) and (e) comprises polymeric surface active agent.

14. A process according to claim 13, in which said polymeric surface active agent in one of steps (c) and (e) has basic groups at least in part in the form of water soluble salts and in the other of steps (c) and (e) has acidic groups at least in part in the form of water soluble salts.

15. A process according to claim 1, wherein step (e) is practiced by separating serum from the coagulum to provide the intrachromospheruloid/inorganic pigment composition as wet coagulum.

16. A process according to claim 1, which comprises a step (g) drying the intrachromospheruloid/inorganic pigment produced by step (f).

17. A process according to claim 1, which comprises in step (g) spray drying the intrachromospheruloid/inorganic pigment produced by step (f).

18. A process according to claim 1, wherein (h) as a part of step (g) the intrachromospheruloid/inorganic pigment composition produced in aqueous slurry in step (f) is modified to contain 0.5 to 35 parts of material selected from the soft powdering agents per 100 parts of said pigment composition, dry basis by weight.

19. A process according to claim 18, which further comprises (i) as a part of step (g), after step (h), drying the modified composition to obtain the intrachromospheruloid/inorganic pigment composition in soft powder form.

20. A process according to claims 1, in which the inorganic pigment composition in step (e) consists essentially of silica pigment composition having primary particles of an average size less than 2 microns in diameter and titanium dioxide pigment composition having primary particles of an average size in the range of about 0.2 to 0.5 micron in diameter, in a weight ratio in the range of 1:10 to 10:1.

21. A process according to claims 1, in which the inorganic pigment composition in step (e) consists essentially of silica pigment composition having primary particles of an average size less than 2 microns in diameter and titanium dioxide pigment composition having primary particles of an average size less than 0.2 micron in diameter, in a weight ratio in the range of 1:10 to 10:1.

22. A process according to claim 1, the inorganic pigment provided in step (e) being selected from the class consisting of the following groups (1) siliceous pigment compositions selected from (i) the natural silica pigments, (ii) the precipitated silica pigments, (iii) the pyrogenic silica pigments, (iv) the alkaline earth silicate pigments, (v) the aluminum silicate pigments, (vi) the zinc silicate pigments (vii) the zirconium silicate pigments, and (viii) combinations of any two or more of the foregoing; (2) titanium dioxide pigment compositions; (3) metal oxide and hydroxide pigment compositions selected from the class consisting of the following groups (i) alkaline earth oxide pigments, (ii) alumina pigments, (iii) aluminum hydroxide pigments, (iv) antimony oxide pigments, (v) zinc oxide pigments, (vi) zirconium oxide pigments, and (vii) combinations of any two or more of the foregoing, and (4) combinations of any two or more members selected respectively from groups (1), (2) and (3).

23. A process according to claims 1, in which the selected inorganic pigment composition in step (e) consists essentially of siliceous pigment selected from the sub-class consisting essentially of (a) wet, and dried, paper grade precipitated hydrated silica pigments having primary particles of an average size in the range of 0.1 to 1 micron in diameter, (b) wet, and dried, reinforcing grade precipitated hydrated silica pigments having primary particles of an average size in the range of 0.01 to 0.05 micron in diameter, and (c) pyrogenic silica pigment.

24. A process according to claim 1, in which the inorganic pigment composition in step (e) consists essentially of titanium dioxide pigment composition having primary particles of an average size in the range of about 0.2 to 0.5 micron in diameter.

25. A process according to claims 1, in which the inorganic pigment composition in step (e) consists essentially of titanium dioxide pigment composition having primary particles of an average size less than 0.2 micron in diameter.

26. A process according to claim 8, wherein in step (f) the liquid medium in which the color pigment composition is micronized consists essentially of an aqueous solution of from 1% to 10% by weight of the total of surface active agent set forth in (c).

27. A process according to claim 8, wherein in step (f) the liquid medium in which the color pigment composition is micronized consists essentially of monomer material employed in step (b) and in which the surface active agent material employed in step (b) is dissolved in sufficient water to provide an emulsion polymerization system in step (b).

28. A process according to claim 1, in which the aqueous dispersions are combined in step (f) with from 0 to an equal weight, based on the inorganic pigment present, of pigment bonding agent material, and from 0 to an equal weight, based on the inorganic pigment present, of nitrogenous material,
said pigment bonding agent material being selected from the class consisting of (i) water soluble alkali metal silicates precipitated in the presence of at least a part of the inorganic pigment composition, (ii) water soluble titanium and zirconium compounds precipitated in the presence of at least a part of the inorganic pigment composition, (iii) water soluble and dispersible aminoplasts preformed and formed in situ and adhered to at least a part of the inorganic pigment composition, (iv) water soluble and dispersible phenoplasts preformed and formed in situ and adhered to at least a part of the inorganic pigment composition, (v) water soluble and dispersible organic polymers having carboxyl, amine, sulfate and sulfonic acid groups and salts thereof precipitated in the presence of at least a part of the inorganic pigment composition, (vi) water soluble and dispersible organic silanes, and (vii) combinations of two or more members of the foregoing; and
said nitrogenous material being slected from the class consisting of (i) oleophilic amines, (ii) oleophilic imines, (iii) oleophilic amine carboxylates and acetates, (iv) the oleophilic quaternary ammonium compounds, (v) water soluble polyamines, (vi) water soluble imines and polyimines and (vii) combinations of two or more members of the foregoing.

29. An insoluble intrachromospheruloid/inorganic pigment composition consisting essentially of (a) intrachromospheruloid pigment consisting of spheruloids of organic polymer material cross-linked to essential insolubility in any physical solvent, said polymer material consisting essentially of polymerized monomer material selected from the class consisting of the monoethylenically unsaturated and polyethylenically unsaturated polymerizable compounds, and said spheruloids having primary particles of an average size not exceeding 4 microns in diameter and having embedded therein particulate color pigment composition consisting essentially of organic color material having primary particles of an average size not exceeding 0.2 micron in diameter, and (b) inorganic leuco pigment material having primary particles of an average size not exceeding 2 microns in diameter, the weight ratio of said intrachromospheruloid pigment to said inorganic leuco pigment material in said composition being in the range of 100:1 to 1:100.

30. An intrachromospheruloid/inorganic pigment composition according to claim 29, in the form of a wet coagulum.

31. An intrachromospheruloid/inorganic pigment composition according to claim 29, in powder form.

32. An intrachromospheruloid/inorganic pigment composition according to claim 29 in soft powder form.

33. An intrachromospheruloid/inorganic pigment composition according to claim 29, in which the inorganic pigment material consists essentially of silica pigment composition having primary particles of an average size less than 2 microns in diameter and titanium dioxide pigment composition having primary particles of an average size in the range of about 0.2 to 0.5 micron in diameter in a weight ratio in the range of 1:10 to 10:1.

34. An intrachromospheruloid/inorganic pigment composition according to claim 29, in which the inorganic pigment material consists essentially of silica pigment composition having primary particles of an average size less than 2 microns in diameter and titanium dioxide pigment composition having primary particles of an average size less than 0.2 micron in diameter in a weight ratio in the range of 1:10 to 10:1.

35. An intrachromospheruloid/inorganic pigment composition according to claim 29, the inorganic leuco pigment composition thereof being selected from the class consisting of the following groups (1) siliceous pigment compositions selected from (i) the natural silica pigments, (ii) the precipitated silica pigments, (iii) the pyrogenic silica pigments, (iv) the alkaline earth silicate pigments, (v) the aluminum silicate pigments, (vi) the zinc silicate pigments, (vii) zirconium silicate pigments, and (viii) combinations of any two or more of the foregoing; (2) titanium dioxide pigment compositions; (3) metal oxide and hydroxide pigment compositions selected from (i) alkaline earth oxide pigments, (ii) alumina pigments, (iii) aluminum hydroxide pigments, (iv) antimony oxide pigments, (v) zinc oxide pigments, (vi) zirconium oxide pigments, and (vii) combinations of any two or more of the foregoing, and (4) combinations of any two or more members selected respectively from groups (1), (2), and (3); the particulate pigment composition thereof containing from 0 to an equal weight of pigment bonding agent material bonding said inorganic pigment to said spheruloids and selected from the class consisting of water insoluble deposits from (i) water soluble alkali metal silicates, (ii) water soluble titanium and zirconium compounds, (iii) water soluble and dispersible aminoplasts, (iv) water soluble and dispersible pheoplasts, (v) water soluble and dispersible organic polymers having carboxyl, amine, sulfate and sulfonic acid groups and salts thereof, and (vi) water soluble dispersible organic silanes; and the particulate pigment composition thereof having from 0 to an equal weight of nitrogenous material thereon, said nitrogenous material being selected from the class consisting of (i) oleophilic amines, (ii) oleophilic imines, (iii) oleophilic amine carboxylates, (iv) the oleophilic quaternary ammonium compounds, (v) water soluble polyamines, (vi) water soluble imines, and (vii) combinations of two or more members of the foregoing.

36. An intrachromospheruloid/inorganic pigment composition according to claim 33, in which the inorganic pigment material consists essentially of silica pigment composition selected from the group consisting of (a) wet, and dried, paper grade precipitated hydrated silica pigments having primary particles of an average size in the range of 0.1 to 2 microns in diameter, (b) wet, and dried, reinforcing grade precipitated hydrated silica pigments having primary particles of an average size in the range of 0.01 to 0.05 micron in diameter, and (c) pyrogenic silica pigment.

37. An intrachromospheruloid/inorganic pigment composition according to claim 33, in which the inorganic pigment material consists essentially of titanium dioxide pigment composition having primary particles of an average size in the range of about 0.2 to 0.5 micron in diameter.

38. An intrachromospheruloid/inorganic pigment composition according to claim 33, in which the inorganic pigment material consists essentially of titanium dioxide pigment composition having primary particles of an average size less than 0.2 micron in diameter.

39. An intrachromospheruloid/inorganic pigment composition according to claim 33, in which the organic color pigment material embedded in the crosslinked polymer material consists of an essentially homogenous mixture of two or more chemically different organic color pigments, said intrachromospheruloid inorganic pigment composition exhibiting a coloration different from that of either of said organic color pigments.

40. An intrachromospheruloid/inorganic pigment composition according to claim 33, in which the organic color pigment composition is a combination of organic color pigments of similar hue, consisting essentially of (i) light stable organic color pigment having a light stability rating number of at least 7, and (ii) a less light stable organic color pigment having a light stability rating not greater than 6, the molar weight ratio of said pigment (i) to said pigment (ii) being in the range of 1:5 to 20:1, and the presence of said pigment (i) prolonging the light stability of said pigment (ii) in the combination.

41. An intrachromospheruloid/inorganic pigment composition according to claim 33, in which the organic color pigment material embedded in the polymer material further includes carbon black as a hue deepening component in an amount not exceeding 10% by weight based on said organic color pigment.

* * * * *